(12) United States Patent
Pettigrew et al.

(10) Patent No.: US 8,331,685 B2
(45) Date of Patent: Dec. 11, 2012

(54) DEFINING A BORDER FOR AN IMAGE

(75) Inventors: Daniel Pettigrew, Pacific Palisades, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 973 days.

(21) Appl. No.: 12/154,987

(22) Filed: May 28, 2008

(65) Prior Publication Data

US 2009/0300553 A1 Dec. 3, 2009

(51) Int. Cl.
*G06F 3/048* (2006.01)
(52) U.S. Cl. ......... 382/199; 382/195; 715/856; 345/619
(58) Field of Classification Search .................. None
See application file for complete search history.

(56) References Cited

U.S. PATENT DOCUMENTS

| | | | |
|---|---|---|---|
| 5,130,789 A | 7/1992 | Dobbs et al. | |
| 5,339,388 A * | 8/1994 | Bates et al. | 715/742 |
| 5,805,725 A * | 9/1998 | Sakata et al. | 382/187 |
| 6,077,307 A * | 6/2000 | Benzel et al. | 716/52 |
| 6,154,221 A | 11/2000 | Gangnet | |
| 6,448,964 B1 * | 9/2002 | Isaacs et al. | 345/419 |
| 6,535,213 B1 | 3/2003 | Ogino et al. | |
| 6,628,285 B1 | 9/2003 | Abeyta et al. | |
| 6,741,755 B1 | 5/2004 | Blake et al. | |
| 7,123,269 B1 * | 10/2006 | Bourdey et al. | 345/589 |
| 7,227,983 B1 | 6/2007 | Christian et al. | |
| 7,430,339 B2 | 9/2008 | Rother et al. | |
| 7,609,278 B1 * | 10/2009 | Dash | 345/619 |
| 7,629,966 B2 * | 12/2009 | Anson | 345/173 |
| 7,693,341 B2 | 4/2010 | Pettigrew et al. | |
| 7,940,995 B2 | 5/2011 | Lee et al. | |
| 7,978,938 B1 | 7/2011 | Wilensky | |
| 2001/0036310 A1 | 11/2001 | Pettigrew et al. | |
| 2004/0227768 A1 | 11/2004 | Bates et al. | |
| 2005/0018077 A1 | 1/2005 | De Haan et al. | |
| 2005/0238217 A1 | 10/2005 | Enomoto et al. | |

(Continued)

FOREIGN PATENT DOCUMENTS

EP 2286384 2/2011

(Continued)

OTHER PUBLICATIONS

Anonymous: "Adobe Photoshop 5.0 UserGuide, Chapter 7—Selecting" Adobe Photoshop 5.0 User Guide, XX, XX, Jan. 1, 1998, pp. 137-164.*

(Continued)

*Primary Examiner* — Atiba O Fitzpatrick
*Assistant Examiner* — Thomas A James
(74) *Attorney, Agent, or Firm* — Adeli & Tollen, LLP

(57) ABSTRACT

Some embodiments provide a method that provides a display area for displaying an image that includes several of edges. The method provides a border drawing tool that in response to cursor movement across the image displays a search window about the cursor. The search window specifies a region to be searched to identify edges for use in defining a border for the image. In some embodiments, the size of the search window varies based on the speed of the cursor. The search window is a square box in some embodiments and a circle in other embodiments. The search window is centered at the cursor in some embodiments. In some embodiments, the display area is also for displaying the defined border over the image.

22 Claims, 57 Drawing Sheets

U.S. PATENT DOCUMENTS

| | | |
|---|---|---|
| 2005/0271273 A1 | 12/2005 | Blake et al. |
| 2006/0005135 A1 | 1/2006 | Vetelainen |
| 2006/0029275 A1 | 2/2006 | Li et al. |
| 2006/0039611 A1 | 2/2006 | Rother et al. |
| 2006/0204034 A1 | 9/2006 | Steinberg et al. |
| 2007/0013813 A1 | 1/2007 | Sun et al. |
| 2007/0165966 A1 | 7/2007 | Weiss et al. |
| 2007/0172116 A1* | 7/2007 | Barnes et al. ............... 382/162 |
| 2007/0189627 A1 | 8/2007 | Cohen et al. |
| 2007/0263119 A1 | 11/2007 | Shum et al. |
| 2007/0286492 A1 | 12/2007 | Kim et al. |
| 2008/0117333 A1 | 5/2008 | Walsh |
| 2008/0131010 A1 | 6/2008 | Wilensky |
| 2008/0170783 A1 | 7/2008 | Yoo et al. |
| 2009/0169066 A1 | 7/2009 | Yang et al. |
| 2009/0220149 A1 | 9/2009 | Menadeva et al. |
| 2009/0297031 A1 | 12/2009 | Pettigrew et al. |
| 2009/0297034 A1 | 12/2009 | Pettigrew et al. |
| 2009/0297035 A1 | 12/2009 | Pettigrew et al. |
| 2010/0026831 A1 | 2/2010 | Ciuc et al. |
| 2010/0054549 A1 | 3/2010 | Steinberg et al. |

FOREIGN PATENT DOCUMENTS

| | | |
|---|---|---|
| EP | 2431942 | 3/2012 |
| EP | 09767263 | 4/2012 |
| EP | 2458552 | 5/2012 |
| EP | 2458560 | 5/2012 |
| GB | 2312120 | 10/1997 |
| WO | WO 01/26050 | 4/2001 |
| WO | 02/28087 | 4/2002 |
| WO | WO 02/28087 | 4/2002 |
| WO | WO 2009/154951 | 12/2009 |

OTHER PUBLICATIONS

Liang et al: "United Snakes image analysis software" Computer Vision, 1999. The Proceedings of the Seventh IEEE International Conference on Kerkyra, Greece Sep. 20-27, 1999, Los Alamitos, CA, USA,IEEE Comput. Soc, US, vol. 2, Sep. 20, 1999, pp. 933-940.*
Portions of prosecution history of U.S. Appl. No. 12/154,991, Sep. 24, 2009, Pettigrew, Daniel, et al.
Updated portions of prosecution history of U.S. Appl. No. 12/154,989, Sep. 24, 2009, Pettigrew, Daniel, et al.
Portions of prosecution history of U.S. Appl. No. 12/154,990, Sep. 24, 2009, Pettigrew, Daniel, et al.
International Preliminary Report on Patentability for PCT/US2009/045094, Nov. 30, 2010 (issuance date), Apple Inc.
International Search Report and Written Opinion for PCT/US2009/045094, Jan. 28, 2010 (mailing date), Apple Inc.
Author Unknown, "Adobe Photoshop 5.0 Limited Edition, Chapter 4: Making Color and Tonal Adjustments," Adobe Photoshop 5.0 User Guide, Jan. 1, 1998.
U.S. Appl. No. 12/433,872, filed Apr. 30, 2009, Warner, Peter.
Preliminary Amendment of U.S. Appl. No. 12/154,989, Aug. 15, 2008, Pettigrew, Daniel, et al.
PCT/US2009/045094, May 22, 2009 (filing date), Apple Inc.
PCT Invitation to Pay Additional Fees with Partial Search Results for PCT/US2009/045094, Nov. 25, 2009 (mailing date), Apple Inc.
Mortensen, Eric N., et al., "Interactive Segmentation with Intelligent Scissors," Graphical Models and Image Processing, Sep. 1998, pp. 349-384, vol. 60, No. 5, Academic Press, Duluth, MA, US.
Author N/A, "Adobe Photoshop 5.0 User Guide, Chapter 7—Selecting", Adobe Photoshop 5.0 User Guide, Month N/A, 1998, pp. 137-164, Adobe Systems Incorporated.
Liang, J., et al., "United Snakes", Computer Vision, 1999, The Proceedings of the Seventh IEEE International Conference on Kerkyra, Greece, Sep. 20-27, 1999, pp. 933-940, vol. 2, Sep. 1999 , IEEE Computer Society.
Yin, Li, et al., "Lazy Snapping", ACM Transactions on Graphics, Jan. 2004, pp. 303-308, vol. 23, No. 3, ACM, New York, NY, US.
Updated portions of prosecution history of U.S. Appl. No. 12/154,989, Aug. 5, 2011, Pettigrew, Daniel, et al.
Updated portions of prosecution history of U.S. Appl. No. 12/154,991, Jul. 25, 2011, Pettigrew, Daniel, et al.
Portions of prosecution history of EP09767263.8, May 11, 2011 (mailing date), Apple Inc.
McInerney, Tim, "SketchSnakes: Sketch-line initialized Snakes for efficient interactive medical image segmentation," Apr. 9, 2008, pp. 331-352, ScienceDirect.
Updated portions of prosecution history of U.S. Appl. No. 12/154,990, Sep. 6, 2011, Pettigrew, Daniel, et al.
Dawood, Mohammad, et al., "Reliable Dual-Band Based Contour Detection: A Double Dynamic Programming Approach," ICIAR 2004, Sep. 29-Oct. 1, 2004, pp. 544-551, Springer-Verlag, Berlin Heidelberg.
U.S. Appl. No. 12/154,989, filed May 28, 2008, Pettigrew, Daniel et al.
U.S. Appl. No. 12/154,990, filed May 28, 2008, Pettigrew, Daniel et al.
U.S. Appl. No. 12/154,991, filed May 28, 2008, Pettigrew, Daniel et al.
A. Orzan et al. "Diffusion Curves: A Vector Representation for Smooth-Shaded Images," ACM Transactions on Graphics (Proceedings of SIGGRAPH 2008), Aug. 2008, vol. 27, Issue 3.
A. Orzan et al. "Diffusion Curves: A Vector Representation for Smooth-Shaded Images," Screenshots of Online Video, http://artis.imag.fr/Publications/2008/OBWBTS08/, NPL Date Unknown.
Biafore, Bonnie. "Visio 2003 Bible," Wiley Publishing, Inc., Indianapolis, Indiana, Month N/A, 2004; ISBN: 0-7645-5724-6; Table of Contents: pp. XIX to XXXV; p. 30; p. 612.
Updated portions of prosecution history of U.S. Appl. No. 12/154,989, Jun. 14, 2012, Pettigrew, Daniel, et al.
Updated portions of prosecution history of U.S. Appl. No. 12/154,990, May 10, 2012, Pettigrew, Daniel, et al.
Portions of prosecution history for EP12156769, Apr. 26, 2012 (mailing date), Apple Inc.
Portions of prosecution history for EP12156770, Apr. 26, 2012 (mailing date), Apple Inc.
Kang, Hyung Woo, et al., "Enhanced lane: interactive image segmentation by incremental path map construction," Graphical Models, Sep. 1, 2002, pp. 282-303, vol. 64, No. 5, Elsevier, San Diego, CA, USA.
Rother, Carsten, et al., "GrabCut—Interactive Foreground Extraction using Graph Cuts," Proceedings of the ACM SIGGRAPH, Month Unknown, 2004, pp. 309-314, ACM, New York, USA.
Updated portions of prosecution history of U.S. Appl. No. 12/154,991, Apr. 10, 2012, Pettigrew, Daniel, et al.
Updated portions of prosecution history of U.S. Appl. No. 12/154,990, Mar. 29, 2012, Pettigrew, Daniel, et al.
Updated portions of prosecution history of EP09767263, Apr. 30, 2012 (mailing date), Apple Inc.
European Search Report for EP11188901, Feb. 22, 2012 (mailing date), Apple Inc.
Acton, Scott T., "Multigrid Anisotropic Diffusion," IEEE Transactions on Image Processing, Mar. 1998, vol. 7, No. 3, pp. 280-291, IEEE.
Algazi, V. Ralph, et al. "Preprocessing for Improved Performance in Image and Video Coding," Proceedings of the Spie, Month N/A, 1995, 11 pages, vol. 2564, SPIE, Bellingham, VA, USA.
Author Unknown, "Using Adobe Flash CS4 Professional," Month Unknown, 2008, 474 pages, Adobe Systems Incorporated, San Jose, California, USA.
Author Unknown, "Adobe Director 11: User Guide," Month Unknown, 2008, 498 pages, Adobe Systems Incorporated, San Jose, California, USA.
Author Unknown, "Adobe Premiere Pro CS3: User Guide," Month Unknown, 2007, 455 pages, Adobe Systems Incorporated, San Jose, California, USA.
Black, Michael J., et al., "Robust Anisotropic Diffusion," IEEE Transactions on Image Processing, Mar. 1998, vol. 7, No. 3, pp. 421-432, IEEE.
Choi, Euncheol, et al., "Deblocking Algorithm for DCT-Based Compressed Images Using Anisotropic Diffusion," IEEE International Conference on Acoustics, Speech, and Signal Processing, Apr. 6-10, 2003, pp. III-717-III-720, IEEE, New York, NY, USA.
Dumitras, Adriana, et al., "An Automatic Method for Unequal and Omni-Directional Anisotropic Diffusion Filtering of Video Sequences," Proceedings of IEEE International Conference on Acoustics, Speech and Signal Processing, May 17-21, 2004, pp. III-317-III-320, Montreal, Canada.

Farid, Hany, "Fundamentals of Image Processing", Month Unknown, 2008, pp. 1-72. http://www.cs.dartmouth.edu/farid/tutorials/fip.pdf.

Fischl, Bruce, et al., "Adaptive Nonlocal Filtering: A Fast Alternative to Anisotropic Diffusion for Image Enhancement," IEEE Transactions on Pattern Analysis and Machine Intelligence, Jan. 1999, pp. 42-48, vol. 21, No. 1, IEEE Inc., New York, USA.

Kopilovic, Ivan, et al., "Non-linear Scale-Selection for Image Compression Improvement Obtained by Perceptual Distortion Criteria," Proceedings of the International Conference on Image Analysis and Processing, Month Unknown, 1999, pp. 197-202, Venice, Italy.

Ling, Jian, et al., "Smoothing Low-SNR Molecular Images Via Anisotropic Median-Diffusion," IEEE Transactions on Medical Imaging, Apr. 2002, pp. 377-384, vol. 21, No. 4, IEEE.

Mortensen, Eric N., et al., "Intelligent Scissors for Image Composition," Computer Graphics Proceedings (SIGGRAPH), Aug. 6-11, 1995, pp. 191-198, IEEE, New York, USA.

Perona, P., "Anisotropic Diffusion Processes in Early Vision," Proceedings of the IEEE Multidimensional Signal Processing Workshop, Month Unknown, 1989, 1 page, Pacific Grove, CA, USA.

Sziranyi, Tamas, et al., "Anisotropic Diffusion as a Preprocessing Step for Efficient Image Compression," Proceedings of the International Conference on Pattern Recognition, Month Unknown, 1998, 3 pages, Brisbane, Australia.

Torkamani-Azar, F., et al., "Image Recovery Using the Anisotropic Diffusion Equation," IEEE Transactions on Image Processing, Nov. 1996, pp. 1573-1578, vol. 5, No. 11, IEEE.

Tsuji, Hiroyuki, et al., "A Nonlinear Spatio-Temporal Diffusion and Its Application to Prefiltering in MPEG-4Video Coding," Proceedings of the International Conference on Image Processing, Sep. 2002, pp. 1-85-1-88, vol. 2 of 3, IEEE, New York, NY, USA.

Wang, Jue, et al., "Soft Scissors: An Interactive Tool for Realtime High Quality Matting," ACM Transactions on Graphics, Jul. 2007, pp. 9-1-9-6, vol. 26, No. 3, ACM, New York, NY, USA.

You, J., et al., "A Robust and Real-Time Texture Analysis System Using a Distributed Workstation Cluster," Proceedings of International Conference on Acoustic, Speech, and Signal Processing, May 1996, pp. 2207-2210, Atlanta, GA, USA.

Updated portions of prosecution history of U.S. Appl. No. 12/154,991, Oct. 25, 2011, Pettigrew, Daniel, et al.

Updated portions of prosecution history of U.S. Appl. No. 12/154,989, Dec. 5, 2011, Pettigrew, Daniel, et al.

Updated portions of prosecution history of U.S. Appl. No. 12/154,990, Dec. 29, 2011, Pettigrew, Daniel, et al.

Updated portions of prosecution history of EP09767263, Oct. 31, 2011, Apple Inc.

U.S. Appl. No 12/154,990, mailed Mar. 29, 2012, Pettigrew, Daniel, et al.

U.S. Appl. No. 12/154,991, mailed Sep. 24, 2009, Pettigrew, Daniel, et al.

* cited by examiner

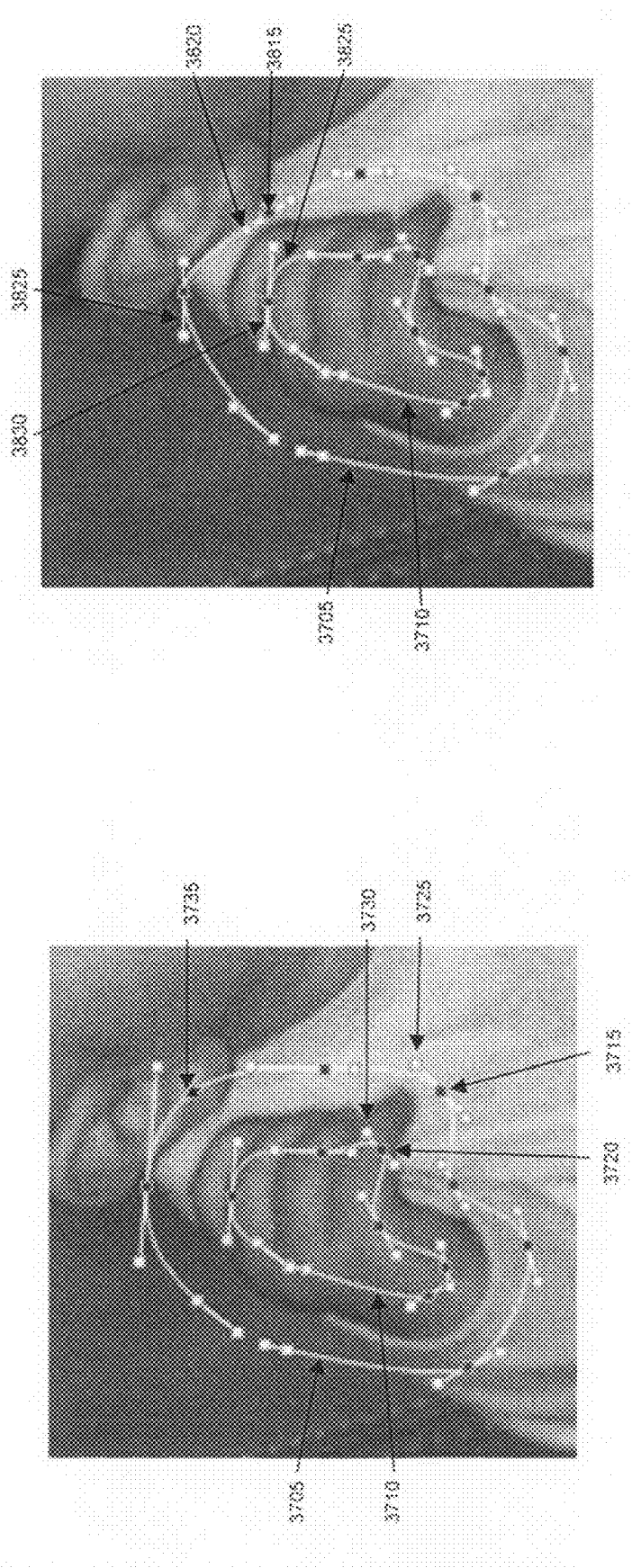

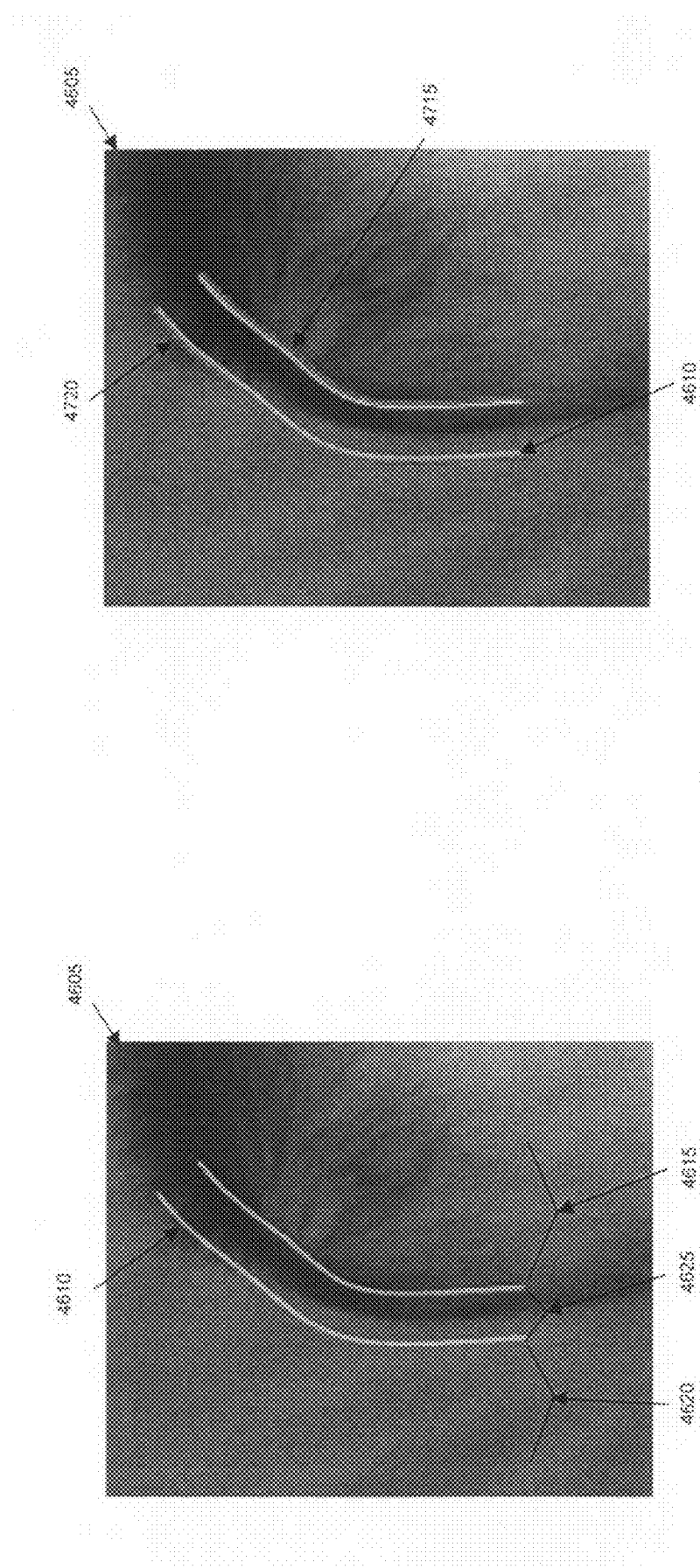

DEFINING A BORDER FOR AN IMAGE

CROSS REFERENCE TO RELATED APPLICATIONS

This Application is related to the following applications: U.S. patent application Ser. No. 12/154,989, filed May 28, 2008, now published as U.S. Publication No. 2009/0297031; U.S. patent application Ser. No. 12/154,990, filed May 28, 2008, now issued as U.S. Pat. No. 8,280,171; and U.S. patent application Ser. No. 12/154,991, filed May 28, 2008, now published as U.S. Publication No. 2009/0297035.

FIELD OF THE INVENTION

The invention is directed towards image editing. Specifically, the invention is directed towards defining a border for an image.

BACKGROUND OF THE INVENTION

Image editing applications (as well as video and other media editing applications) provide users with the ability to modify digital images from their original state. Often a user will want to modify the color properties of an entire image, or more commonly, a selection of an image. For example, a user might want to increase the saturation in a selection to make the color more intense and thereby cause that selection stand out more in the image. Other color properties a user might want to change include hue, luminosity, etc. Modification of the color properties of a selection will be referred to as color correction.

In order to modify a selection of an image, a user must first be provided with a tool for defining the selection they want to modify. Some prior art selection tools base the selection on a color selected by a user. A user can specify (by selecting from a color palette or by clicking on a point in an image) what color they want to select, and the selection tool will define a selection as all pixels in the image within a threshold of the selected color. However, in some cases a user will only want to select some of the pixels of the selected color (e.g., if there are multiple faces in an image and a user wants to highlight one of the faces). Further, sometimes a desired selection will include multiple colors (e.g., a head with skin, hair, eyes, etc.).

Other prior art selection tools allow a user to draw a border around the area of the image the user wants to select for color correction. However, doing so is often a very difficult process as the border of the selection is defined by the exact movement of the cursor. This requires a user to move very slowly and carefully through the image. Therefore, there is a need for a selection tool that allows a user to move more quickly through the image yet still defines a border in the image in the appropriate location.

A further shortcoming of such prior art selection tools is the inability to correct a mistake. A user of such selection tools must be able to start at the beginning of a desired border and move a cursor all the way to the desired endpoint without making a mistake. If a mistake is made, the user must start the selection process over. This can be a very frustrating process for the user, especially if the border the user attempts to draw is long, and the user has to make multiple attempts to draw the border. Therefore, there is a need for a selection tool that allows a user to correct mistakes when attempting to define a border in an image.

A third shortcoming of the above prior art selection tools is that they define a border that does not allow for a natural transition from foreground to background. Some tools do not create a hard edge between a selection and the rest of the image, but apply a simple softening of the edge of a selection. However, these tools do not create the softening effect based on an intelligent algorithm that accounts for the actual nature of the border. When attempting to select an area such as a head with hair, it is nearly impossible to trace out every hair, but the ability to keep the hairs in the foreground is a useful feature. Furthermore, even at borders that are easier to select, an intelligent transition from the foreground to background that is specific to the border may be desirable. Therefore, there is a need for a user to be able to define an area as a transition section, and to determine the size and shape of the transition section. In addition, there is a need to be able to define an intelligent transition from foreground to background for a selection.

SUMMARY OF THE INVENTION

Some embodiments of the invention provide a method that defines a border as a cursor scrolls over an image. In some embodiments, an image-editing application identifies the edges of an image as the application loads the image for display and editing. Some embodiments apply a de-noise algorithm to the image before identifying the edges, such that only the most relevant edges of the image are maintained.

Some embodiments use the edges to define a border for the image. For instance, in some embodiments, the method (1) identifies edges in the vicinity of a cursor that is moved across the image, and (2) snaps the defined border to the identified edges in the vicinity. In some of these embodiments, the method displays a search window in which it searches for edges near the cursor. Some embodiments vary the size of the search window based on the speed of the cursor moving over the image. The faster the cursor movement, the larger the search window in some embodiments.

Some embodiments draw the defined border as a series of segments with points in between the segments. Some embodiments also receive input to delete a part of the defined border while the border is being defined. In some embodiments, the input to delete a part of the border is a cursor movement back over the previously defined border past at least one of the points on the border.

Some embodiments use the defined border to perform image-editing operations, such as color correction of a portion of an image or cutting out (i.e., cropping) a portion of an image, as well as other image-editing operations (e.g. adding textures and other effects, etc.). To assist in such operations, some embodiments generate a tunnel about the defined border. In some embodiments, the tunnel has a constant set width, with either side of the tunnel an equal distance from the border. In other embodiments, the tunnel's width is varied to avoid self-intersection. The method receives modifications to the tunnel after the tunnel is generated, in some embodiments. The modifications of some embodiments include changes to the width of the tunnel and modifications to the shape of one or both sides of the tunnel.

As mentioned above, some embodiments use the tunnel to perform image-editing operations. For instance, some embodiments use the tunnel to generate a foreground to background transition in an image. To implement this transition, some embodiments sample pixels on the exterior of the tunnel, and determine an alpha value for pixels inside the tunnel based on the sample pixels. The alpha values are determined based on an algorithm that compares image values of the sampled pixels to the image values of the pixels on the interior of the tunnel.

BRIEF DESCRIPTION OF THE DRAWINGS

The novel features of the invention are set forth in the appended claims. However, for purpose of explanation, several embodiments of the invention are set forth in the following figures.

FIG. 37 illustrates the tunnel of FIG. 36 with several control points for modifying the tunnel.

FIGS. 38 and 39 illustrate the use of the control points to modify the tunnel of FIG. 36.

FIG. 46 illustrates a tunnel on a section of an image.

FIG. 47 illustrates foreground and background sample pixels around the tunnel of FIG. 46.

DETAILED DESCRIPTION OF THE INVENTION

In the following description, numerous details are set forth for purpose of explanation. However, one of ordinary skill in the art will realize that the invention may be practiced without the use of these specific details.

I. Overview

Some embodiments of the invention provide a method that defines a border as a cursor scrolls over an image. In some embodiments, an image-editing application identifies the edges of an image as the application loads the image for display and editing. Some embodiments apply a de-noise algorithm to the image before identifying the edges, such that only the most relevant edges of the image are maintained.

Some embodiments use the edges to define a border for the image. For instance, in some embodiments, the method (1) identifies edges in the vicinity of a cursor that is moved across the image, and (2) snaps the defined border to the identified edges in the vicinity. In some of these embodiments, the method displays a search window in which it searches for edges near the cursor. Some embodiments vary the size of the search window based on the speed of the cursor moving over the image. The faster the cursor movement, the larger the search window in some embodiments.

Some embodiments draw the defined border as a series of segments with points in between the segments. Some embodiments also receive input to delete a part of the defined border while the border is being defined. In some embodiments, the input to delete a part of the border is a cursor movement back over the previously defined border past at least one of the points on the border.

Some embodiments use the defined border to perform image-editing operations, such as color correction of a portion of an image or cutting out a portion of an image. To assist in such operations, some embodiments generate a tunnel about the defined border. In some embodiments, the tunnel has a constant set width, with either side of the tunnel an equal distance from the border. In other embodiments, the tunnel's width is varied to avoid self-intersection. The method receives modifications to the tunnel after the tunnel is generated, in some embodiments. The modifications of some embodiments include changes to the width of the tunnel and modifications to the shape of one or both sides of the tunnel.

As mentioned above, some embodiments use the tunnel to perform image-editing operations. For instance, some embodiments use the tunnel to generate a foreground to background transition in an image. To implement this transition, some embodiments sample pixels on the exterior of the tunnel, and determine an alpha value for pixels inside the tunnel based on the sample pixels. Some embodiments determine the alpha value based on an algorithm that compares image values of the sampled pixels to the image values of the pixels on the interior of the tunnel.

Figure 1:
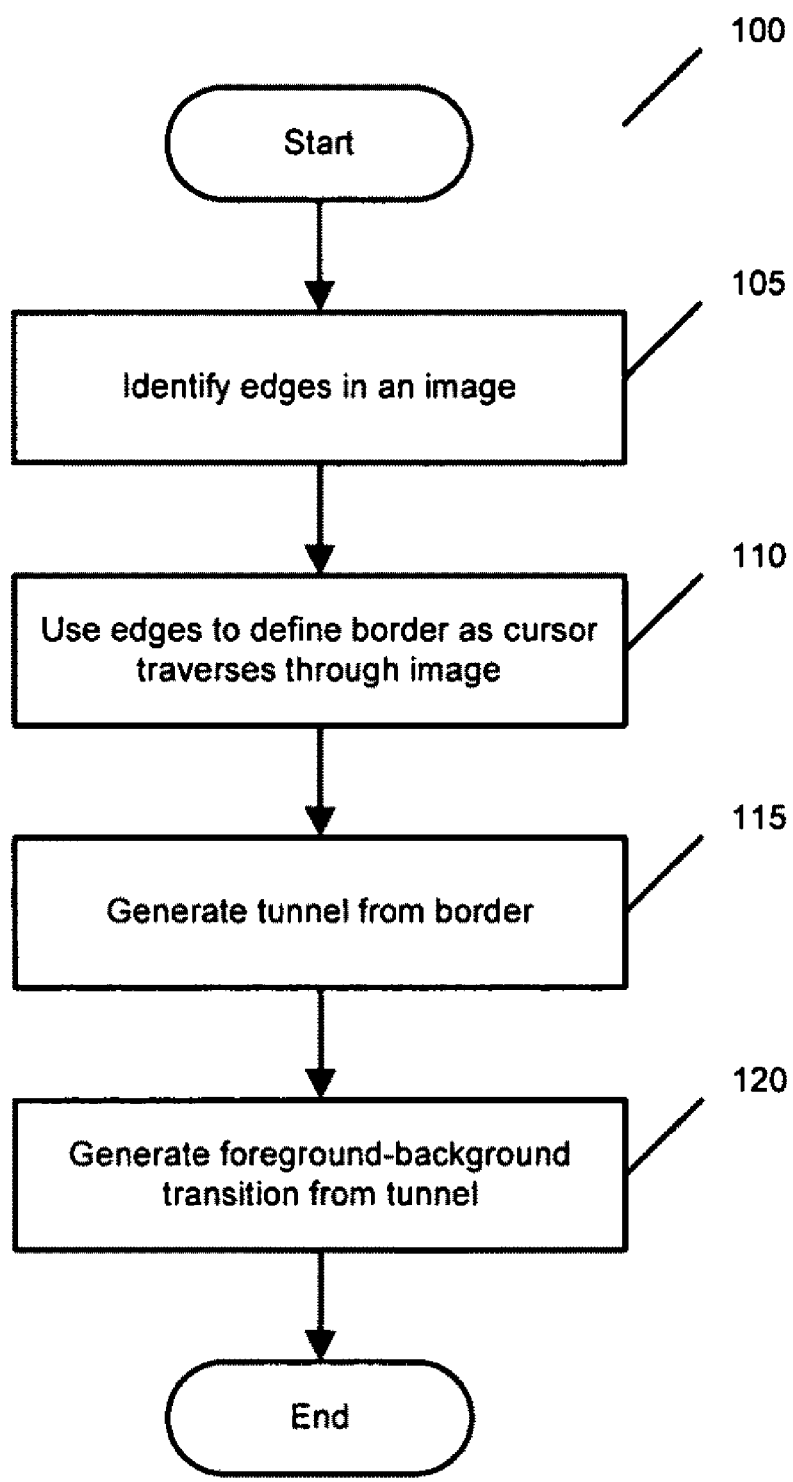
FIG. 1 conceptually illustrates an overall process performed by some embodiments of the invention.
Figure 2:
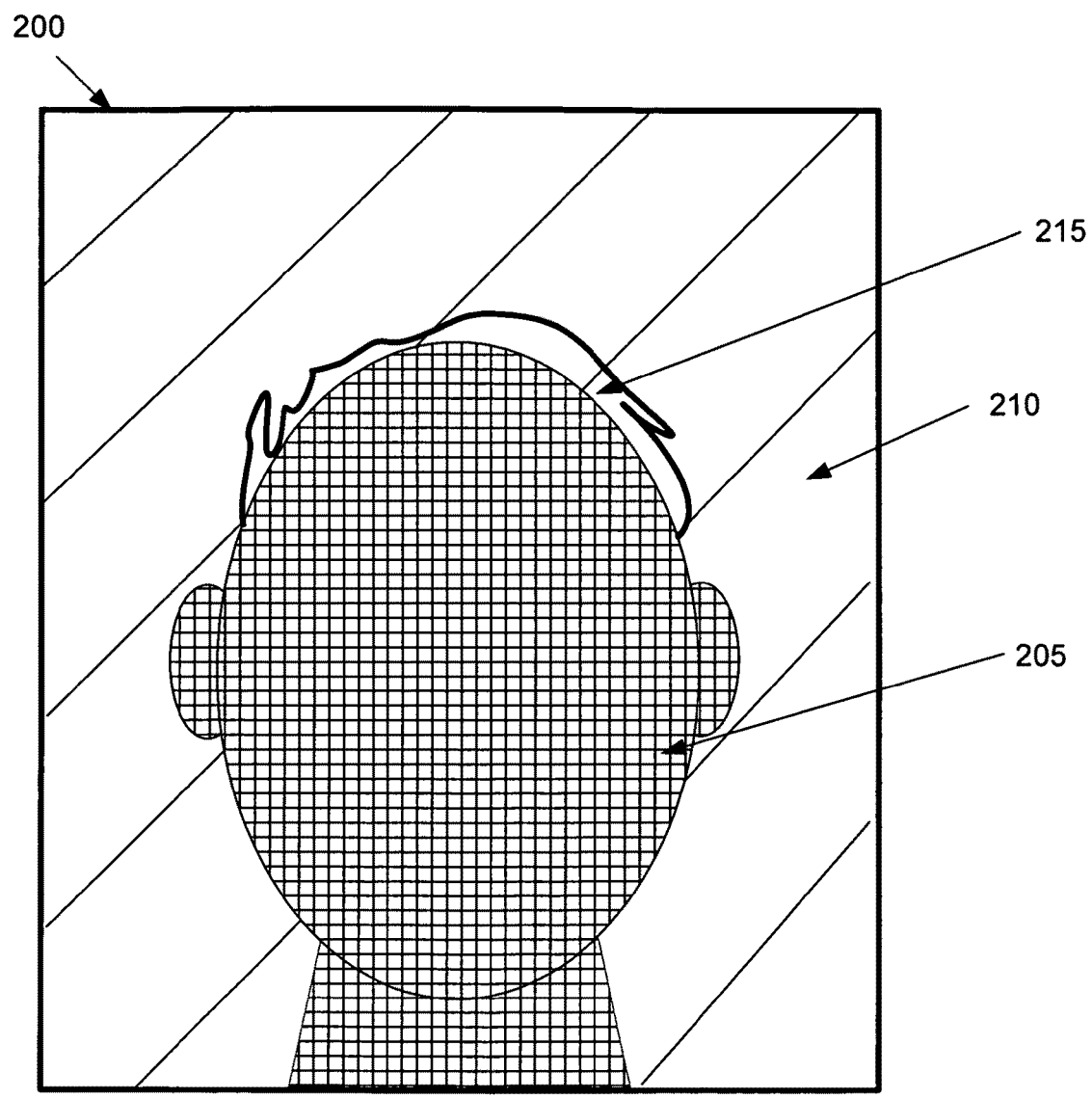
FIG. 2 illustrates an image with a foreground, background, and transition section.
Figure 3:
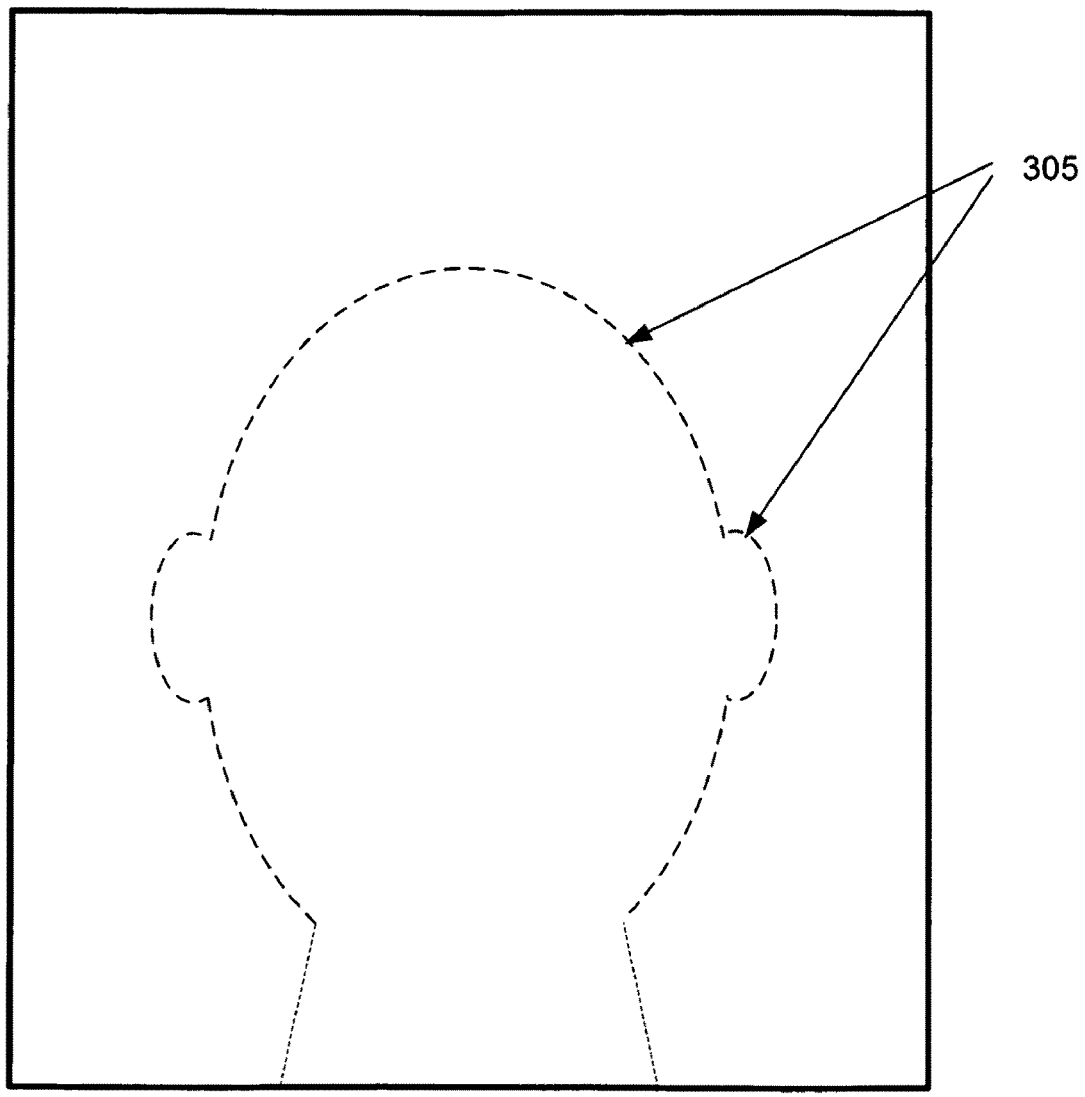
FIG. 3 illustrates identified edges of the image from FIG. 2.

FIG. 1 illustrates the overall process 100 performed by some embodiments of the invention. FIGS. 2-6 illustrate an example of the application of process 100 to an image 200. Image 200 includes foreground 205 (a face and neck), background 210, and transition section 215 (the hair area, which is mixed background and foreground). Process 100 starts at 105 by identifying edges in an image. Some embodiments apply a de-noise algorithm to the image before identifying the edges so as to identify only the most relevant edges. FIG. 3 illustrates the edges 305 of image 200 identified at 105. Some embodiments identify more or fewer edges; for example, some might identify one or more small edges in the hair area.

Figure 4:
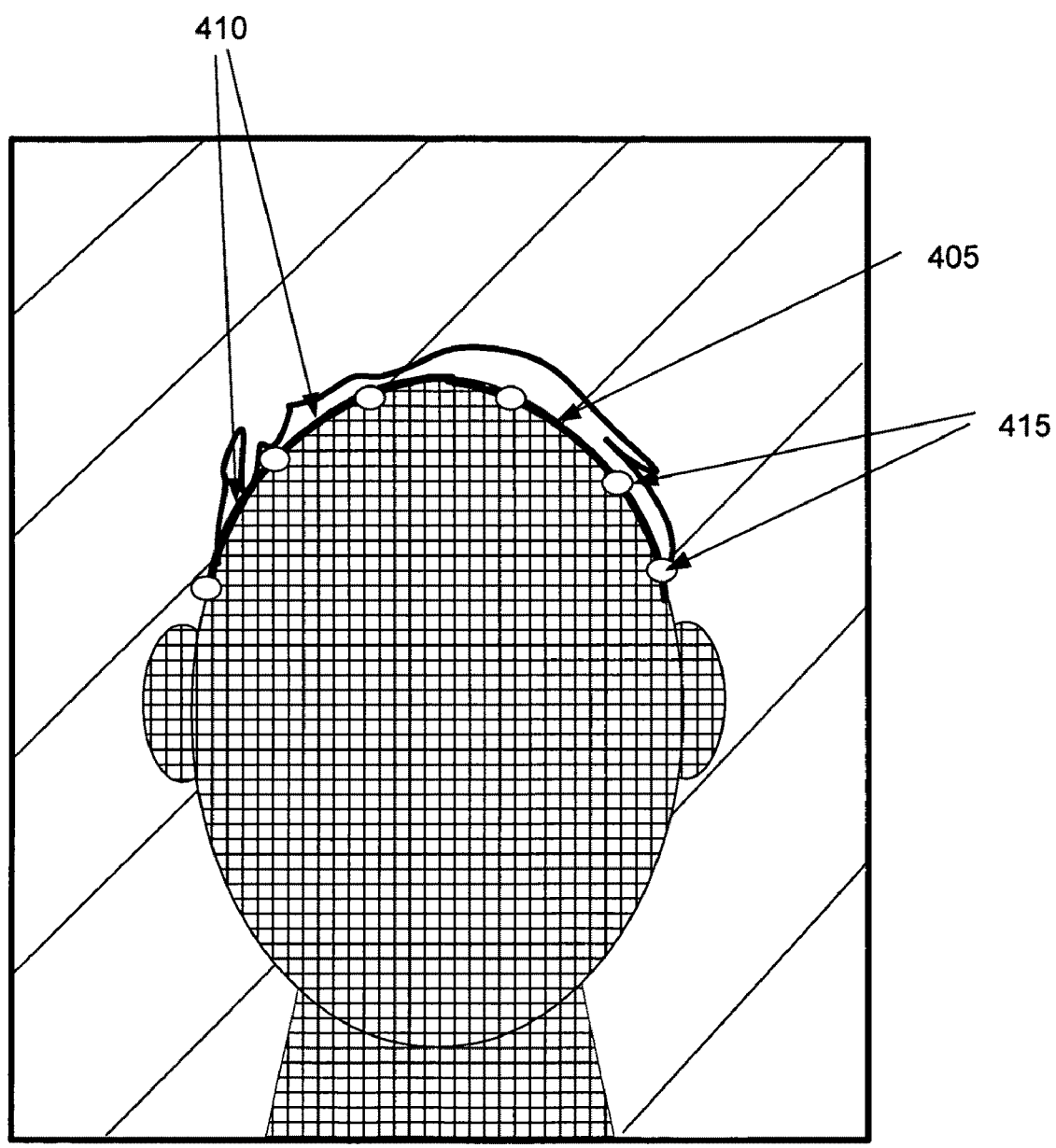
FIG. 4 illustrates a border defined for the image from FIG. 2.

After identifying the edges, the process uses the edges to define (at 110) a border of the image 200 as a cursor traverses over an image. FIG. 4 illustrates image 200 with defined border 405. The border 405 is defined along some of the edges 305, and includes segments 410 with points 415. Note that the border does not necessarily need to be selected along an entire continuous edge or be completely enclosing an object.

Figure 5:
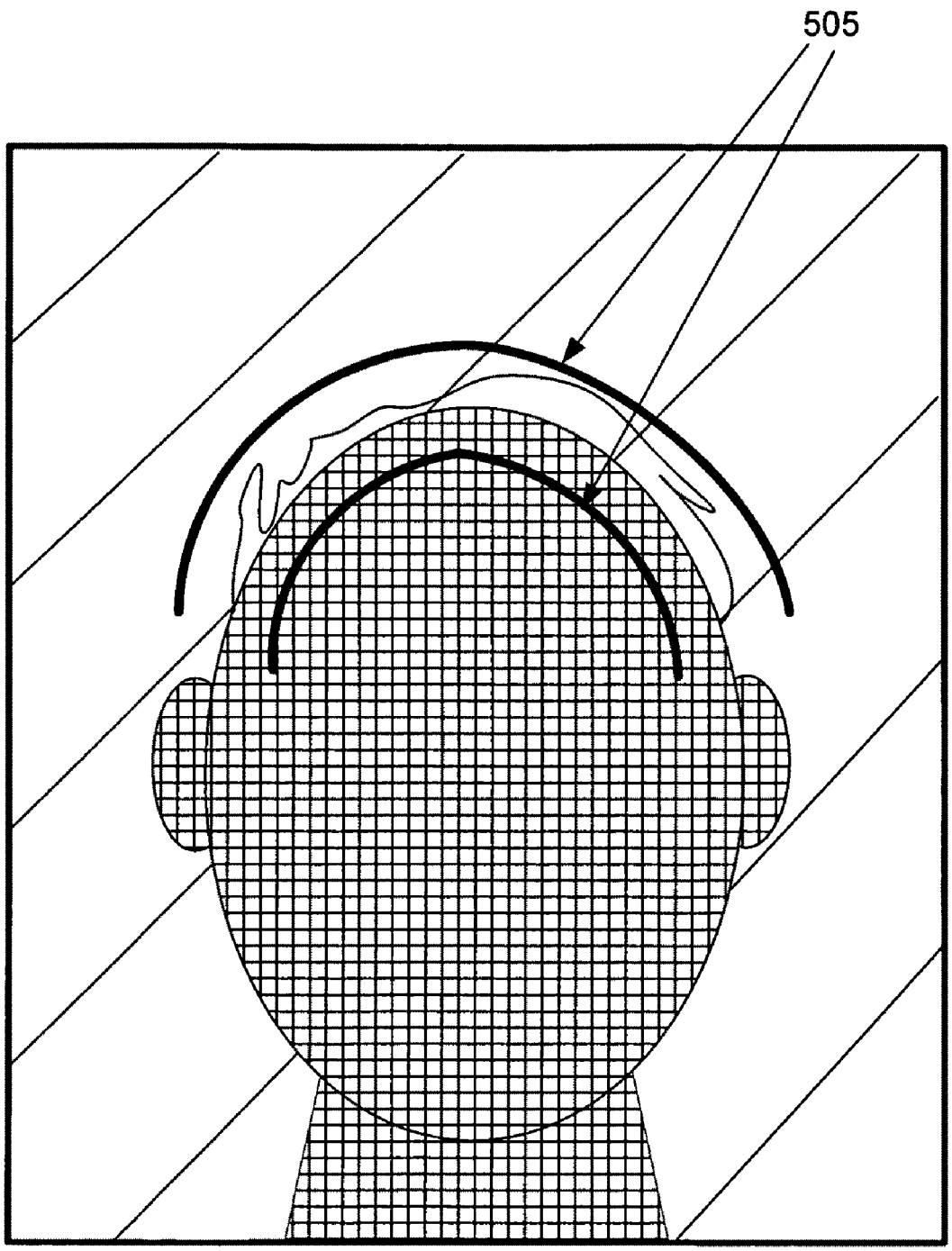
FIG. 5 illustrates a tunnel generated around the border from FIG. 4

From the border defined at 110, the process generates (at 115) a tunnel based on the defined border. FIG. 5 illustrates tunnel 505 on image 200. The tunnel 505 is generated such that both sides follow the curve of defined border 405. The tunnel 505 encloses the transition area 215. Some embodiments generate a tunnel such that one or both sides do not exactly follow the curve of the selected border. Some embodiments allow the tunnel to be modified after it is generated. The tunnel can be modified in some embodiments by changing the width of the tunnel (i.e., the distance between the two sides) or by altering the shape of one or both sides of the tunnel.

Figure 6:
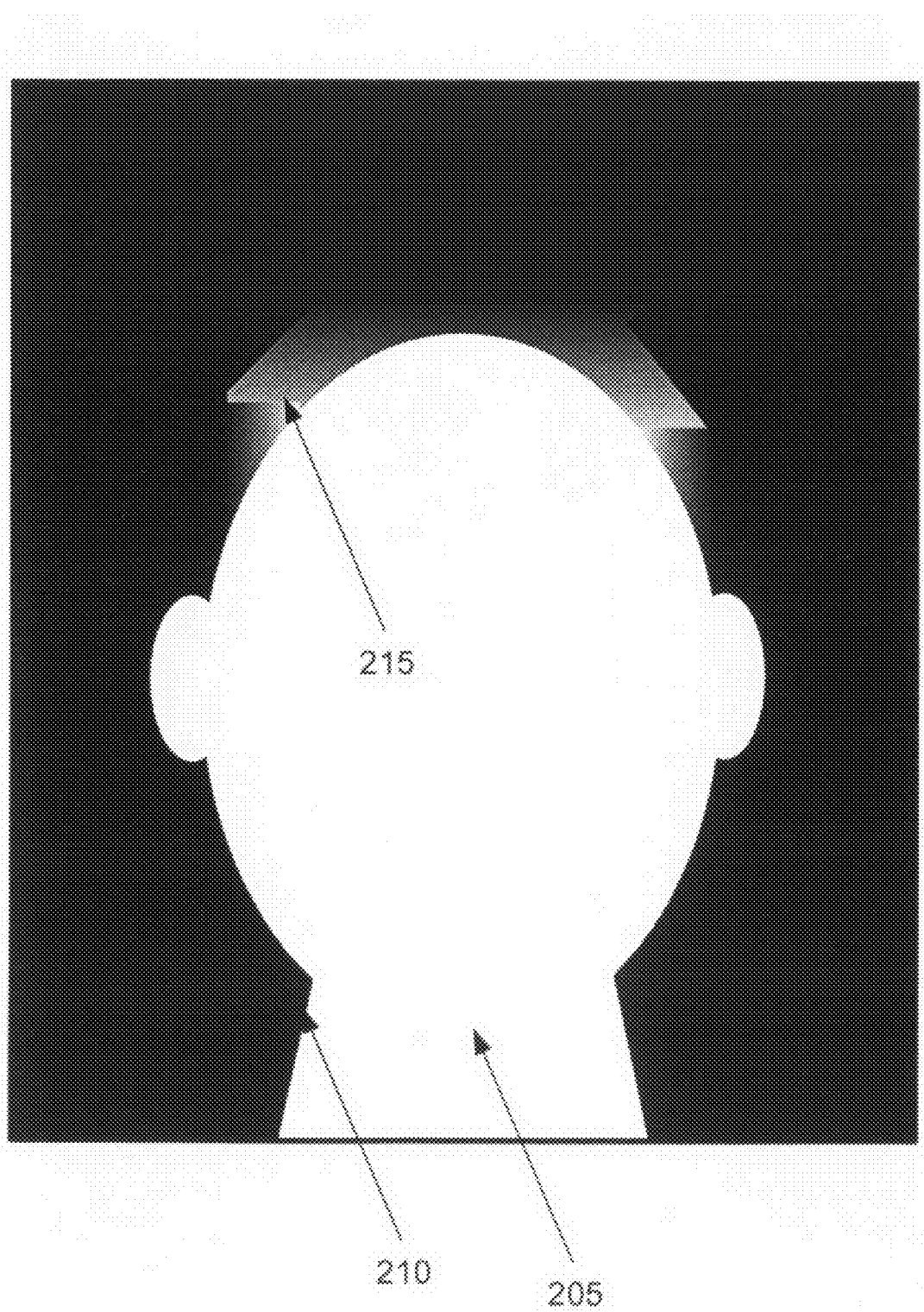
FIG. 6 illustrates a foreground to background transition generated within the tunnel of FIG. 5.

Based on the tunnel generated at 115, the process 100 generates a foreground to background transition. Some embodiments generate the foreground to background transition inside the tunnel based on the pixels outside the tunnel. Some embodiments define an alpha value for each pixel. The alpha values of some embodiments represent the extent to which a pixel is in the foreground. FIG. 6 illustrates alpha values for the pixels in image 200. The darker the pixel, the lower the alpha value. In FIG. 6, alpha values have been generated for the entire image in addition to the transition area inside the tunnel. Some embodiments use other methods of generating alpha values in some areas to complement the generation of alpha values from tunnels. FIG. 6 illustrates foreground area 205 which is entirely white, background area 210, which is entirely black, and transition area 215, which includes a gradation from white to black. The lightness of a particular pixel indicates the extent to which the particular pixel is in the foreground. Part of the area that was within the tunnel in FIG. 5 is entirely white because the pixels are similar in nature to those in the rest of the foreground. After generating the foreground to background transition, the process 100 ends.

Several more detailed embodiments of the invention are described in the sections below. Section II describes an image-editing application of some embodiments. Section III describes several embodiments for performing edge detection of an image. Next, Section IV describes several detailed embodiments for defining a border for an image. Section V describes several embodiments by which a tunnel is generated from a border. Section VI describes several embodiments for generating a foreground to background transition within an image. Next, Section VII describes some embodiments that perform color correction on an image. Finally, Section VIII describes a computer system with which some embodiments of the invention are implemented.

II. Image-Editing Application

Figure 7:
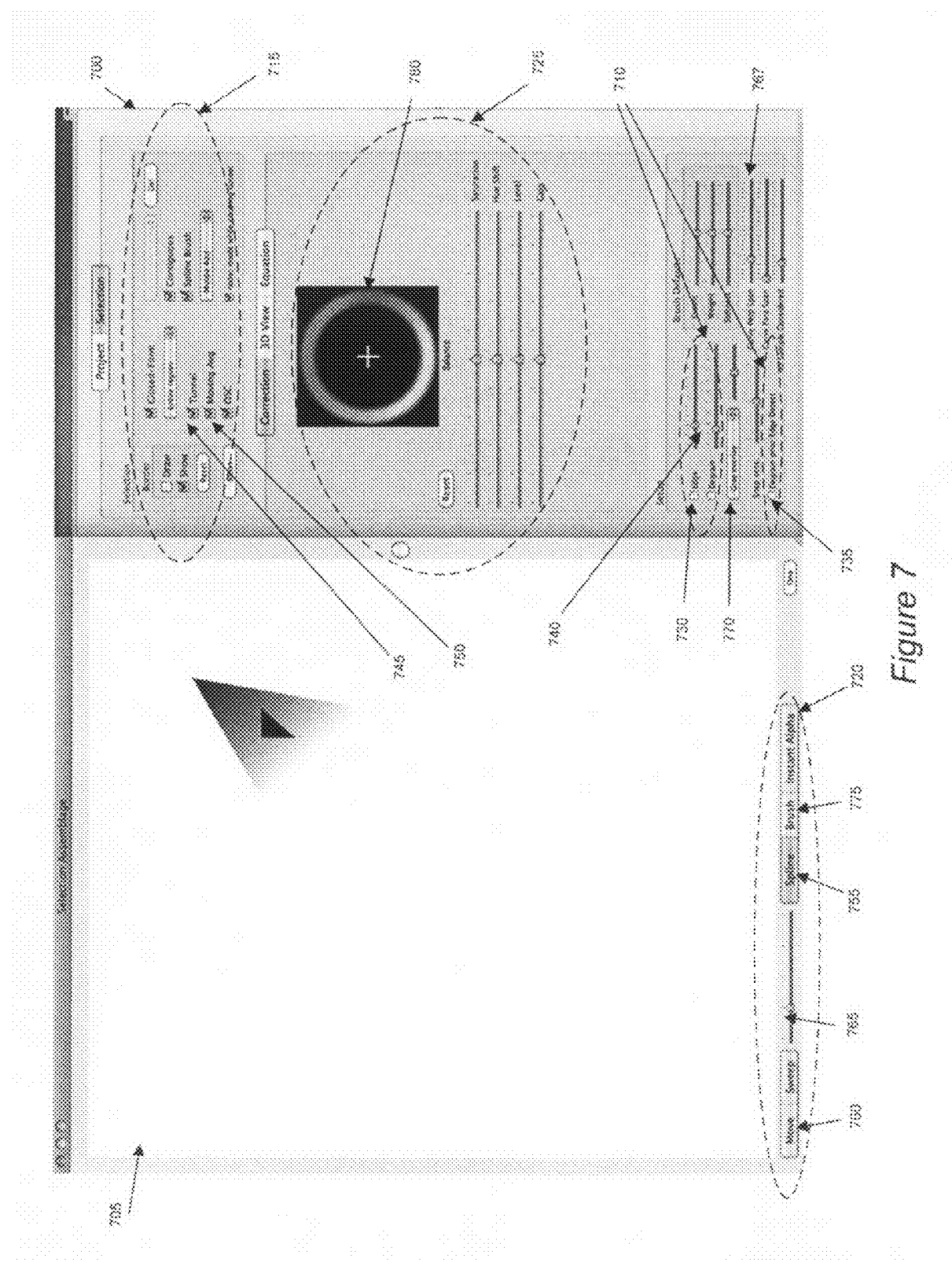
FIG. 7 illustrates an image-editing application of some embodiments.

FIG. 7 illustrates an image-editing application 700 in accordance with some embodiments of the invention. The image-editing application shown in FIG. 7 provides (1) a main display window 705 to display an image, (2) a set of edge detection tools 710, (3) a set of border definition tools 715, (4) a set of tunnel and alpha generation tools 720, and (5) a set of color correction tools 725. Some embodiments provide more image-editing tools than those shown, while others provide only a subset of the tools shown in FIG. 7.

The main display window 705 displays an image that can be edited using the image-editing tools 710-725. The set of edge detection tools 710 provides users with options for identifying edges in the image. The identified edges can be used for the definition of a border for the image. Some embodiments of the invention identify edges of an image as the image is loading and store the edges in memory for use in the subsequent definition of borders. The set of edge detection tools 710 of some embodiments includes a checkbox 730, labeled "Edge", that allows a user to re-identify the edges of a displayed image. In some embodiments, selection of the checkbox 730 causes the image-editing application to re-identify the edges and then display the image in an edge view. In the edge view, only the edges of the image are displayed in display window 705, rather than the actual image. Some embodiments also provide a user interface tool (e.g., a button, or a checkbox) that re-identifies the edges but does not cause the image-editing application to display the image in the edge view. Some embodiments do not allow a user to view the image in the edge view (but still are able to identify the edges of the image). Some embodiments also provide checkbox 735, labeled "Degrain prior Edge Detect", that when selected causes the image-editing application to apply a de-noise algorithm to the image before re-identifying edges. Other edge identification tools provided by some embodiments include sliders 740 that allow for users to alter parameters of the edge identification and de-noise algorithms. In some embodiments, the sliders 740 affect the sensitivity of the edge identification and de-noise algorithms. In other words, the sliders affect the likelihood that a potential edge will be identified. Some embodiments set the sensitivity of the edge identification and de-noise algorithms as defaults and do not provide sliders 740. Edge identification is described in detail in Section III.

The set of border definition tools 715 provides users with various options to use in order to define a border for the image by moving over the image in the display window 705 with a cursor. For example, some embodiments provide a checkbox 745, labeled "Tunnel", that allows a user to determine whether a tunnel will be generated around a border after the border is defined. Some embodiments provide a checkbox 750, labeled "Moving Avg", which allows a user to determine whether a search window will be displayed around the cursor while the user defines a border for the image. Definition of borders, including the definition and use of search windows is described in detail in Section IV.

The set of tunnel and alpha generation tools 720 allows users to (1) generate tunnels around defined borders, and (2) define, for each pixel in an image, the extent to which the pixel is in the foreground or background of the image. In some embodiments, the tunnel and alpha generation tools 720 include "Spline" button 755, which allows users of the image-editing application to define a border of an image in the display area 705 as a spline curve. From the defined border, some embodiments generate a tunnel as two sides around the defined border. The "Move" button 760 provided by some embodiments enables a user to view the sides of a generated tunnel as modifiable curves, and modify the sides. In some embodiments, the modifiable curves are bezier splines. The slider 765 provided by some embodiments enables a user to modify the width of a tunnel, either before or after the tunnel is generated. Tunnel generation is also described in further detail in Section V.

Some embodiments generate alpha values based on a tunnel. Some embodiments sample pixels around the tunnel in order to generate the alpha values. Some embodiments of the image-editing application provide a slider 767 that enables a user to modify the width of the area from which pixels are sampled. Once the alpha values are generated, the image-editing application of some embodiments allows a user to toggle through different views that illustrate the alpha values in different ways. Some embodiments provide a drop-down menu 770 for selecting between the different views. Some embodiments provide a first view that illustrates the image in grayscale with the alpha value of a pixel denoted by the luminance of the pixel. Some embodiments provide a second view that overlays the alpha value of a pixel on the image. The overlay can be gray, red, blue, or green in some embodiments. Some embodiments provide a view that shows the image and any color correction based on the alpha. Alpha generation from a tunnel is discussed in detail below in Section VI. The image-editing application of some embodiments also provides a "Brush" button 775 that allows use of an alpha brush in conjunction with the alpha values. In some embodiments, the alpha brush can define pixels as either foreground, background, or somewhere in between, while in other embodiments the alpha brush can only define pixels as foreground pixels.

The set of color correction tools 725 provides a user with the ability to edit digital images. Color correction tools allow users to edit a selected section of a digital image. In some embodiments, the selected section for editing is selected using the other sets of tools such as border definition tools 715 and alpha generation tools 720. Color correction tools 725 allow users to modify features of a selected section such as the hue and saturation of the pixels. Some embodiments include color wheel 780 that enables a user to shift the color of a selection towards one color or another.

It is to be understood by one skilled in the art that some embodiments of the image-editing application may include the functionalities as described but associated with different UI tools than those described. For example, one skilled in the art would recognize that a UI tool allowing a user to determine whether to graphically display a search window need not be a checkbox labeled "Moving Avg", but could be a checkbox with a different label, a menu option, a selectable button, etc. Similarly, UI tools shown as selectable buttons could be checkboxes, menu options, or other types of UI tools.

The image-editing tools and processes that are described above and below can be incorporated into any image-editing application by way of a plug-in, applet, or direct function incorporated within the application itself. Accordingly, different image-editing applications, such as Apple Aperture®, Apple iPhoto®, Adobe Photoshop®, and Adobe Lightroom® may each implement one or more of the image-editing tools described herein. Additionally, the image-editing tools and processes described above and below can be incorporated within the functionality of any other application (e.g., video-editing applications, digital photo albums, etc.), or within an operating system (e.g., Microsoft Windows®, Apple Mac OS®, etc.).

III. Edge Identification

A. Pre-Computing Edges

Figure 8:
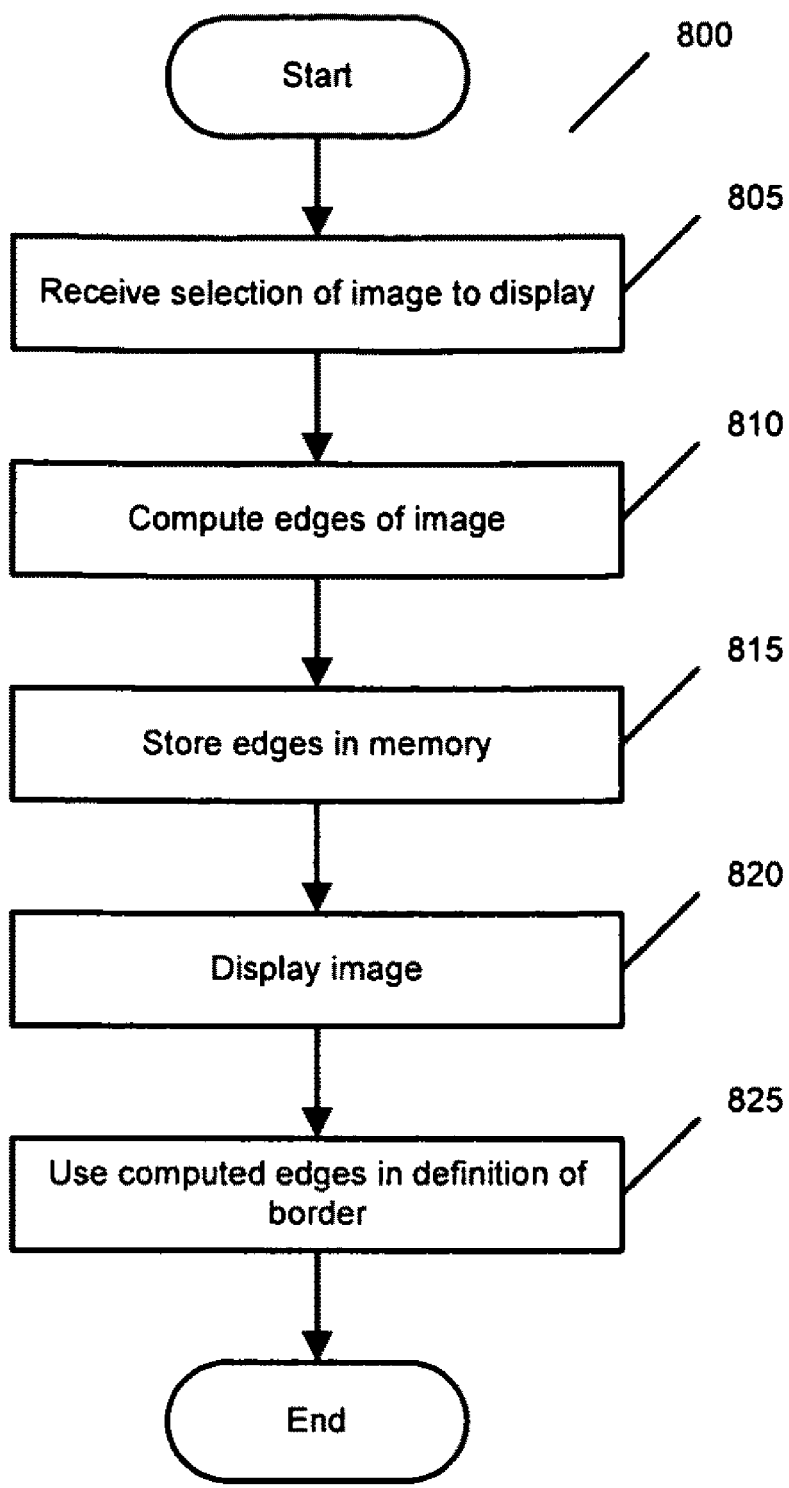
FIG. 8 illustrates a process that pre-computes edges of an image in accordance with some embodiments.
Figure 9:
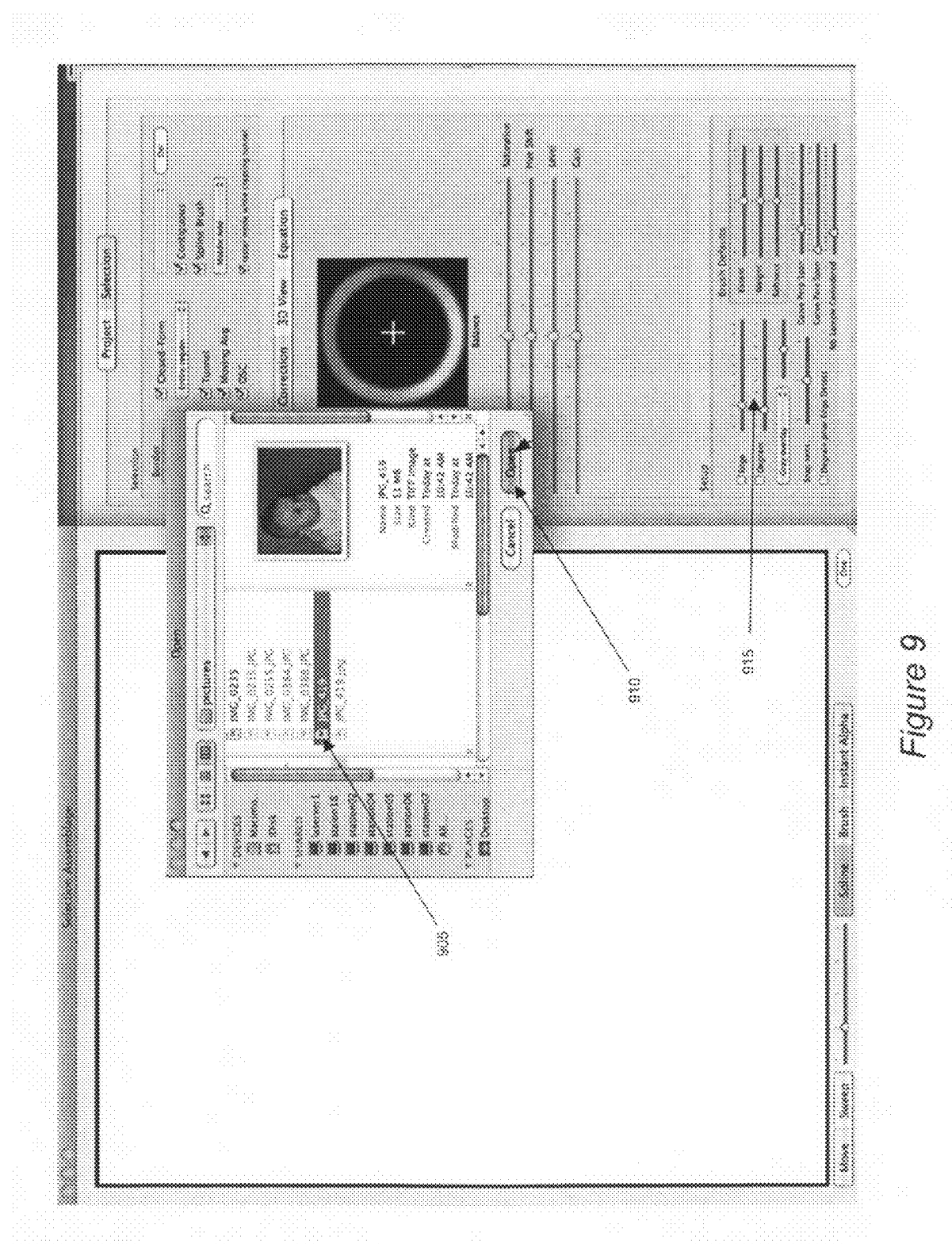
FIG. 9 illustrates the selection of an image file to open.

FIG. 8 presents a process 800 that pre-computes edges of an image in accordance with some embodiments of the invention. Process 800 is performed by an image-editing application in some embodiments. Process 800 begins when it receives (at 805) a selection of an image to display. In some embodiments, this selection is received by way of a user choosing to open an image. FIG. 9 illustrates a user selecting to open an image file 905. The user highlights the file name of image file 905 and clicks on "Open" button 910 in order to select to open the file in some embodiments.

After receiving the selection of an image to display, the process 800 then computes (at 810) the edges of the image. In some embodiments, the process computes the edges using the Canny edge detection algorithm or a variant thereof. In other embodiments, the process uses different algorithms to compute the edges. Parameters for the edge computation can be set in some embodiments by the use of sliders 915, which a user can modify before selecting to open the image. In some embodiments, the parameters modify the sensitivity of the edge detection algorithm. After computing the edges, the process stores (at 815) the edges in a memory of the computer on which the process is running. The edges can thus be accessed for other processes such as defining a border for the image.

Figure 10:
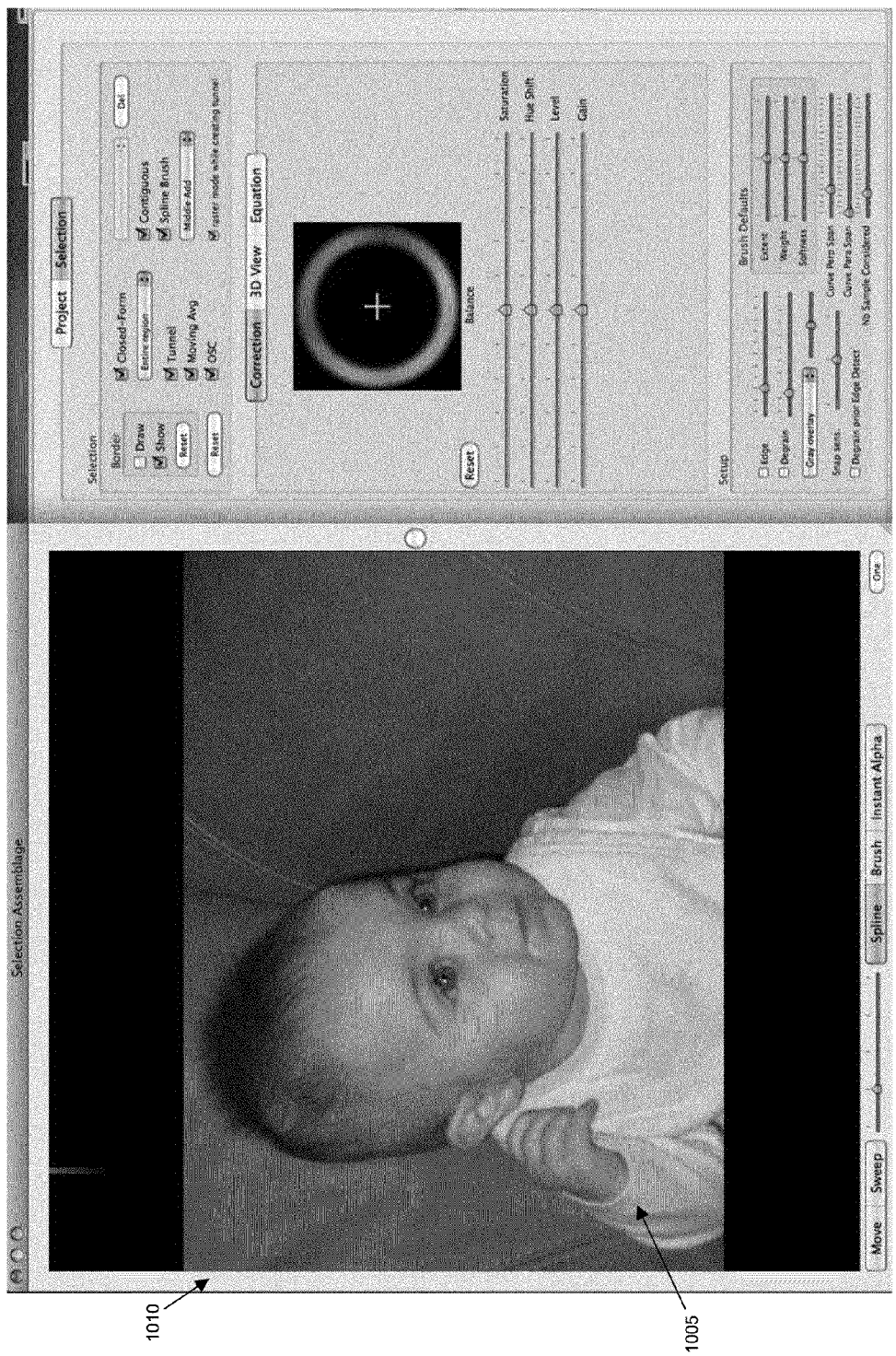
FIG. 10 illustrates the opened image.

At 820, after the edges are computed, the process displays the image in the display window. FIG. 10 illustrates the result of image file 905 being selected by a user. FIG. 10 illustrates image 1005 displayed in display window 1010. The edges of image 1005 are already computed before the image is displayed. At 825, the pre-computed edges are used in the definition of a border of the displayed image. In some embodiments, the border is snapped to the edges as the border is defined by a cursor moving over the image. Border definition using the pre-computed edges is described in detail in Section IV.

B. Identifying Only Relevant Edges

Figure 11:
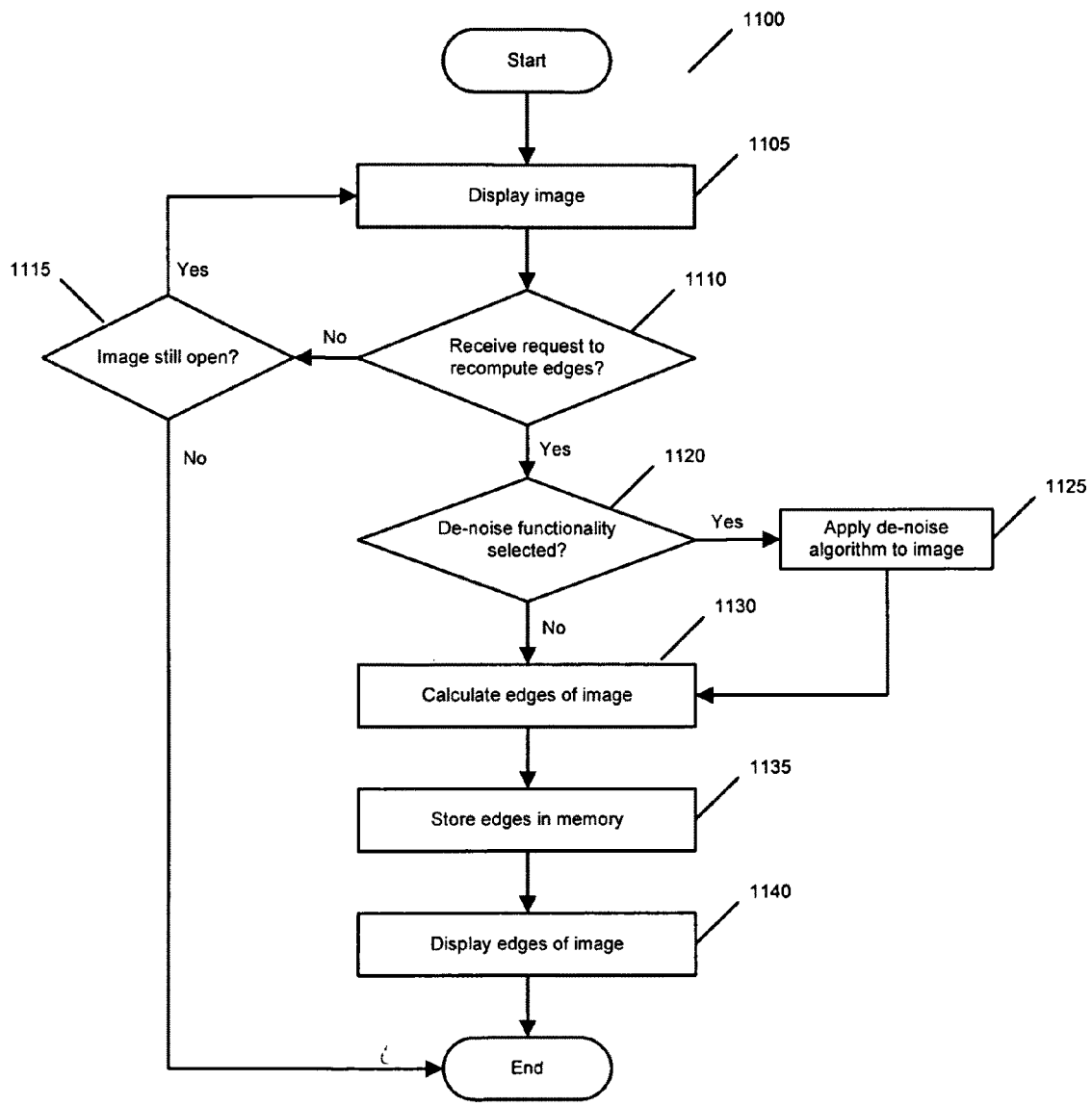
FIG. 11 illustrates a process of some embodiments that applies a de-noise algorithm to an image such that only the most relevant edges are identified.

FIG. 11 presents a process 1100 of some embodiments that applies a de-noise algorithm to an image so that only the most relevant edges are identified. Some edge detection algorithms will identify edges in images where there are not actually useful edges. For example, if an area of the image is cluttered with small and contrasting components, such as a shirt pattern, edge detection may detect many small and undesired edges in that area that a user would probably not want a border to snap to while defining the border. Process 1100 starts when an image is displayed at 1105. In some embodiments, the edges are calculated when the image is initially displayed, as described above by reference to process 800. At 1110, the process determines whether a request to recompute edges has been received. In some embodiments, a request to recompute edges is received when a user selects a user interface ("UI") tool that recomputes the edges of an image using an edge detection algorithm and displays the edges. Referring back to FIG. 7, checkbox 730 is such a UI tool in some embodiments. A user might wish to recompute edges after changing a parameter relating to the edge detection algorithm, such as by using one of the sliders 740. In some embodiments, the user can use one of the sliders to affect the sensitivity of the edge detection algorithm.

Figure 12:
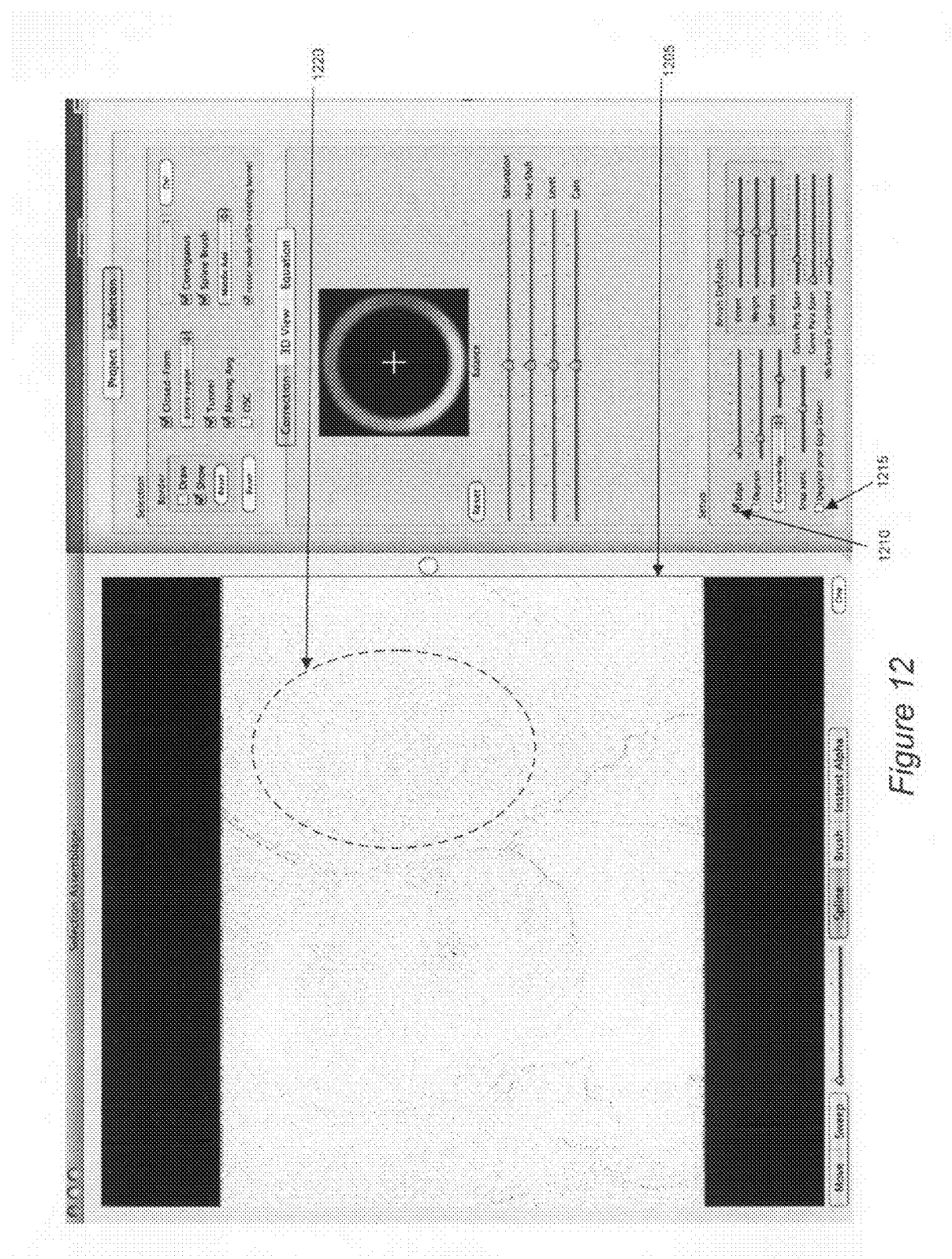
FIG. 12 illustrates the edges of an image without a de-noise algorithm applied.

If the process 1100 has not received a request to recompute edges, the process determines (at 1115) whether the image is still open. If the image is still open, the process returns to 1105 and continues displaying the image. If the image is not still open, process 1100 ends. If a user has closed the image, or opened a different image for editing, then the process would determine that the image is not still open. If, at 1110, the process determines that a request to recompute edges has been received, the process then determines (at 1120) whether a de-noise functionality is selected. In some embodiments, a user selects the de-noise functionality by selecting a UI tool such as checkbox 735. If the de-noise functionality is not selected, the process 1100 computes (at 1130) the edges of the image using the edge detection algorithm. In some embodiments, the process then displays (at 1135) the edges of the image. FIG. 12 illustrates the edges of image 1205. In FIG. 12, checkbox 1210 is selected in order to recompute and display the edges of image 1205. Checkbox 1215 is not selected, indicating that the de-noise functionality is not selected.

If the process determines (at 1120) that the de-noise functionality is selected, the process then applies (at 1125) a de-noise algorithm to the image. A de-noise algorithm is applied to an image before performing edge identification such that the edge identification algorithm will only compute the most relevant edges of the image. In some embodiments, the de-noise algorithm is a bilateral or anisotropic filtering algorithm. Such an algorithm blurs the image only where a low frequency texture exists. In other words, areas in which a sharp edge exists will be left alone, while areas of the image with no sharp edges will be blurred. This will result in the relevant (i.e. real) edges being maintained while the areas without relevant edges are blurred. Some embodiments allow a user to modify at least one parameter of the de-noise algorithm. For example, some embodiments provide a slider such as one of the sliders 740 of FIG. 7 for adjusting the sensitivity of the de-noise algorithm. After applying the de-noise algorithm to the image, the process then computes (at 1130) the edges of the image. Because the areas of the image not containing relevant edges are blurred with the de-noise algorithm, the edge detection algorithm is less likely to compute irrelevant (i.e. false) edges. The process 1100 then stores (at 1135) the edges in a memory of a computer on which the process is running.

Figure 13:
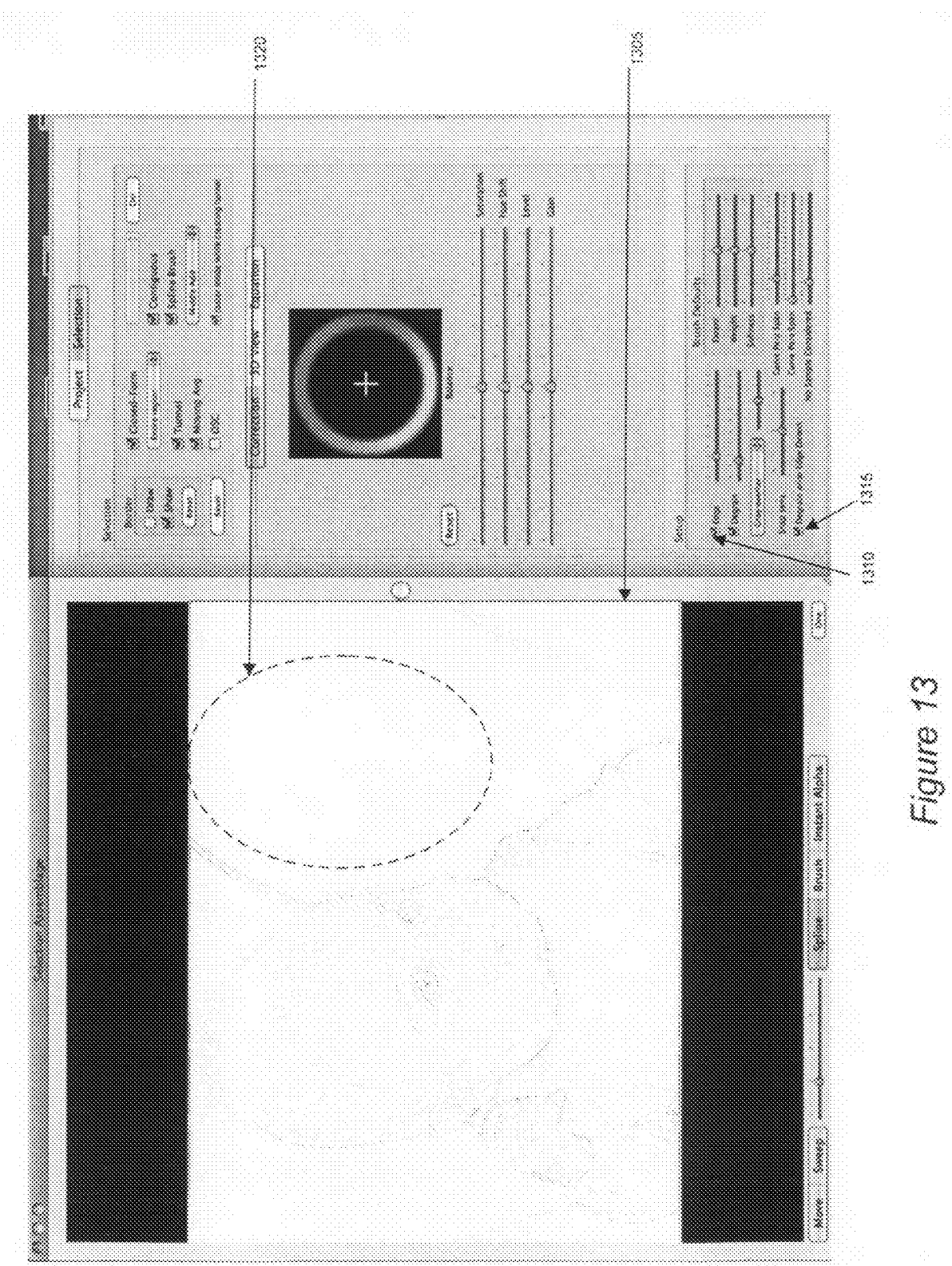
FIG. 13 illustrates the edges of the image with the de-noise algorithm applied.

After computing and storing the edges of the image, some embodiments display (at 1140) the edges of the image. FIG. 13 illustrates the edges of image 1305. In FIG. 13, checkbox 1310 is selected in order to recompute and display the edges of image 1305. Checkbox 1315 is also selected, indicating that the de-noise functionality is selected and that the de-noise algorithm was applied before the shown edges were computed. Comparing FIG. 12 and FIG. 13, it can be seen that area 1220 includes many small computed edges, whereas the corresponding area 1320 does not include any computed edges as a result of the de-noise algorithm having been applied. Overall, the edges of image 1305 are sharper and more defined than the edges of image 1205. Some embodiments do not display the edges of the image, but instead only compute the edges and store them in memory. Some embodiments include an option as to whether to display the edges when the edges are re-computed.

IV. Border Definition

Some embodiments of the invention allow a user to define a border for an image. In some embodiments, the border automatically snaps to the edges of the image. In some embodiments, by snapping the border to the edges it is meant that a segment of the border is automatically drawn along an edge of the image in the vicinity of a cursor moving over the image, as opposed to following the exact path of the cursor. In some embodiments, the edges are computed as described above in Section III. When the edges are pre-computed, the border snaps to the pre-computed edges, as opposed to computing edges as the cursor moves over the image to define the border.

A. Searching for Edges While Defining a Border

Some embodiments of the invention search for identified edges while defining a border for an image. Some embodiments define a search area around a cursor in which to search for identified edges. Some embodiments base at least one property of the search area on an attribute of the cursor. The property of the search area is the size of the search area in some embodiments. Other embodiments base the orientation or shape of the search area on the attribute of the cursor. In some embodiments the attribute is the speed of the cursor. Other embodiments base the property of the search area on other attributes of the cursor, such as the acceleration.

Figure 14:
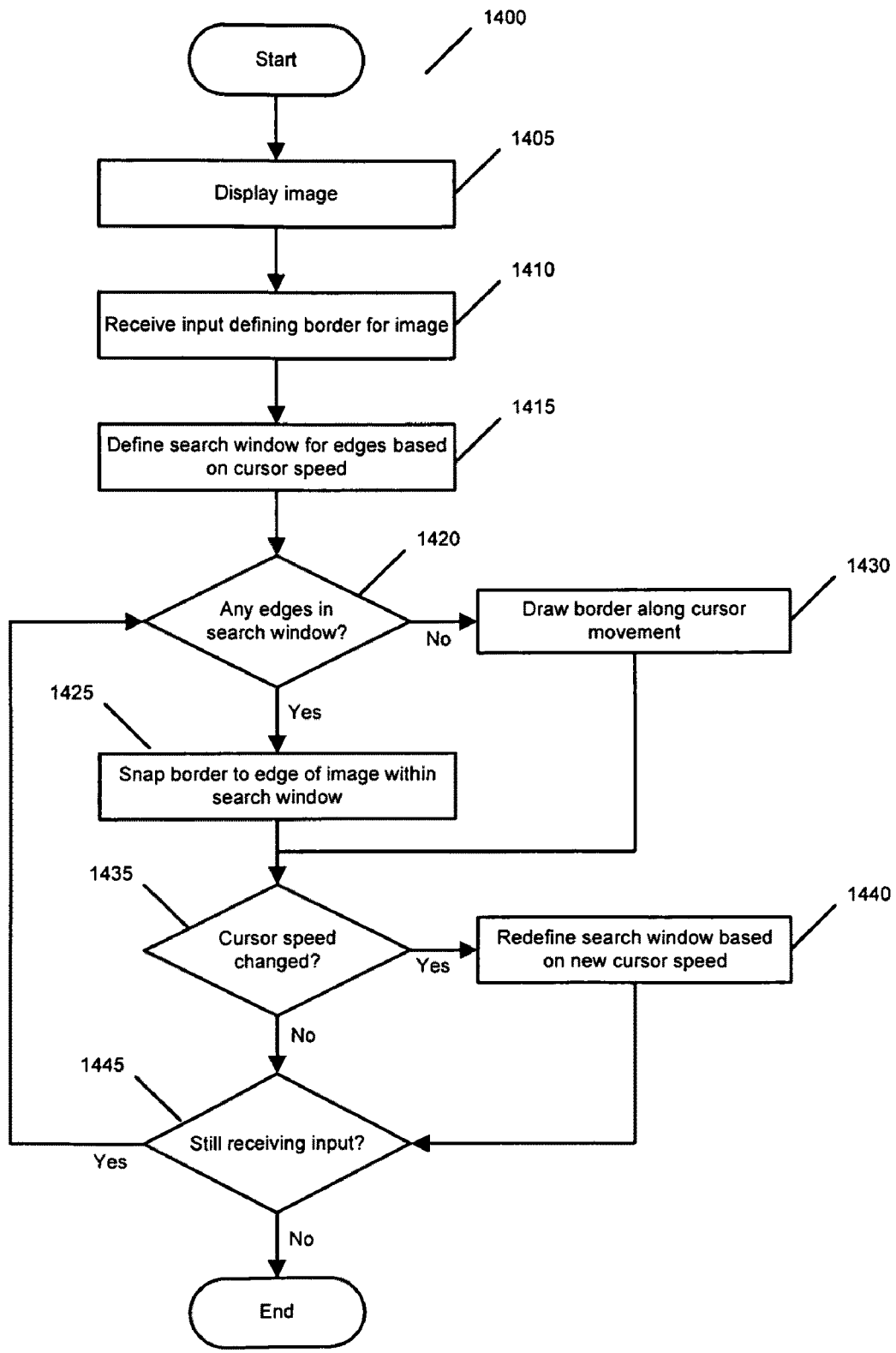
FIG. 14 illustrates a process of some embodiments for defining a border of an image.

FIG. 14 illustrates a process of some embodiments for defining a border for an image. The process begins by displaying (at 1405) an image. At 1410, the process receives input to define a border for the image. In some embodiments, the input is a user placing a cursor over a point in the image and clicking a mouse button. The user holds the mouse button down while moving the cursor to make the selection of the border in some embodiments. In other embodiments, the user clicks and releases a mouse button in order to begin the definition of the border.

At 1415, the process 1400 defines a search window for edges of the image based on the speed of the cursor. In some embodiments, the edges are pre-computed, with or without applying a de-noise algorithm, as described in Section III. The speed of the cursor is determined by how quickly the cursor moves over the image. In some embodiments, the process determines the speed based on pixels per unit of time, inches per unit of time, or other appropriate units for speed. The search window is used to search for edges to which the process automatically snaps the selected border. In some embodiments, snapping the border to an identified edge entails (1) identifying a second point along the edge in the vicinity of a first point (different than the second) over which the cursor is moving, and (2) drawing the border over the second point rather than having the border follow the movement of the cursor.

In some embodiments, the size of the search window is proportional to the speed of the cursor, such that if the cursor moves faster the search window is defined to be larger. This is a linear proportionality in some embodiments, while other embodiments use other relationships between the cursor speed and the search window size. Some embodiments define a proportional relationship over a range of search window sizes, but have a minimum and/or maximum search window size such that the search window is never too small (i.e., very close to zero) or too large (i.e., the entire image).

The shape of the search window is different in different embodiments. Some embodiments define a circular search window in which the radius of the circle is proportional to the speed of the cursor. Some embodiments, on the other hand, define a square search window in which the length of the sides of the square is proportional to the speed of the cursor. Some embodiments center the search window, whether circular, square, or other shape, at the point of the cursor. In some embodiments that center the search window at the cursor, the search window is not centered when the cursor is at the edge of the image. This allows for full utilization of the entire search window. Some embodiments use a search window that is not centered at the point of the cursor.

Figure 15:
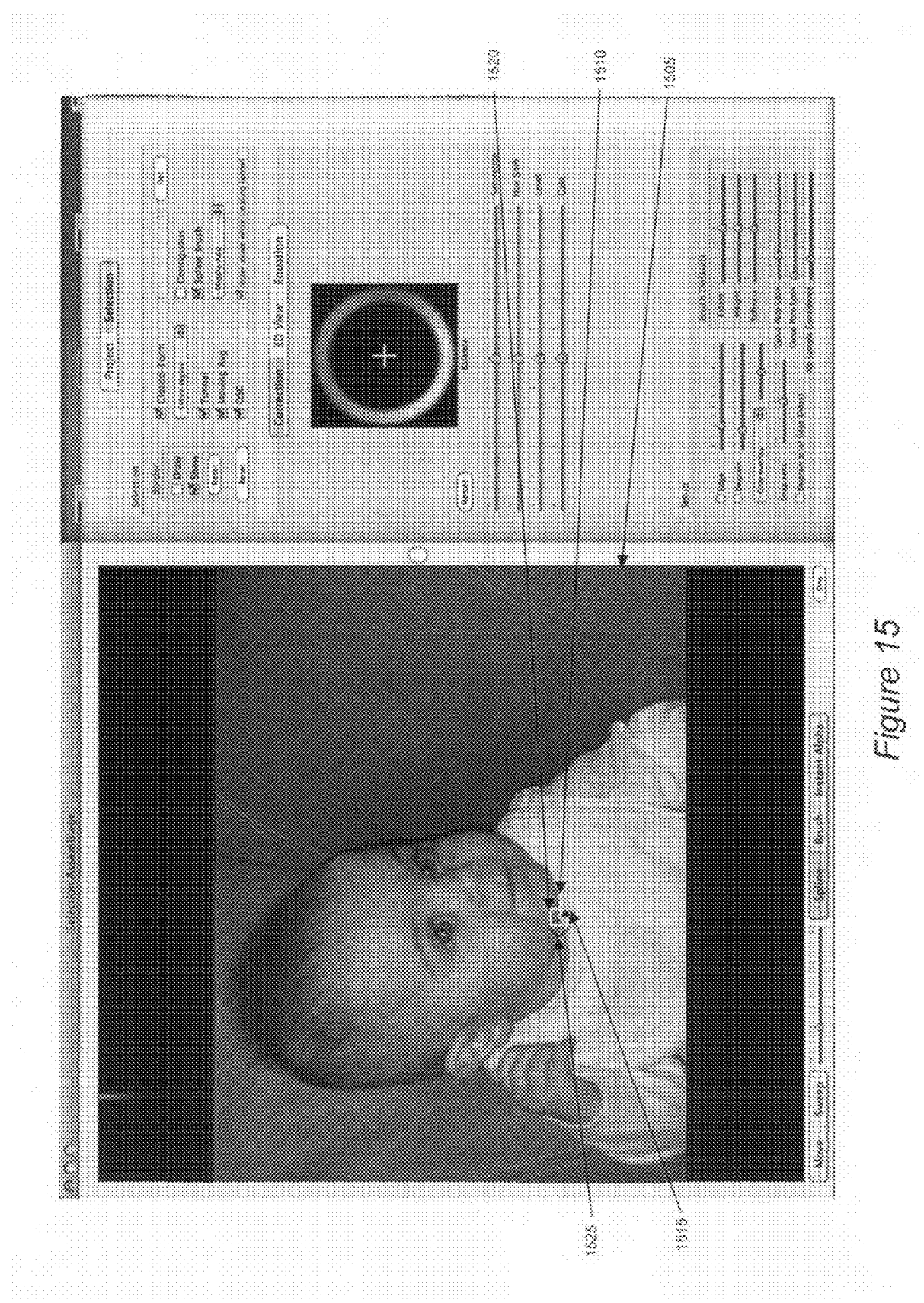
FIGS. 15 and 16 illustrate different size search windows of some embodiments for defining a border.

Some embodiments provide a graphical illustration of the search window for the user that allows the user to visualize the area in which the process is searching for edges. In some embodiments, an image-editing application provides an option to the user as to whether or not to display the graphical illustration. FIG. 15 illustrates an image-editing application 1500, an image 1505, a border 1510 that is being selected, a cursor 1515, and a search window 1520 with side length 1525. The search window 1520 indicates the search window in which the image-editing application searches for edges within the image 1505. The side length 1525 of box 1520 is related to the speed of the cursor 1515. In the embodiment illustrated in FIG. 15, the search window 1520 is square and centered about the cursor. As mentioned above, in other embodiments the search window can be shaped and centered differently. In FIG. 15, side length 1525 (and thus search window 1520) is relatively small because the cursor is moving slowly.

Figure 16:
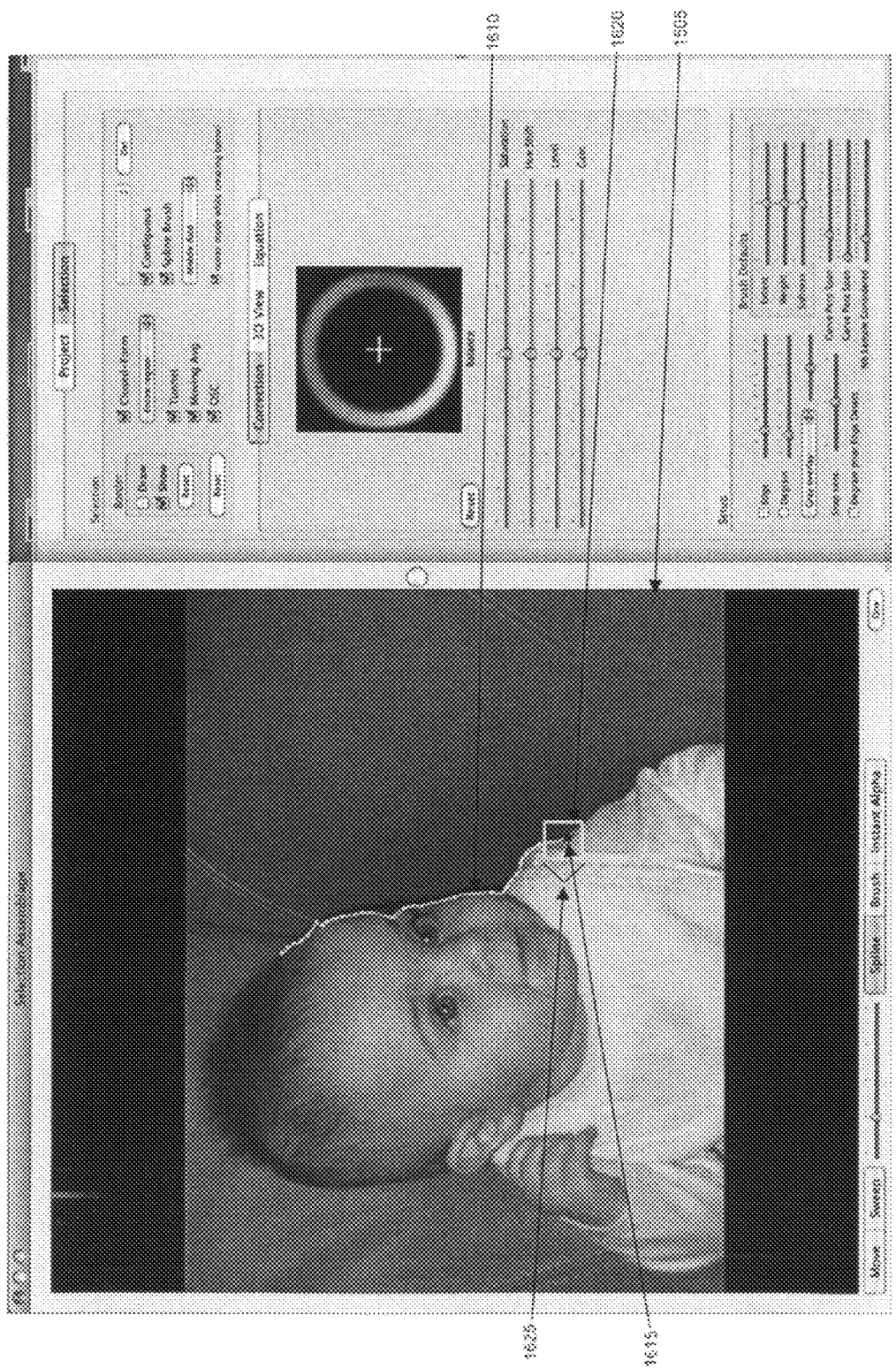

FIG. 16 illustrates the same image 1505, along with border 1610, cursor 1615, and search window 1620 with side length 1625. Side length 1625 (and thus search window 1620) is larger than the side length 1525 (and thus search window 1520) illustrated in FIG. 15. This is on account of the cursor 1615 moving faster than the cursor 1515. Because there are very few edges in the vicinity of cursor 1615, and the baby's shoulder against the background forms a very clean edge, a user is likely to be moving cursor 1615 more quickly than cursor 1515. The vicinity of cursor 1515 includes an edge at the bottom of the baby's chin, an edge where the baby's neck meets the bib, and an edge at the bottom of the stripe at the top of the bib. With more edges in the vicinity (i.e., the desired edge is not as clean an edge), a user is more likely to be moving cursor 1615 slowly so as to keep the cursor near the desired edge.

After defining a search window at 1415, the process 1400 determines whether any identified edges of the image are within the search window. If at least one identified edge is within the search window, the process automatically snaps (at 1425) the border to an identified edge within the search window. If more than one identified edge is found within the search window, some embodiments snap the border to the edge closest to the cursor. Some embodiments determine whether a previously defined segment of the border is along an edge, and then snap the border to that edge if the edge continues within the search window.

Figure 17:
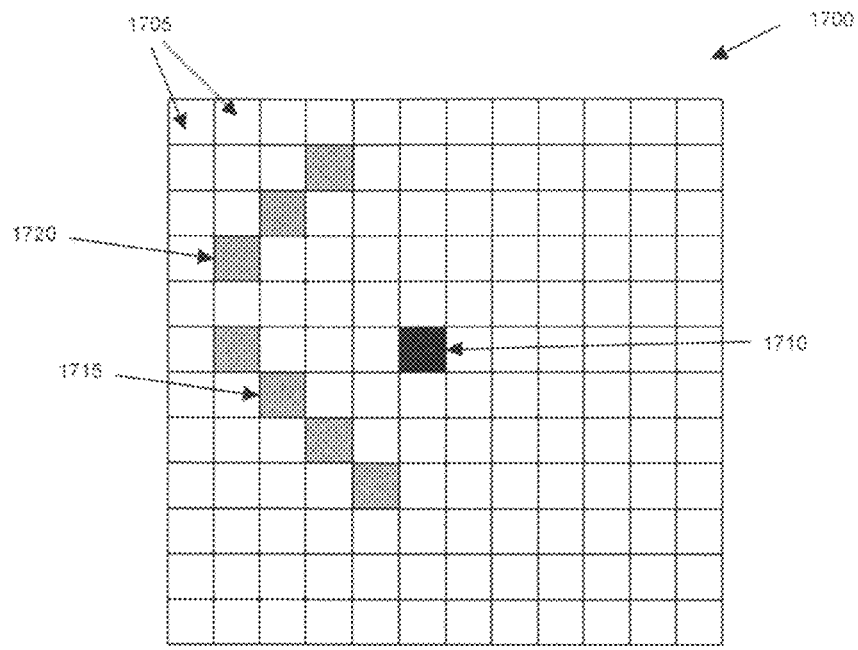
FIGS. 17-19 illustrate the edge searching process of some embodiments
Figure 18:
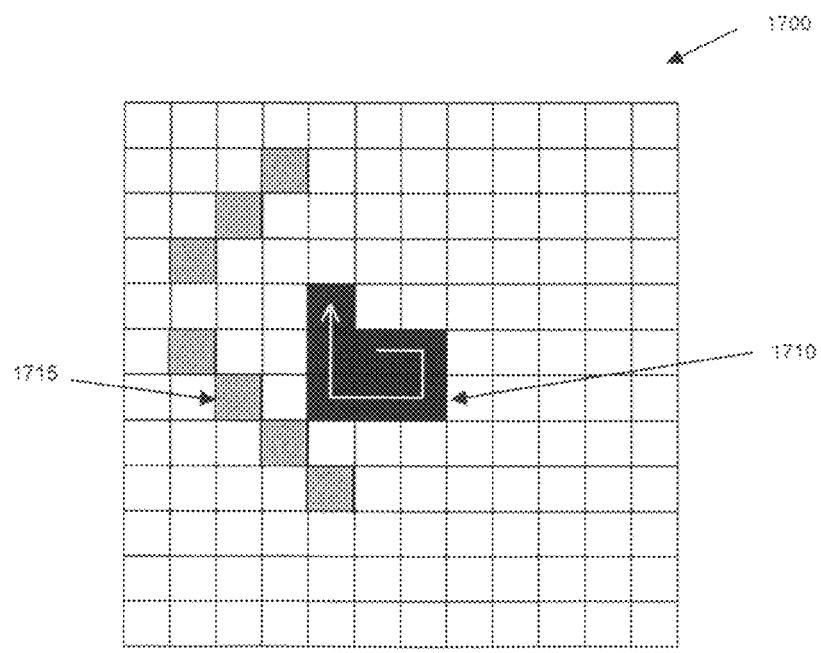
Figure 19:
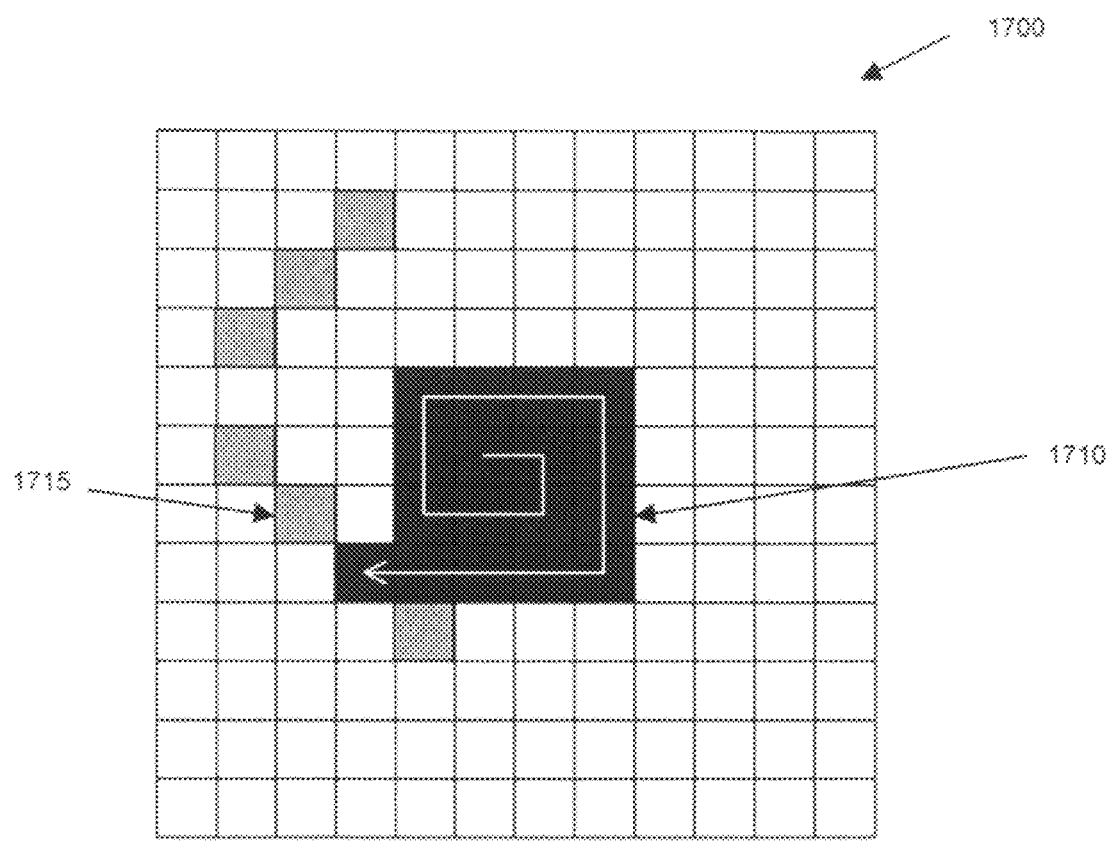

FIGS. 17-19 illustrate a searching process of some embodiments. FIG. 17 illustrates a search window 1700 comprising 144 pixels 1705 (a square search window with a side length of 12 pixels). Inside the search window are edges 1715 and 1720. Also illustrated is the searched area 1710. The embodiments illustrated in these figures use a spiraling area to identify the edge to which the border should be snapped. Once the spiral 1710 finds an edge, the process snaps the border to the found edge. In FIG. 17, the searched area 1710 is only one pixel. Because there is no edge that includes the pixel covered by 1710, the process continues searching. FIG. 18 illustrates the search area after seven pixels have been searched. The arrow inside the search area indicates the order in which the pixels were searched. At this point, the spiraling search area 1710 has still not yet come across an edge, and therefore continues searching. FIG. 19 illustrates the search area 1710 once it has found edge 1715. Because edge 1715 is the first edge found by search area 1710, the process snaps the border to edge 1715 in the illustrated embodiments. Thus, the illustrated embodiments would not snap the border to edge 1720, though some other embodiments might do so. In the illustrated embodiments, the search window indicates a maximum size to which the search area 1710 can grow. Some embodiments use a spiraling search area with a thickness of more than one pixel for faster searching. The search spiral is dependent on the size of the search window in some embodiments.

Figure 20:
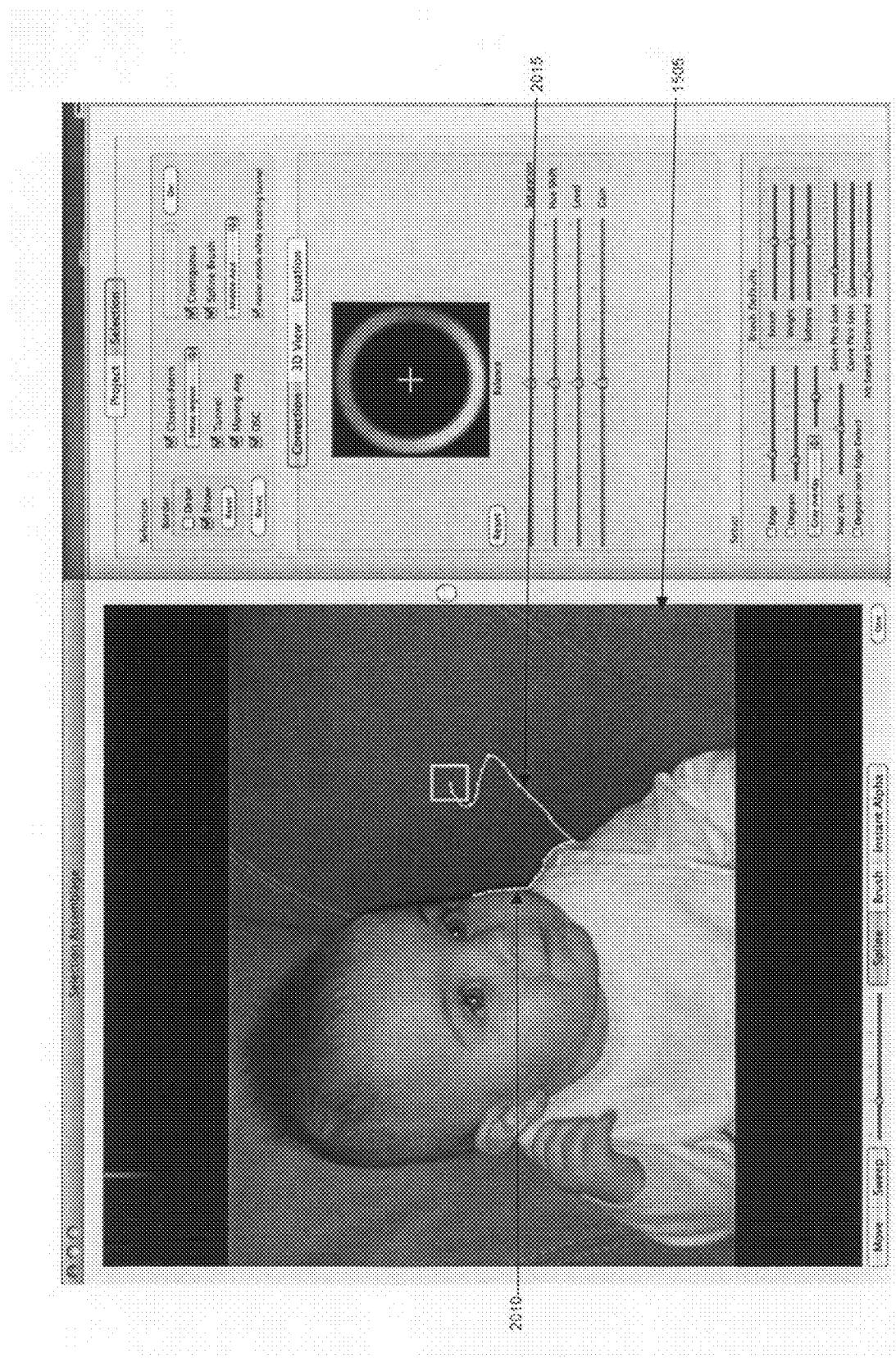
FIG. 20 illustrates a defined border for an image that has a section snapped to edges of the image and a section not snapped to edges.

If no identified edges are found within the search window, the process 1400 draws (at 1430) the border along the movement of the cursor. FIG. 20 illustrates image 1505 and border sections 2010 and 2015. Border section 2010 is snapped to identified edges; specifically, the edges formed by the baby's face and shoulder against the background. Border section 2015 is not snapped to any identified edges, but instead follows the movement of the cursor through the background of the image.

After drawing the border at either 1425 or 1430, the process proceeds to 1435 and determines whether the current cursor speed is changed from the speed used to initially define the search window at 1415. If the cursor speed is changed, the process redefines (at 1440) the search window based on the cursor speed. In embodiments for which the search window size is proportional to the cursor speed, the process enlarges the search window if the cursor speed is increased and reduces the search window if the cursor speed is decreased. After redefining the search window based on the new cursor speed, the process proceeds to 1445 and determines if input to define the border is still being received. In some embodiments, if a mouse button is still held down then input to define the border is still being received. Other embodiments begin and end the definition of a border with a click and release of a mouse button, such that the mouse button is not held down during the definition process. If at 1435 the process 1400 determines that the cursor speed is not changed, the process proceeds directly to 1445. If border definition input is still being received, the process proceeds to 1420 to continue drawing the border. If border definition input is no longer being received, the process ends.

B. Deleting Part of a Border

Some embodiments of the invention delete at least one segment of a previously defined border. In some embodiments, segments are deleted during the process of defining the border. Some embodiments delete segments of the border when the cursor used to define the border moves back over the previously defined border. Other embodiments delete the border when the cursor moves to within a threshold distance of the previously defined border. Other embodiments use other mechanisms to delete segments of the border, such as a combination of the direction of the cursor and the proximity of the cursor to the border.

Figure 21:
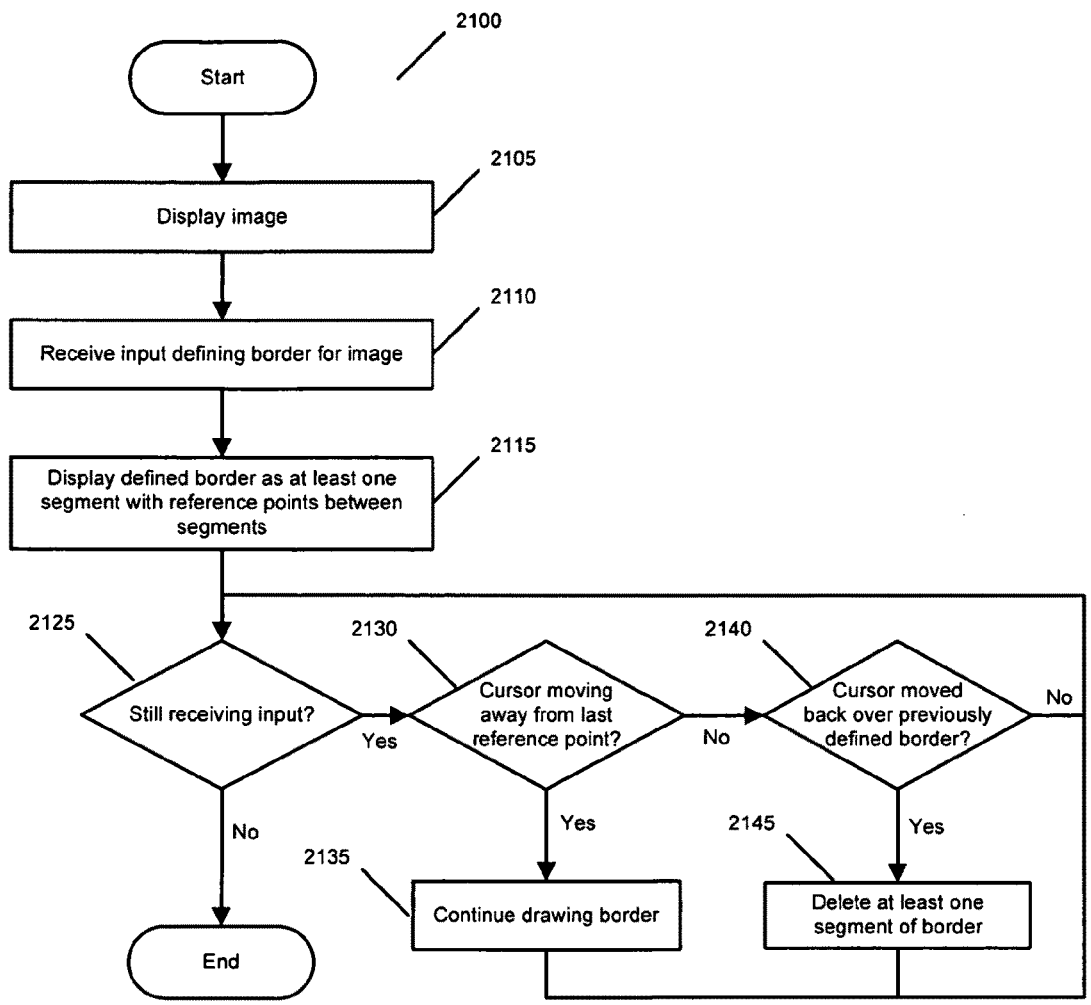
FIG. 21 illustrates a process of some embodiments that allows part of a defined border to be deleted during the definition process.

FIG. 21 presents a process 2100 performed by some embodiments to define a border of an image that allows part of the border to be deleted during the definition process. Process 2100 starts by displaying (at 2105) an image. At 2110, the process receives input to define a border of the image. In some embodiments, the input is from a user placing a cursor over a point in the image and clicking a mouse button. The user holds the mouse button down while moving the cursor over the image to define the border in some embodiments. In other embodiments, the user clicks and releases a mouse button in order to begin defining the border. At 2115, the process displays the selected border as a set of segments with reference points between the segments. Some embodiments require only one segment to be drawn before any of the border can be deleted, while other embodiments require any number of segments greater than one (e.g., a minimum of two, three, or more segments). Some embodiments use process 1400 to search for identified edges in the image and snap the border to the edges while defining the border.

Figure 22:
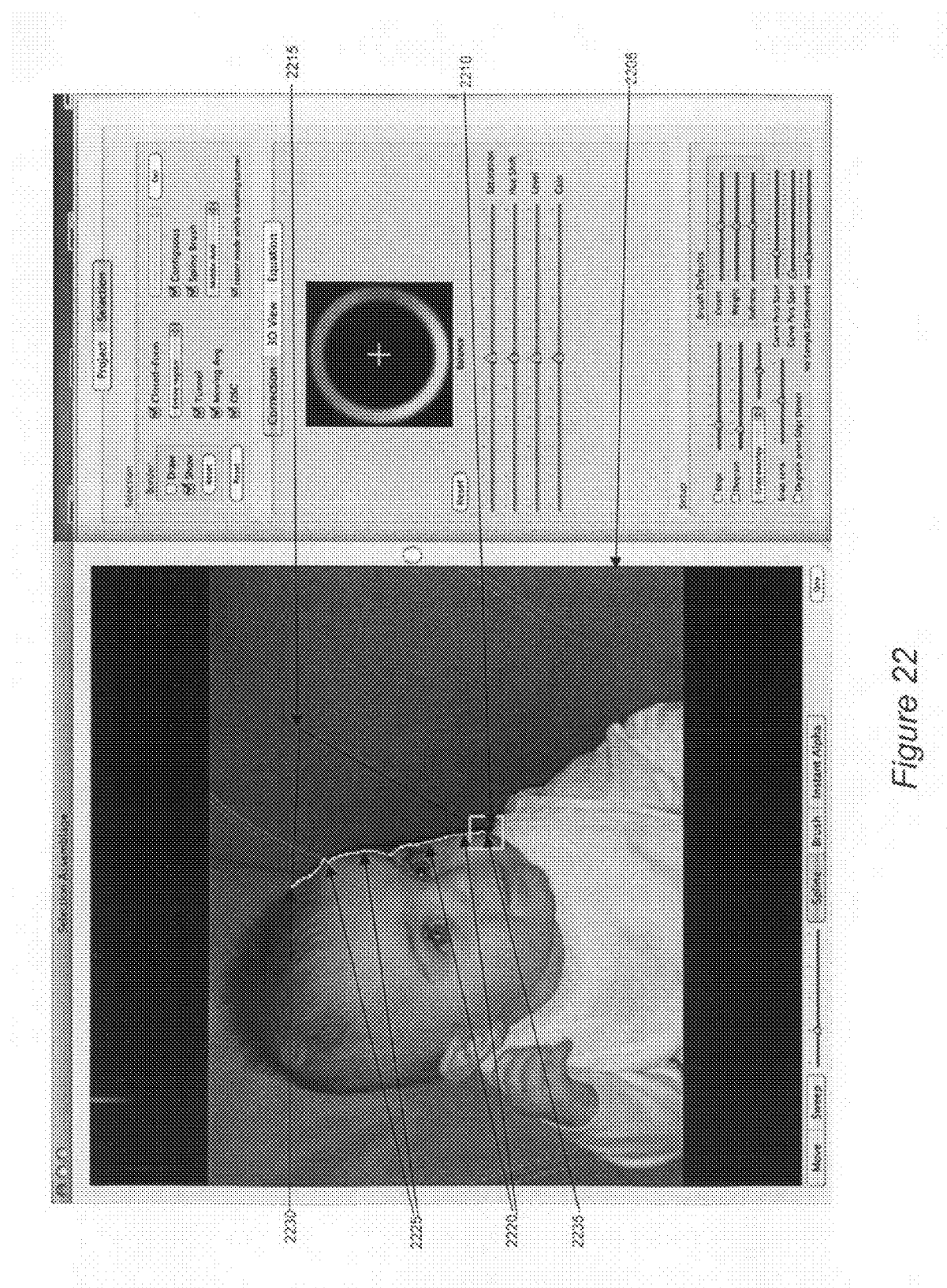
FIGS. 22-25 illustrate the definition of a border using the process of FIG. 21.

FIG. 22 illustrates a border of some embodiments being defined with process 2100. FIG. 22 illustrates image 2205, cursor 2210, and border 2215. Border 2215 as displayed includes border segments 2220 and reference points 2225. The reference points 2225 are in between segments 2220. Border 2215 was drawn with the cursor 2210 starting at position 2230, and is snapped to edges in the vicinity of the path taken by the cursor moving over the image from 2230 to the shown cursor position at 2235.

In some embodiments, the border includes both snapped points (i.e., points that are drawn along identified edges) and non-snapped points (i.e., points that are drawn along the cursor movement). The reference points 2225 are drawn at each of the snapped points in some embodiments, while in other embodiments the reference points 2225 are drawn at a subset of the snapped points. In yet other embodiments, the reference points 2225 are drawn equidistant from each other. Still other embodiments draw the reference points 2225 at varying distances along the border based on how fast the cursor moves to draw the border. Some embodiments define the border as a set of coordinates, as described below.

Figure 23:
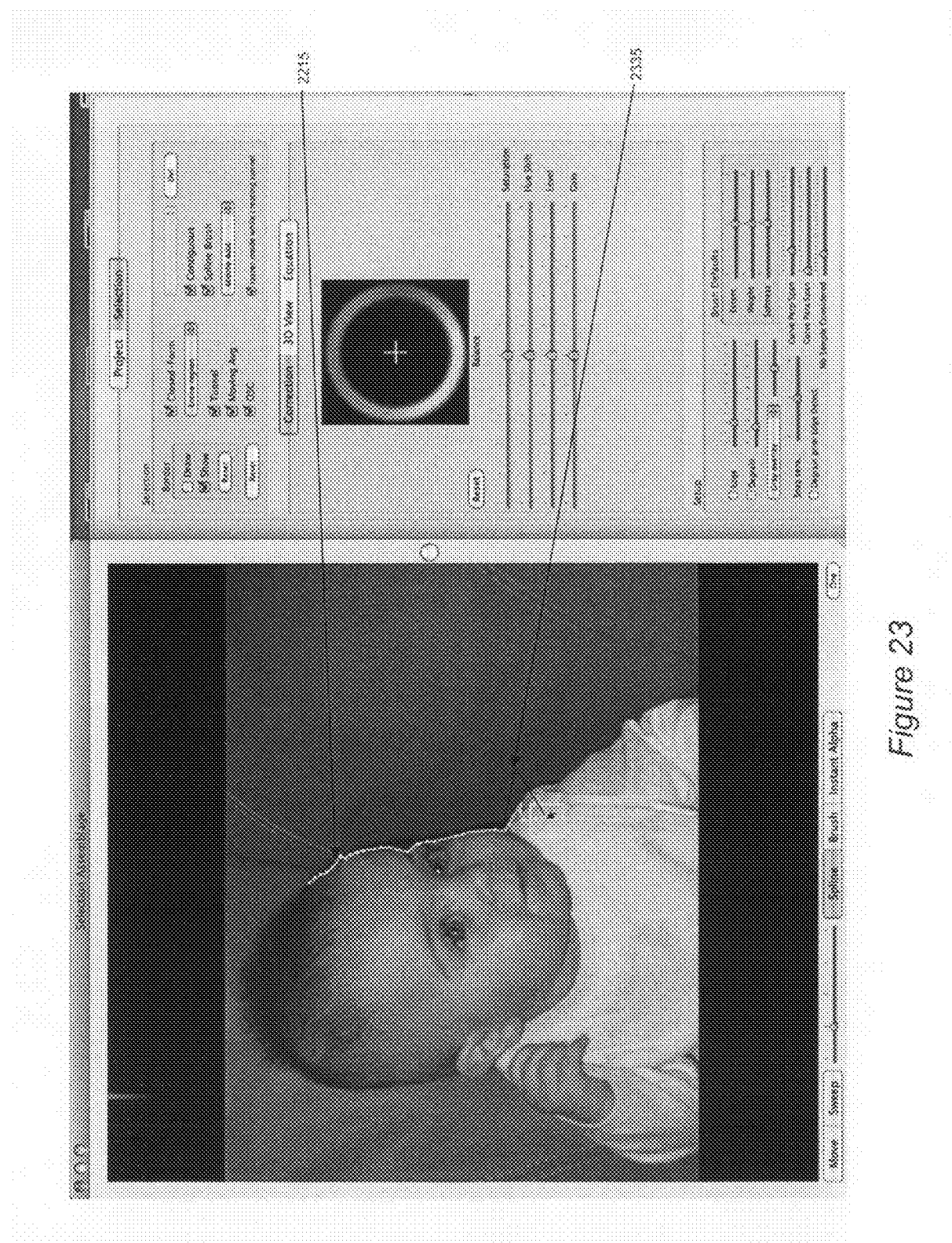

At 2125, process 2100 determines whether input to define the border is still being received. In some embodiments, if the mouse button is still held down then input to define the border is still being received. Other embodiments begin and end definition of the border with a click and release of a mouse button, such that the mouse button is not held down during the definition process. If input to define the border is no longer being received, the process 2100 ends, as the border definition process is finished. If border definition input is still being received, the process determines (at 2130) whether the cursor is moving away from the last reference point. The last reference point is the most recently drawn reference point on the border. In FIG. 22, the last reference point is at 2235. If the cursor is moving away from the last reference point, the process continues drawing (at 2135) the border, displaying new segments and reference points in between the segments. FIG. 23 illustrates new segments 2335 with reference points that have been added to border 2215 as a user continues to draw the border by moving the cursor away from the previously defined border. After 2135, the process returns to 2125 to determine whether border definition input is still being received.

If, at 2130, the process determines that the cursor is not moving away from the last reference point, the process proceeds to 2140 and determines whether the cursor has moved back over the previously defined border. The previously defined border includes all of the border that has been drawn and not yet deleted. In doing so, in some instances a user would essentially be retracing the already-drawn border in the direction opposite which the border was drawn. A user might also loop back to a point along the previously defined border. If the cursor has not moved back over the previously defined border, the process returns to 2125 to determine whether border definition input is still being received. If the cursor has moved back over the border, the process deletes (at 2145) at least one segment of the border. When segments are deleted, this sets a new reference point as the last reference point for the purposes of 2130.

Some embodiments do not require a user to actually retrace the border opposite the direction in which the border was drawn, but will delete at least one segment if the cursor is moved back onto the previously defined border, even if the cursor is moved in a more roundabout way than a directly retracing the border. If a user places the cursor over the previously defined border more than one segment back from the end of the border, some embodiments delete all segments of the border beyond the location of the cursor. After 2145, the process returns to 2125 to determine whether border definition input is still being received. The process also returns to 2125 from 2140 if it determines that the cursor has not moved back over the previously defined border. For example, if a user holds down the mouse button but does not move the cursor, then in some embodiments no new segments of the border would be drawn, and no segments would be deleted, but border definition input would still be being received.

In the process described immediately above, some embodiments define the border as an ordered set of coordinates while the border is being defined. For example, each pixel along the defined border is assigned an (x, y) pair. When the cursor moves over a pixel with a particular (x, y) pair that is already in the set of coordinates, the process deletes all the coordinates in the ordered set that come after the particular coordinate pair. Some embodiments delete all the coordinates when the cursor moves within a threshold distance of the particular coordinate pair.

Figure 24:
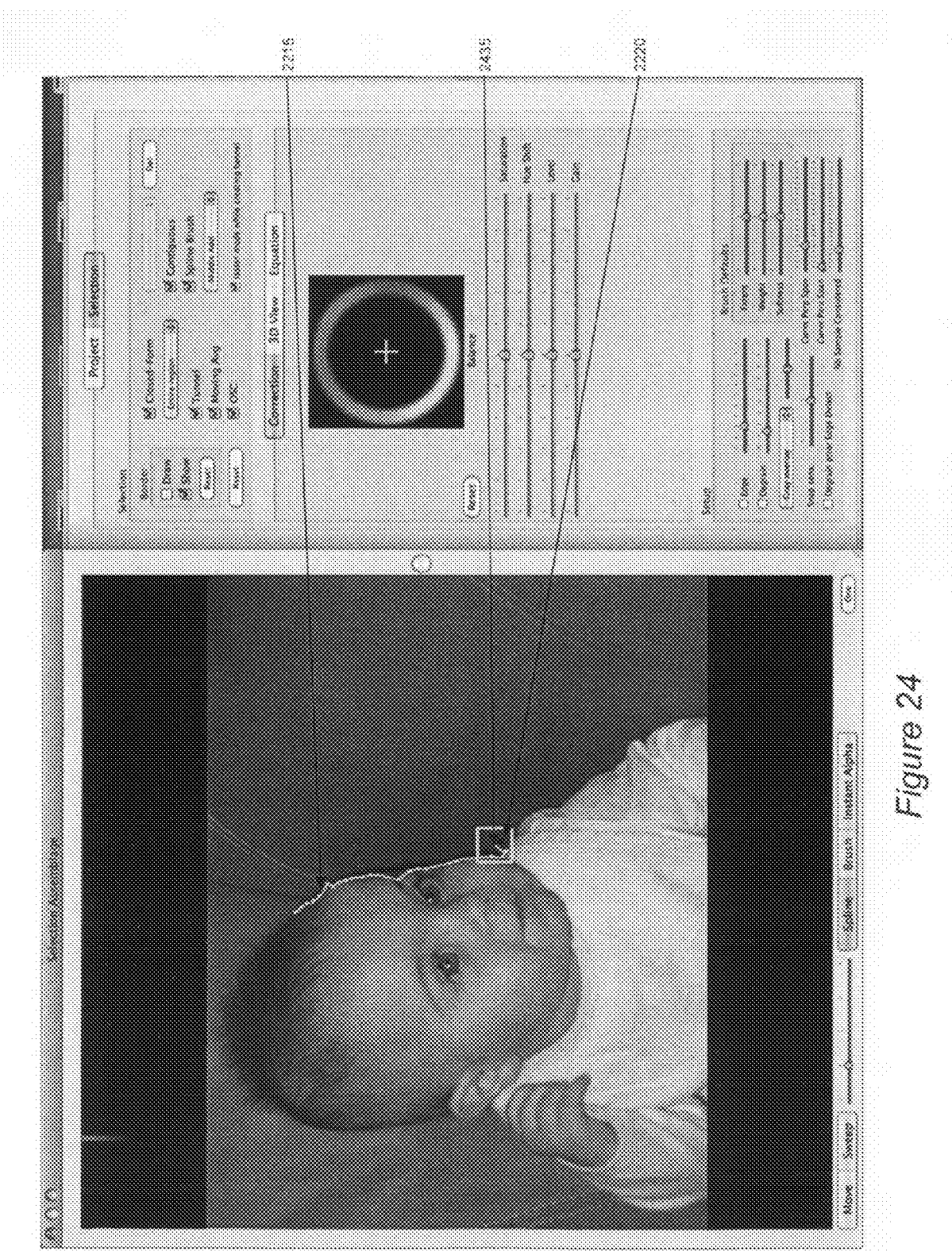
Figure 25:
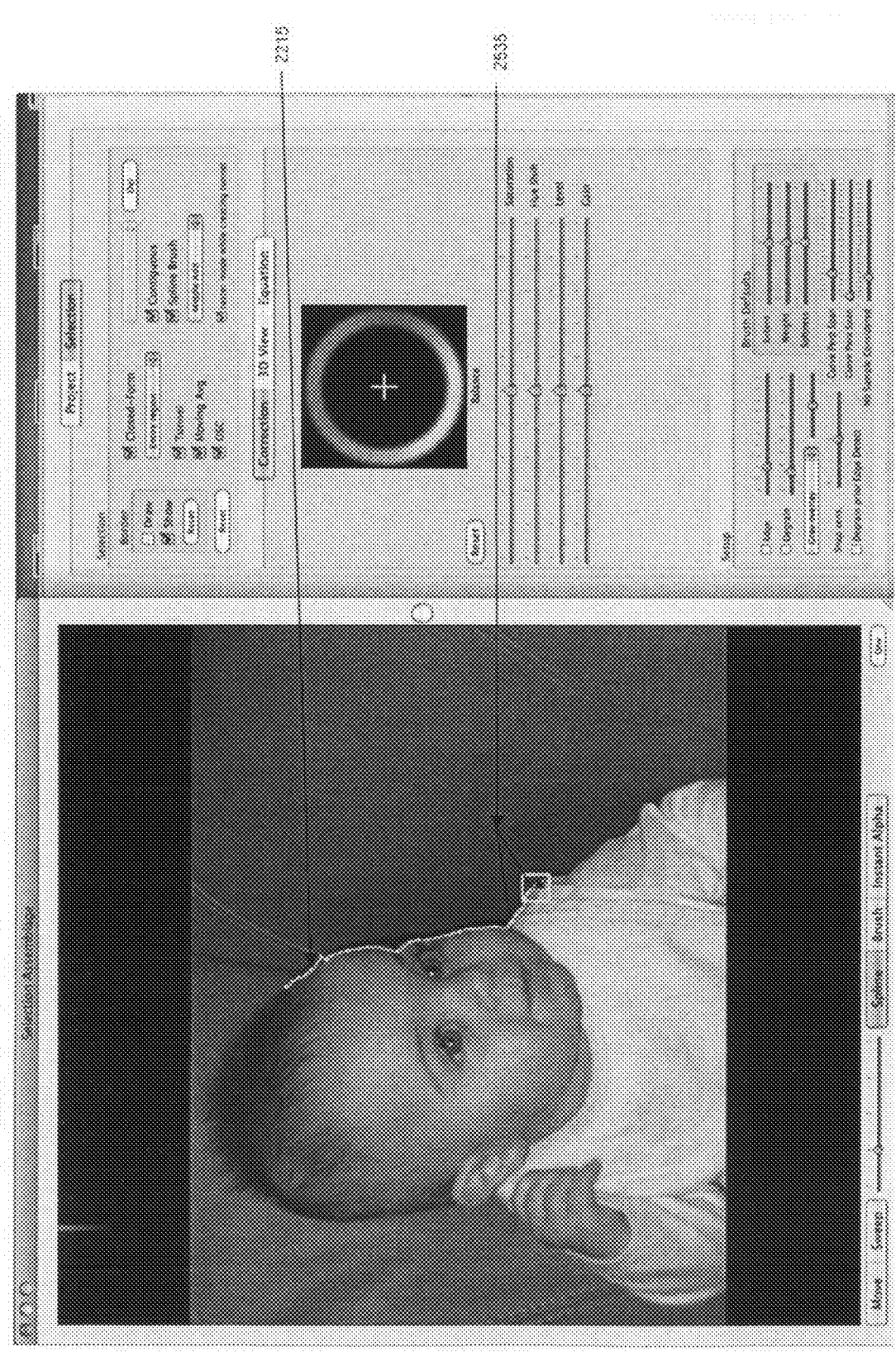

In FIG. 23, some of the new segments 2335 are snapped to the baby's bib. However, it is more likely the case that a user is attempting to define a border around the entire baby and would prefer to have the border run down the baby's arm. FIGS. 24 and 25 illustrate the use of process 2100 to delete segments of a border and then define new segments. FIG. 24 illustrates the border 2215 after a user has moved the cursor back over the previously defined border to point 2435, thereby deleting a number of the segments 2335 that were incorrectly drawn. FIG. 25 illustrates the border after the user has continued the selection of the border 2215 down the baby's arm. FIG. 25 illustrates new segments 2535. From the position of the cursor 2210 in FIG. 25, the user can either finish selection of the border or continue down the baby's arm.

Some embodiments allow a user to modify a border after the border is defined. In some embodiments, the border will attempt to automatically snap to edges as the border is modified. If a user determines that it would be preferable for a border defined along edges to not run along an edge for at least one point, the user can move the border off of the edge. Some embodiments use such a border to define a selection with no transition, and thus do not generate a tunnel or a foreground to background transition from the defined border.

In some embodiments, the border is treated as a parametrizable curve with several modifiable points. A parametrizable curve is a curve that is defined about certain definition points by a particular equation or set of equations. This is in contrast to a raster curve, which is defined by the set of all pixels that make up the curve. In some embodiments, the parametrizable curve can be modified by moving the definition points. In some embodiments (e.g., embodiments using bezier splines), the definition points for modifying the curve lie on the curve. In other embodiments (e.g., embodiments using b-splines), the definition points for modifying the curve lie off of the curve. In addition to the definition points, some embodiments (e.g., embodiments using bezier splines) define the parametrizable curve based on tangents to the curve at the specific points as well. Users can add definition points to the curve in some embodiments, and then modify the curve based on the new point.

Figure 26A:
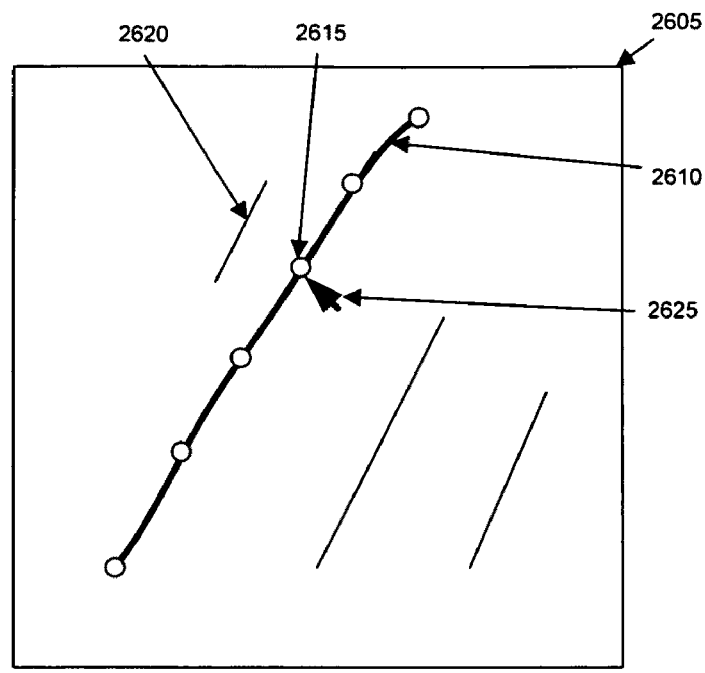
FIGS. 26-28 illustrate the modification of a defined border of an image.
Figure 26B:
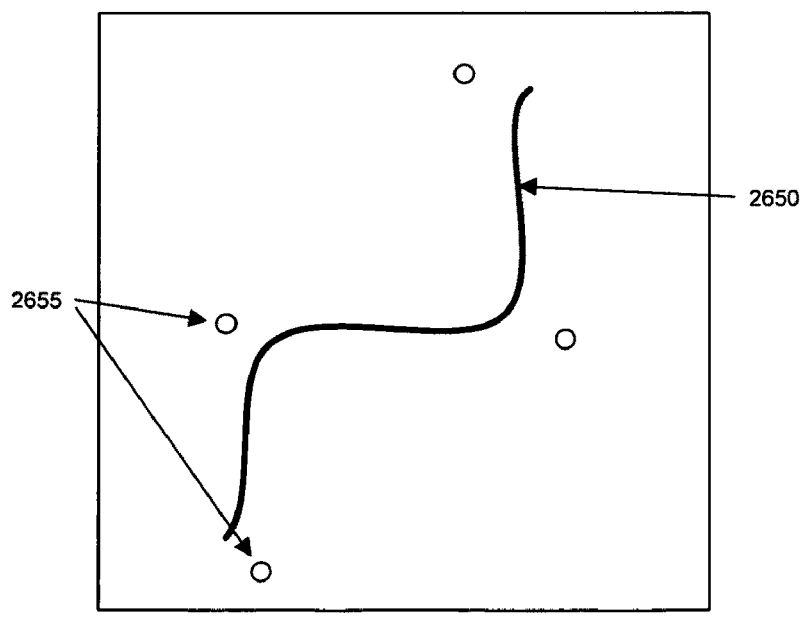
Figure 27:
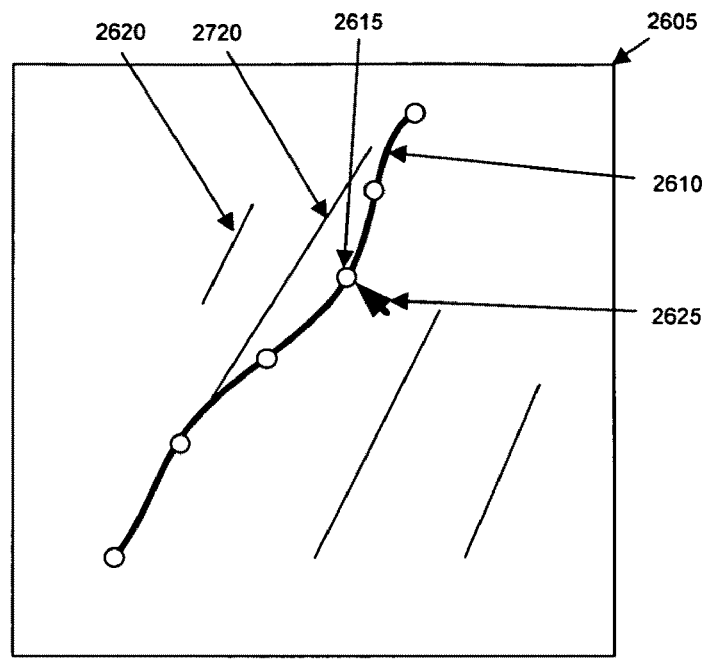
Figure 28:
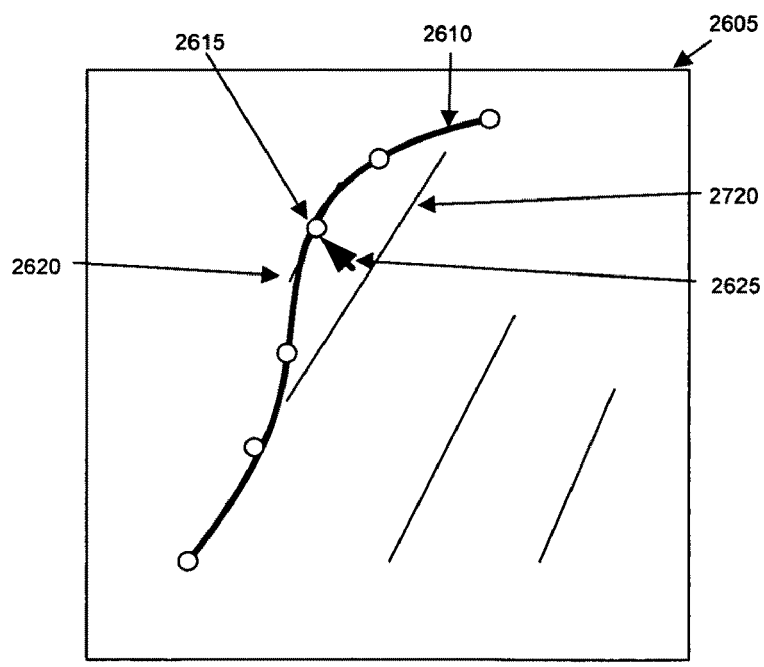

FIG. 26A illustrates an image 2605 through which a border 2610 has been defined. Defined border 2610 includes definition point 2615 in addition to several other definition points. In some embodiments, the definition points can be dragged by a cursor to modify a defined border. In the embodiments illustrated, the border 2610 is a bezier spline, but is shown without tangents for purposes of simplifying the illustration in the figure. FIG. 26B illustrates a border 2650 as a b-spline, in which definition points 2655 are not on the border. Image 2605 includes edge 2620 in addition to several other edges. FIG. 26 also illustrates cursor 2625, which is at definition point 2615. FIG. 27 illustrates the result of a user dragging the definition point 2615 down and to the right using cursor 2625 to modify border 2610. FIG. 27 illustrates an example of a border being modified such that the modified border no longer runs along an edge of an image. FIG. 27 also illustrates edge 2720, along which the border had been running when the border was initially defined. FIG. 28 illustrates the result of a user dragging the definition point 2615 up and to the left using cursor 2625 to modify border 2610. FIG. 28 illustrates an example of a border being modified such that the modified border snaps to a different edge than initially defined. In FIG. 28, the border has snapped to edge 2620, while the border was initially snapped to edge 2720.

V. Generation of a Tunnel from a Defined Border

Some embodiments of the invention generate a two-dimensional tunnel about a portion of the image based on movement of a cursor through the portion of the image. In some embodiments, the tunnel defines a boundary within the image. Rather than a hard edge, the tunnel is a transitional edge or region that can be multiple pixels wide. The tunnel of some embodiments is generated as a pair of deformable curves. Some embodiments allow both curves to be modified either together or separately.

Figure 29:
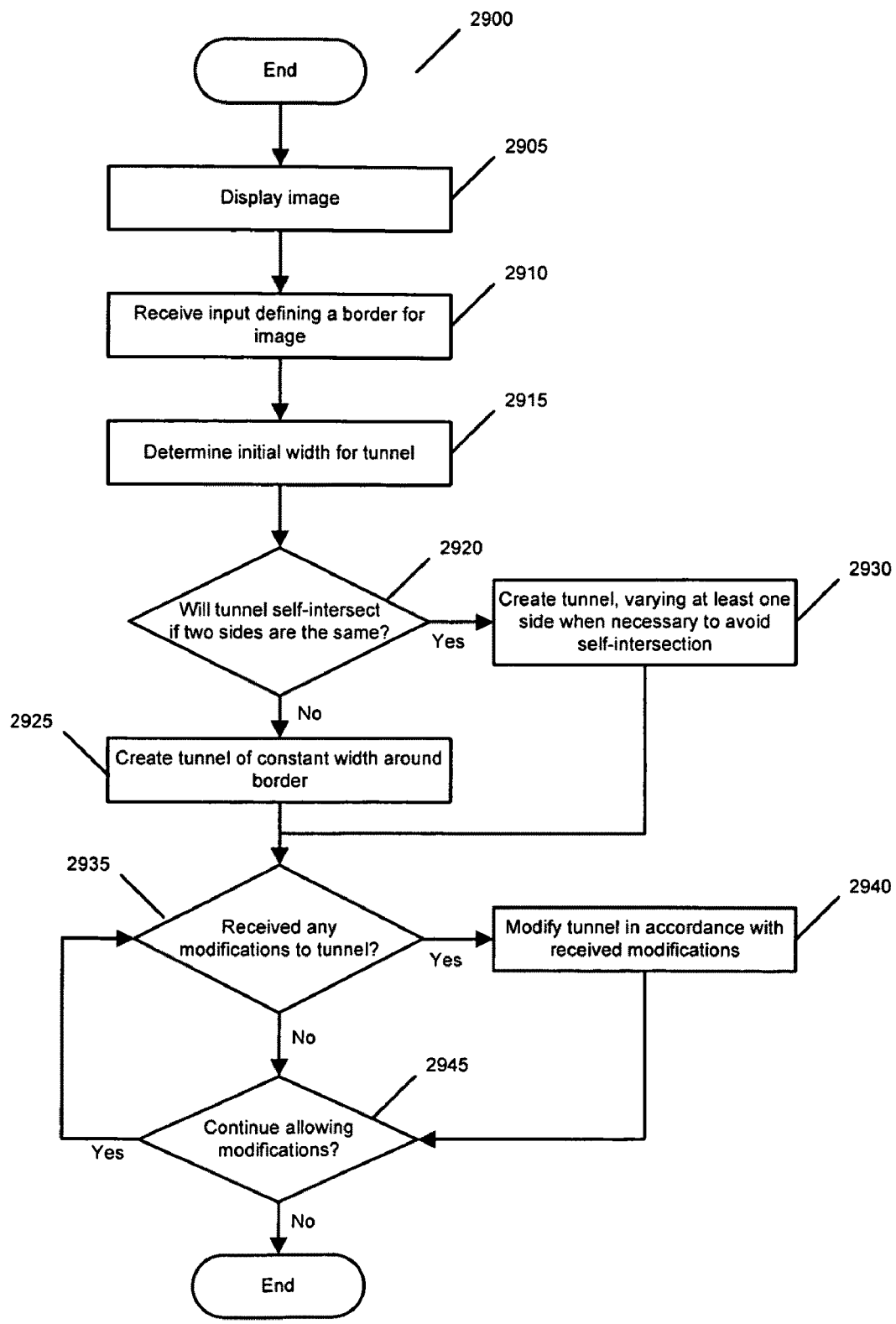
FIG. 29 illustrates a process of some embodiments for generating a tunnel from a defined border.
Figure 30:
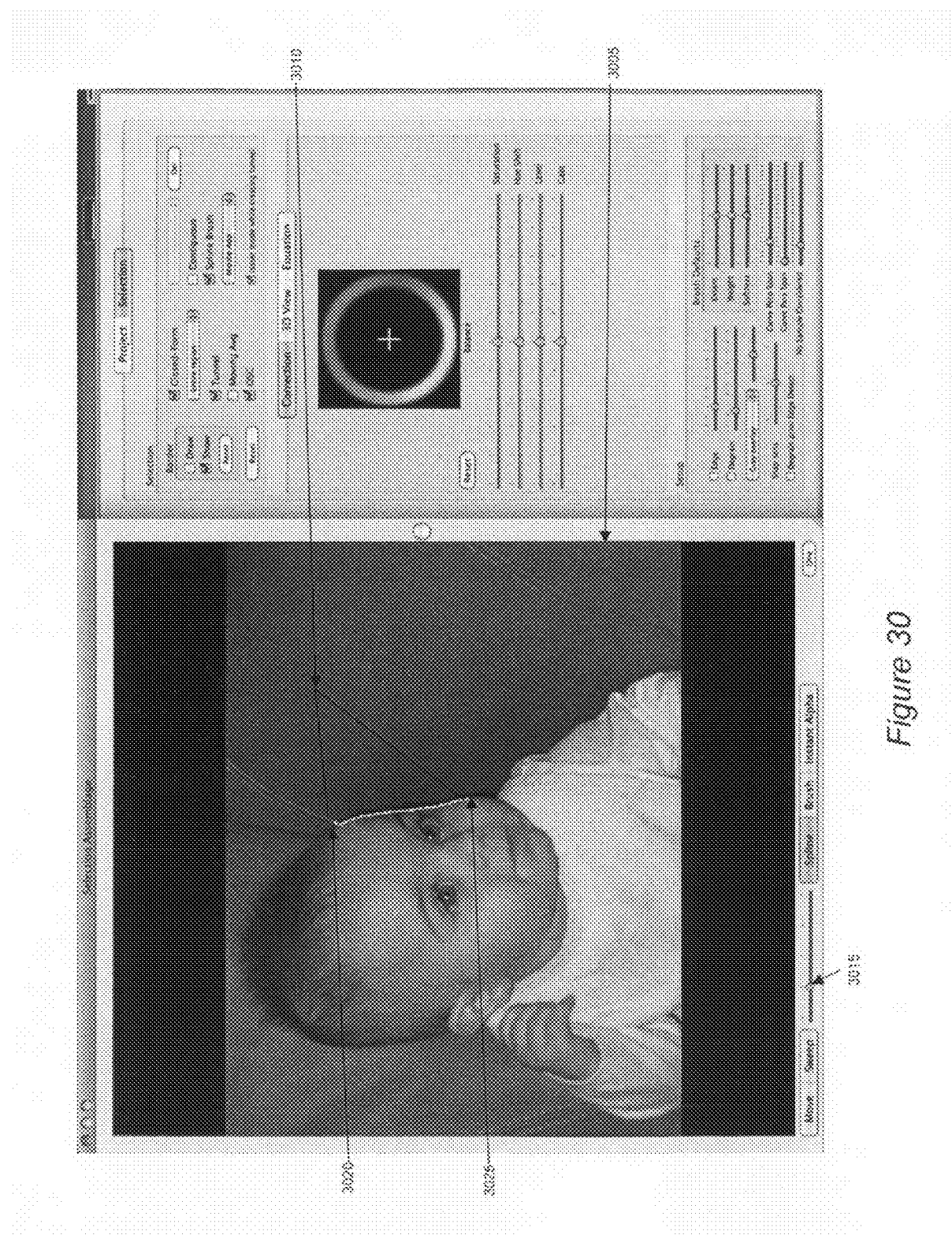
FIG. 30 illustrates a defined border.

FIG. 29 presents a process 2900 of some embodiments for generating a tunnel from a defined border. Process 2900 begins by displaying (at 2905) an image. At 2910, the process receives input defining a border for the image. In some embodiments, the border is defined as described in Section IV. Other embodiments may define the border differently. Some embodiments treat the defined border as a spline curve. In some embodiments, the border is smoothed before a tunnel is generated from the border. FIG. 30 illustrates a defined border. FIG. 30 illustrates image 3005, border 3010, and slider 3015. In some embodiments, the user defines the border by placing the cursor at point 3020 and holding the cursor down while moving to point 3025. In some embodiments, the process generates the tunnel after the cursor is released with no further user input required.

After receiving input to define the border, the process 2900 determines (at 2915) an initial width for the tunnel that will be generated. Some embodiments determine the initial width based on a UI tool that can be modified by a user. For example, in some embodiments the initial width is based on the setting of a linear slider tool. Referring to FIG. 30, the slider 3015 is the linear slider tool of some embodiments that is used to determine the initial width of the tunnel. Some embodiments use other ways to define the initial width of the tunnel, such as a numeric input from a user.

Figure 31:
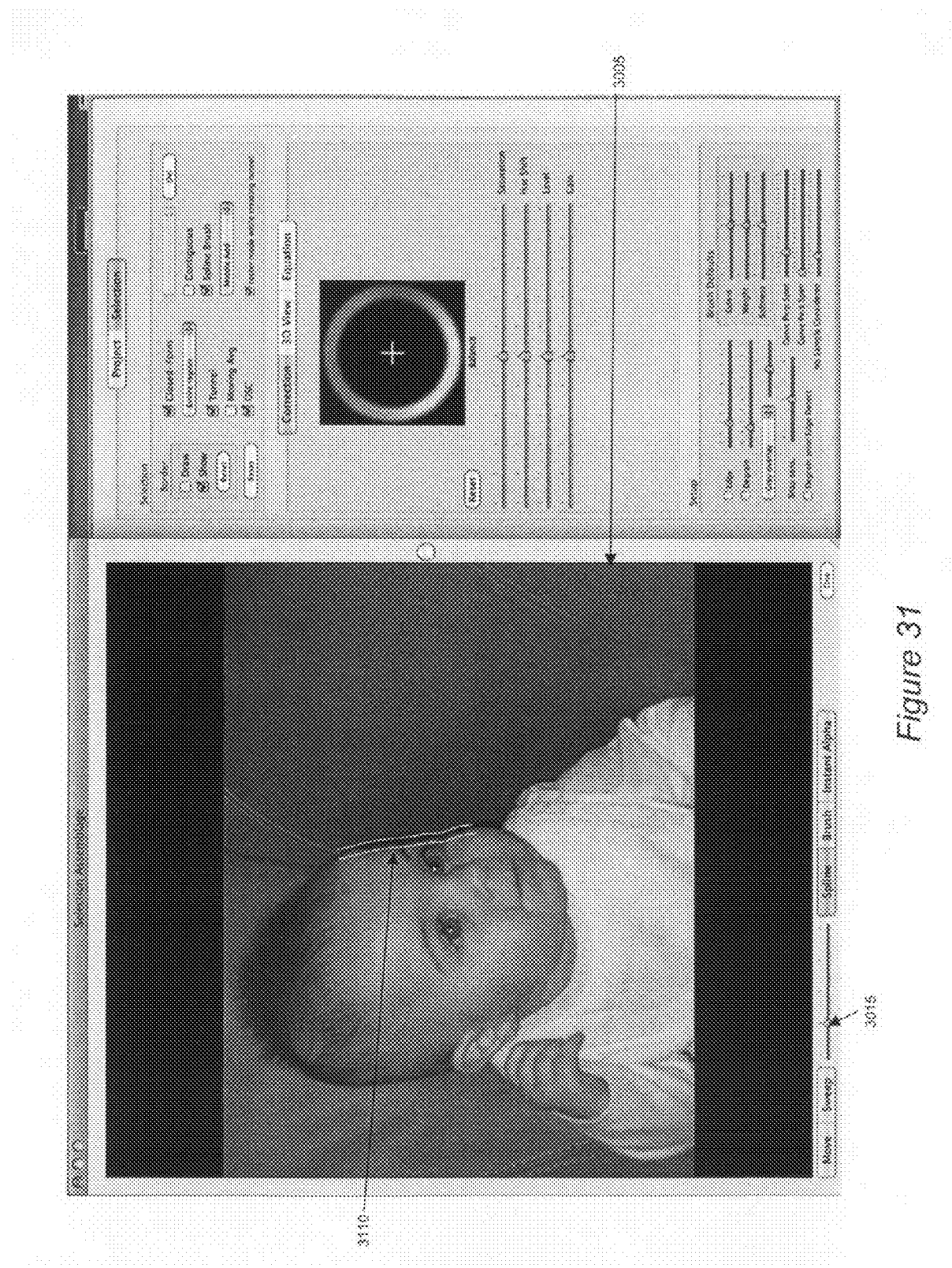
FIG. 31 illustrates a tunnel generated from the border of FIG. 30.

After determining the initial width for the tunnel, the process determines (at 2920) whether the tunnel will intersect with itself if the two sides of the tunnel have the same shape (that of the defined border). If a border is defined such that it is traced in one direction and then continues back in the opposite direction near the previously defined section, then depending on the initial width it might be impossible to generate a tunnel with both sides having the same shape. If generating the tunnel with both sides having the same shape will not cause the tunnel to intersect itself, the process generates (at 2925) the tunnel at the width determined at 2915. The tunnel is generated such that the sides of the tunnel run parallel to the defined border and are equidistant from the defined border. FIG. 31 illustrates image 3005 with tunnel 3110 generated at a constant width from border 3010. Slider 3015 is set at a first distance from the left side that is one-fourth of the distance to the right side of the slider. As the defined border 3015 is mostly straight, generating tunnel 3015 with the two sides having the same shape (and therefore the tunnel having a constant width) does not result in the tunnel intersecting itself.

Figure 32:
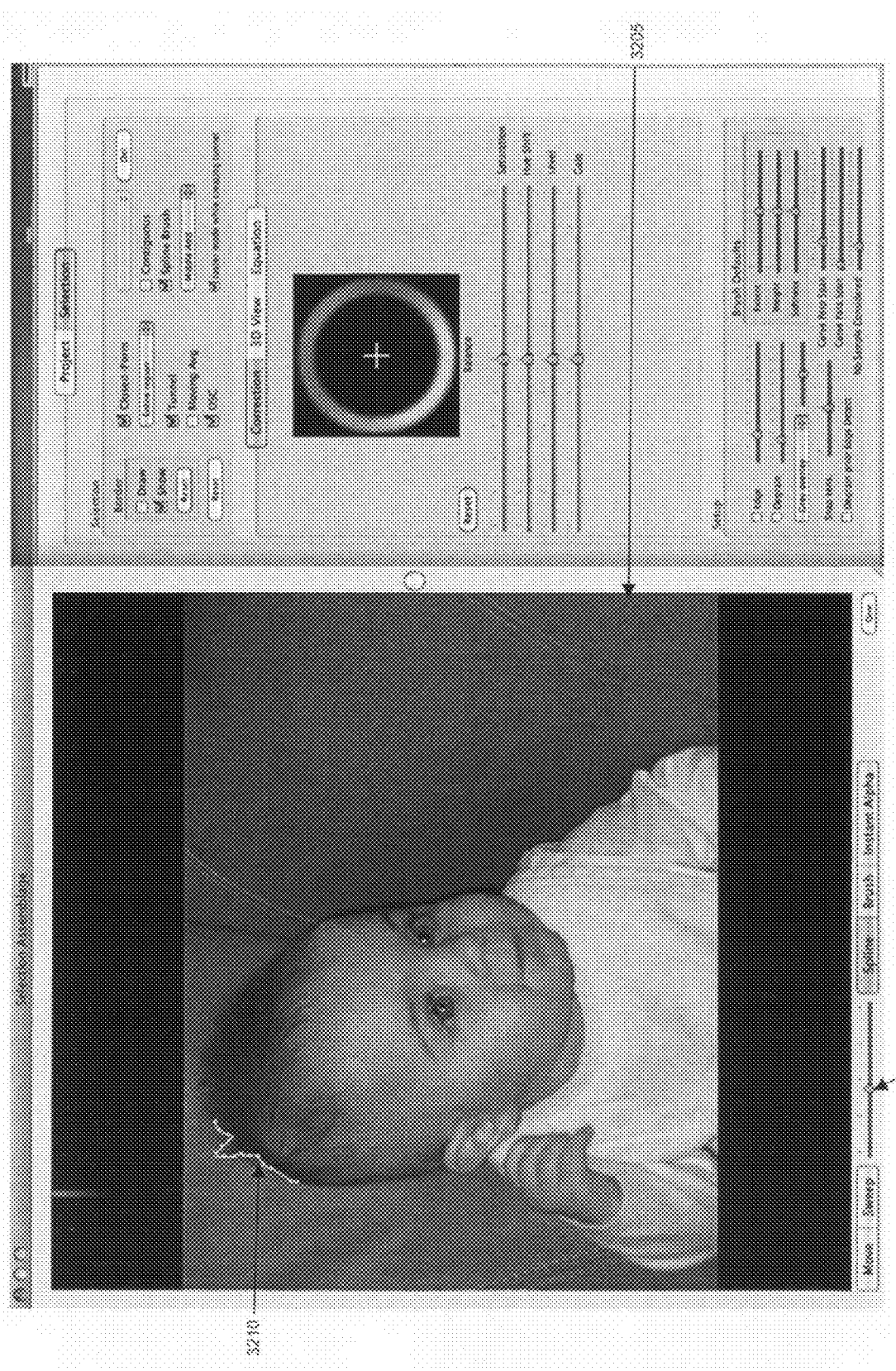
FIG. 32 illustrates a defined border.
Figure 33:
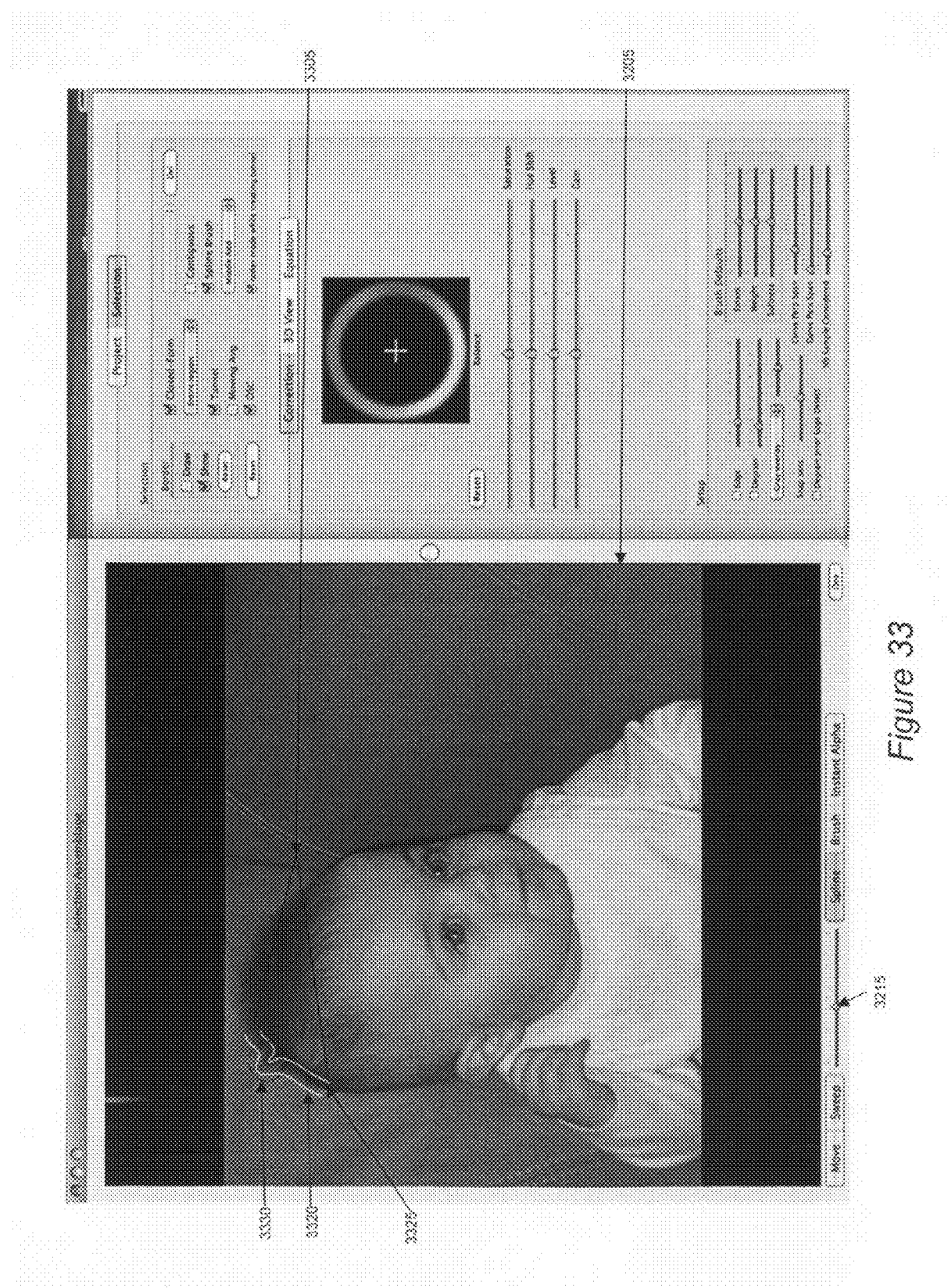
FIG. 33 illustrates a tunnel generated from the border of FIG. 32.

If the process 2900 determines at 2920 that the tunnel will intersect itself when generated with the two sides having the same shape, then the process generates (at 2930) the tunnel, varying the shape of one or both sides where necessary to avoid self-intersection. The process attempts to draw the tunnel at as constant a width as possible, and will modify the shape of one or both sides of the tunnel in order to keep the width as close to constant as possible without having the tunnel self-intersect. In some embodiments, the modification is kept as minimal as possible. FIG. 32 illustrates a defined border 3210 displayed on image 3205, along with slider 3215. Slider 3215 is set near the halfway point to determine the width of a tunnel to be generated from border 3210. FIG. 33 illustrates the tunnel 3310 with non-constant width generated from the defined border 3210. The primary tunnel width is set by slider 3215. Tunnel 3310 has sides 3320 and 3325. Because of the shape of border 3210, tunnel 3310 is generated with the two sides 3320 and 3325 shaped differently. Specifically, within area 3330, side 3325 is pinched down as compared to side 3320. The width of the tunnel is kept as close to constant as possible, although the width does decrease slightly close to where side 3325 comes to a point.

Once the tunnel is generated, the process determines (at 2935) whether any modifications to the tunnel are received. Some embodiments allow modifications to the width of the tunnel. The modifications of some embodiments can also be modifications to the shape of one or both sides of the tunnel.

Figure 34:
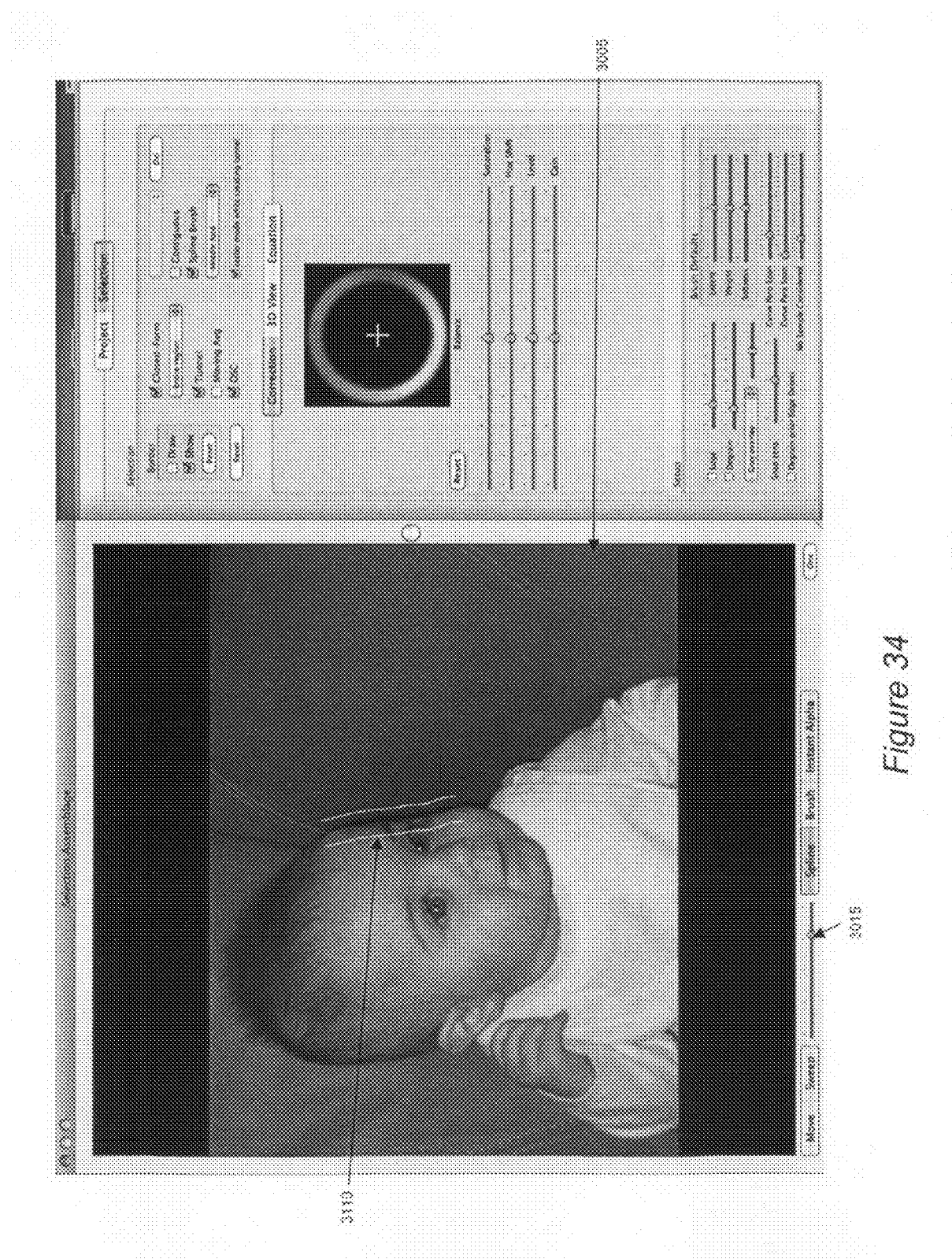
FIG. 34 illustrates a modification to the width of the tunnel of FIG. 31.

FIG. 34 illustrates the result of modifying the width of tunnel 3110 from FIG. 31 using the slider tool 3015. In some embodiments, slider tool 3015 is used to both determine the initial width of a tunnel and to modify the width of the tunnel after the tunnel is generated. In FIG. 34, tunnel 3110 is substantially wider than in FIG. 31 because the user has moved slider 3015 from the one-fourth mark to just past the three-fourths mark. Because border 3010 was defined such that it was primarily straight, the tunnel 3110 as shown in FIG. 34 after the modification to the width would look the same had slider 3015 been set at just past the three-fourths point when the tunnel was initially generated.

Figure 35:
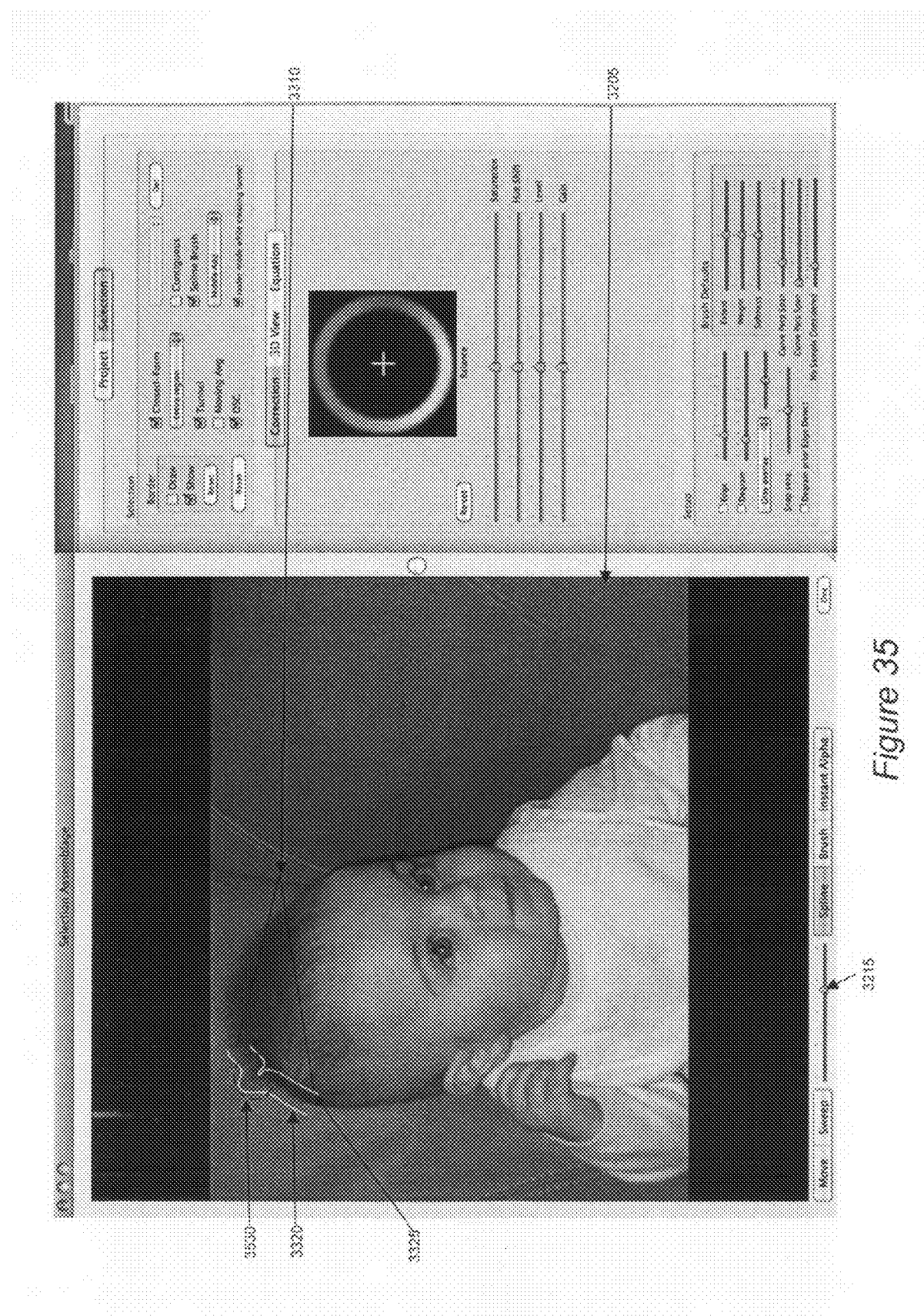
FIG. 35 illustrates a modification to the width of the tunnel of FIG. 33.

FIG. 35 illustrates the result of modifying the width of tunnel 3310 from FIG. 33 using the slider tool 3215, which is near the three-quarter point in FIG. 35. Not only are the sides of tunnel 3310 further apart, but side 3325 has become even more pinched down in the area 3530. This is the result of the process attempting to keep the width as constant as possible while moving slider 3215. Thus, in some embodiments modifying the width of the tunnel can not only modify the width but also the shape of one or both sides of the tunnel.

Figure 36:
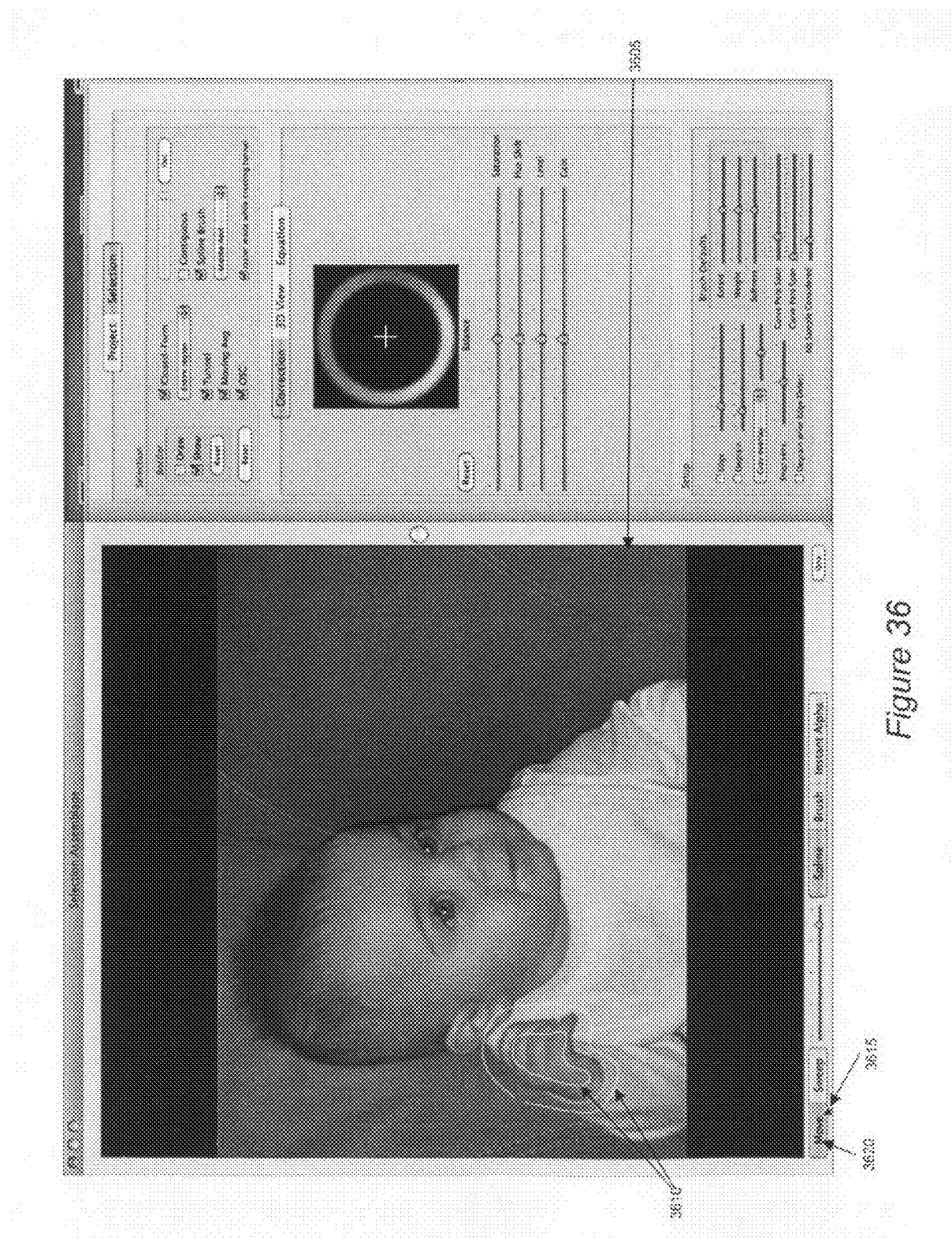
FIG. 36 illustrates a tunnel.

Some embodiments allow modifications directly to the shape of the sides of the tunnel. The sides of the tunnel are defined as parametrizable curves in some embodiments. In some embodiments, the parametrizable curves are bezier splines that are made up of a set of modifiable points. FIG. 36 illustrates image 3605, tunnel 3610, cursor 3615, and UI item 3620 (in the embodiment shown, a button labeled "Move"). Tunnel 3610 encircles the baby's hand. FIG. 36 illustrates a user utilizing the cursor 3615 to select UI item 3620. FIG. 37 illustrates a close-up of tunnel 3610 after the user has clicked on UI item 3620 which displays the two sides 3705 and 3710 of the tunnel as bezier spline curves. The spline curves include control points and tangents, including corresponding inner and outer control points 3715 and 3720 and tangents 3725 and 3730. The outer tangent 3725 is longer than the inner tangent 3730 because tangent 3725 is on the exterior of a curve while corresponding tangent 3730 is on the interior of the curve. In some embodiments, a user can manipulate the spline curve in order to modify the tunnel. Modifications to one spline do not affect the other spline in some embodiments. The control points, such as points 3715 and 3720, can move that point on the spline in any direction in the image. In some embodiments, moving a control point on one spline causes both splines to move according to the movement of the control point. When a control point is moved, in some embodiments nearby points are moved as well according to the mathematics of bezier spline curves, which is well known to one of ordinary skill in the art.

Figure 39:
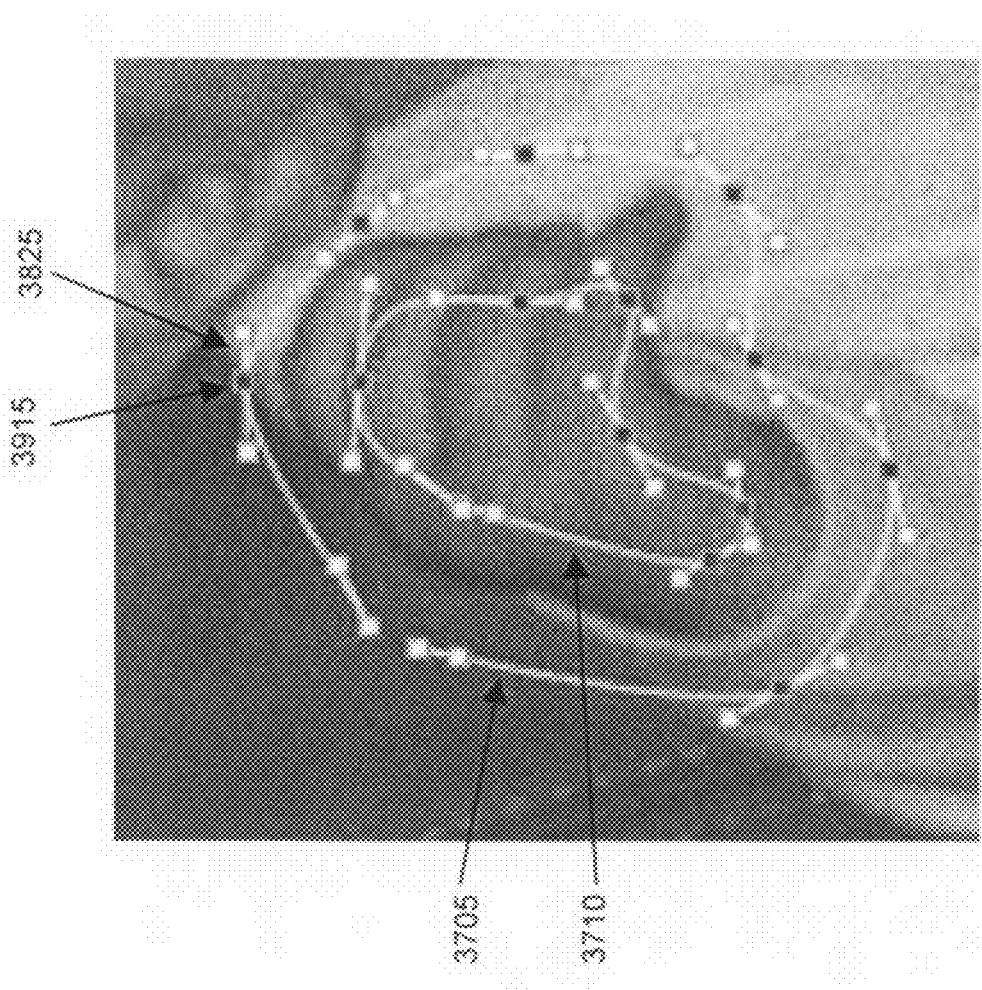

FIG. 37 also illustrates cursor 3735 over a point on the outer spline 3705. In some embodiments, users can add control points to one or both spline curves. A user can click on a section of the curve in some embodiments in order to add a control point at that point. In some embodiments, adding a control point also adds a corresponding tangent at the control point. FIG. 38 illustrates control point 3815 and tangent 3820 that have been added to outer spline 3705. Control point 3815 has been moved inwards. For reasons discussed in Section IV, it is advantageous in some embodiments to not have any of the baby's ear inside the tunnel, which moving point 3815 inwards helps in realizing. Note that there is no corresponding control point at 3825 on the inner spline 3710. FIG. 38 also illustrates outer tangent 3825 and corresponding inner tangent 3830. Outer tangent 3825, which had been longer than inner tangent 3830, is now shorter as a result of the application of bezier spline mathematics to the movement of point 3815. In some embodiments, clicking on the endpoints of a tangent allows the user to modify the orientation of the tangent. Some embodiments allow a user to modify the length of a tangent by directly using the endpoints of the tangent, as opposed to by moving the control point. In FIG. 38, outer tangent 3825 is no longer parallel to corresponding inner tangent 3830. This is the result of the left endpoint of tangent 3825 being dragged downwards so as to modify the nearby section of the outer spline. FIG. 39 illustrates splines 3705 and 3710 after control point 3915, which is the control point associated with tangent 3825, is moved inwards. These modifications to the tunnel produced the advantageous result of having the baby's ear entirely outside the tunnel.

Returning to process 2900, if the process receives (at 2935) a modification to the tunnel, the process modifies (at 2940) the tunnel in accordance with the received modifications. In some embodiments, the modifications include those described above such as modifications to the width of the tunnel or modifications to one or both of the bezier splines. If no modifications are received at 2935, or after the tunnel is modified (at 2940) in accordance with any received modifications, the process determines at 2945 whether to continue allowing modifications to the tunnel. In some embodiments, if a user has generated alpha values for pixels inside the tunnel, then the tunnel can no longer be modified. If a user has started to define a new border in order to generate a new tunnel, then in some embodiments the previous tunnel cannot receive any more modifications. If the process determines to continue receiving modifications, the process returns to 2935. If not, the process 2900 ends.

VI. Generation of Foreground to Background Transition

Figure 40:
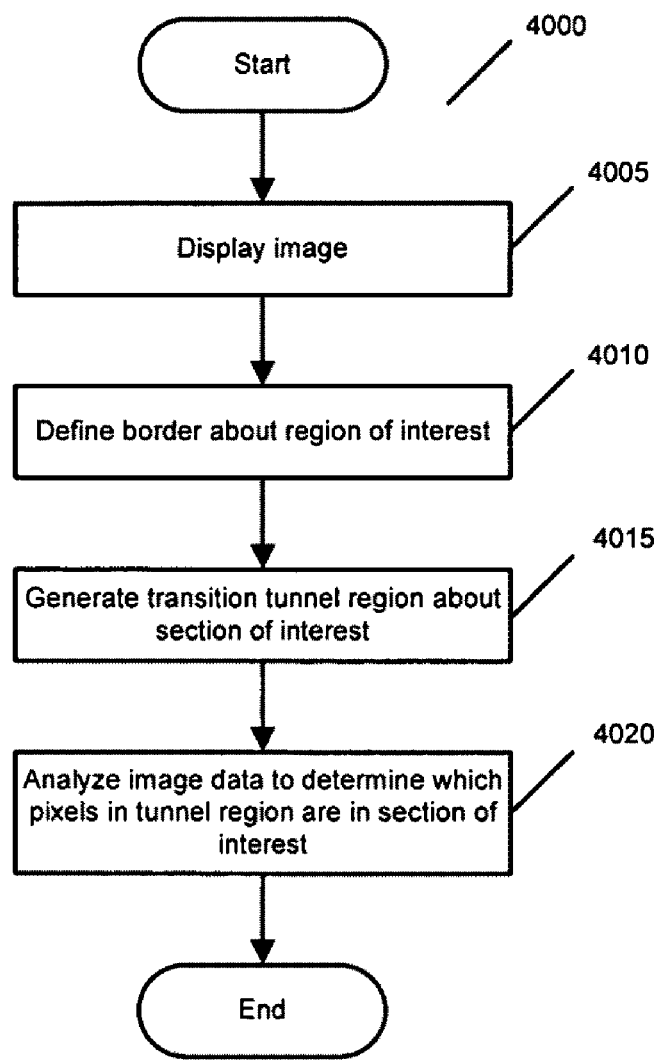
FIG. 40 illustrates a process of some embodiments for selecting a section of interest within an image.
Figure 42:
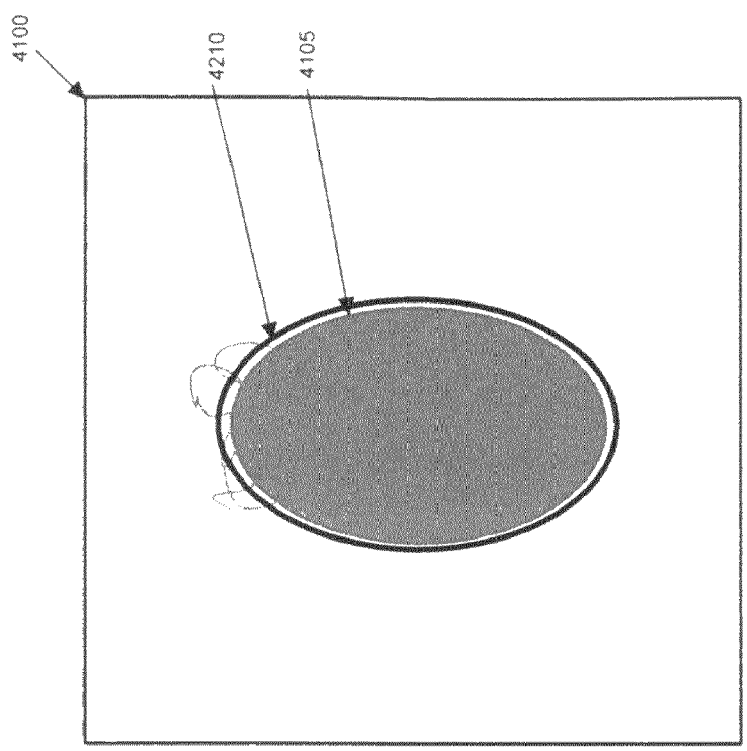
FIGS. 41-44 illustrate the selection of a section of interest within an image.
Figure 41:
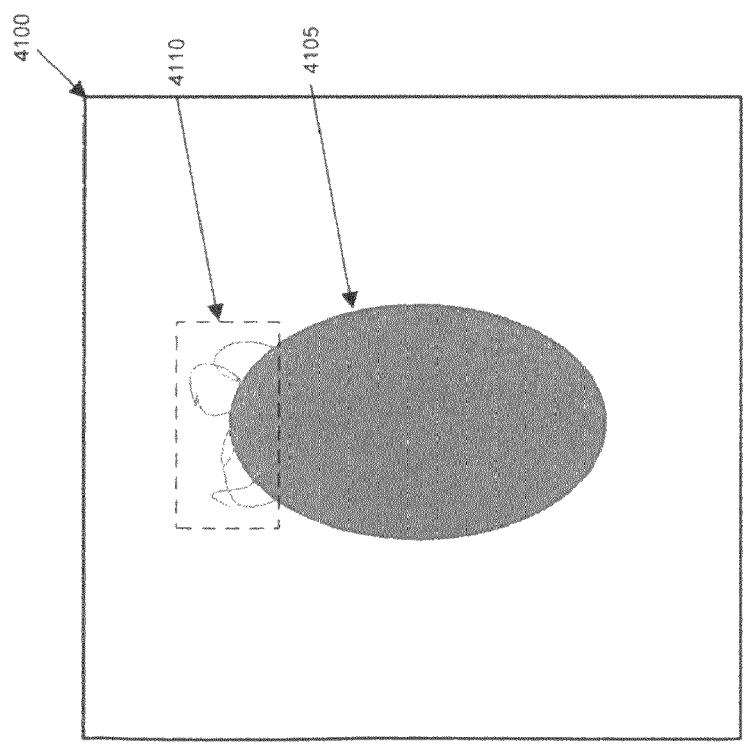

FIG. 40 conceptually illustrates a process 4000 performed by some embodiments for selecting a section of interest within an image. The process 4000 begins at 4005 by displaying an image. FIG. 41 illustrates an image 4100. The image 4105 includes a section of interest 4105 and transition region 4110. In the transition region, 4110, some pixels are part of the section of interest and some are not. At 4010, the process defines a border for the image about the section of interest. In some embodiments, the border is defined in the manner described in Section IV above. Other embodiments define the border in different ways. For example, some embodiments use a first-level heuristic to define the border that does not involve a drawing tool. In some embodiments, the border is a curvilinear border. FIG. 42 illustrates a border 4210 defined about the section of interest 4105. Because of the complex nature of the image data at the transition region, the simple border is unable to adequately capture all of the data that is within the section of interest.

Figure 44:
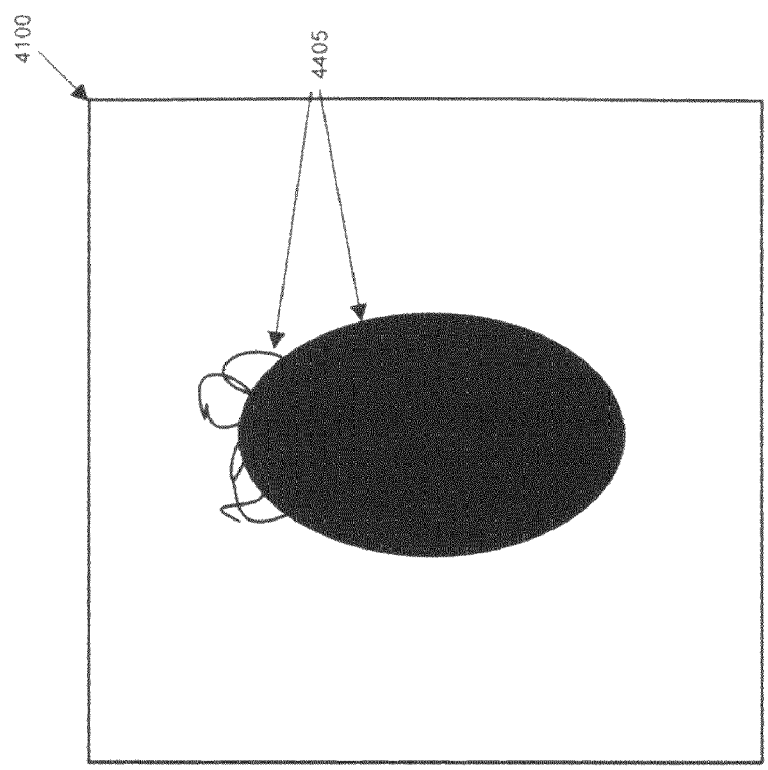
Figure 43:
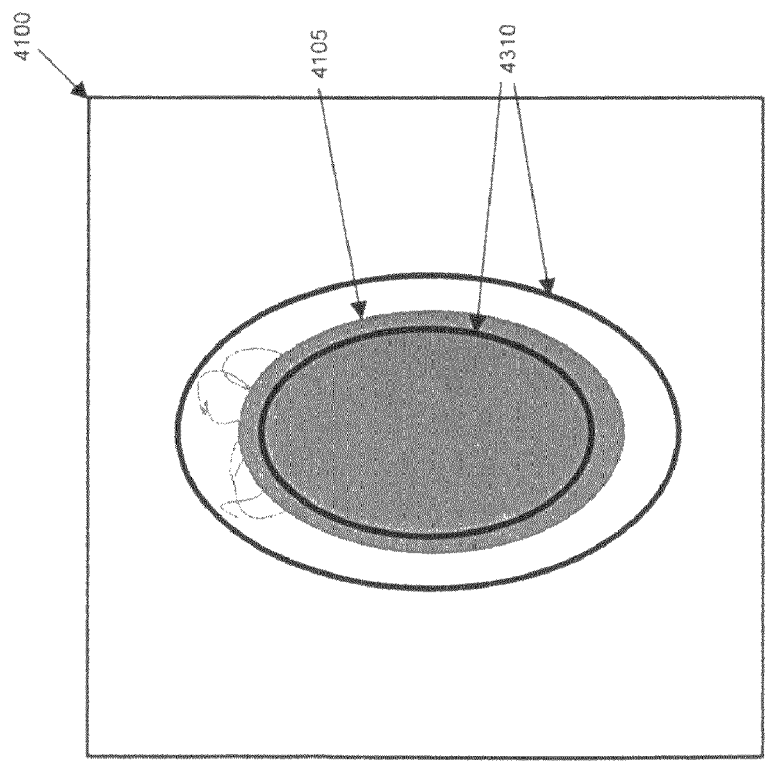

At 4015, the process 4000 generates a transition tunnel region about the section of interest from the defined border. Some embodiments generate the tunnel region as described in Section V above. FIG. 43 illustrates a tunnel region 4310 generated about the section of interest 4105. Unlike border 4210, the interior of the tunnel 4310 includes all of the pixels from the transition region 4110. Finally, at 4020, the process 4000 analyzes image data to determine which pixels in the tunnel region are part of the section of interest. Some embodiments compare pixels on the either side of the tunnel (some of which are defined as being in the section of interest and some of which are defined as not being in the section of interest) to pixels on the interior of the tunnel, and classify the interior pixels based on the comparison. Some embodiments generate alpha values for each of the interior pixels. FIG. 44 illustrates pixels in black 4405 that are defined as being in the section of interest and pixels in white that are defined as not being in the section of interest.

Figure 45:
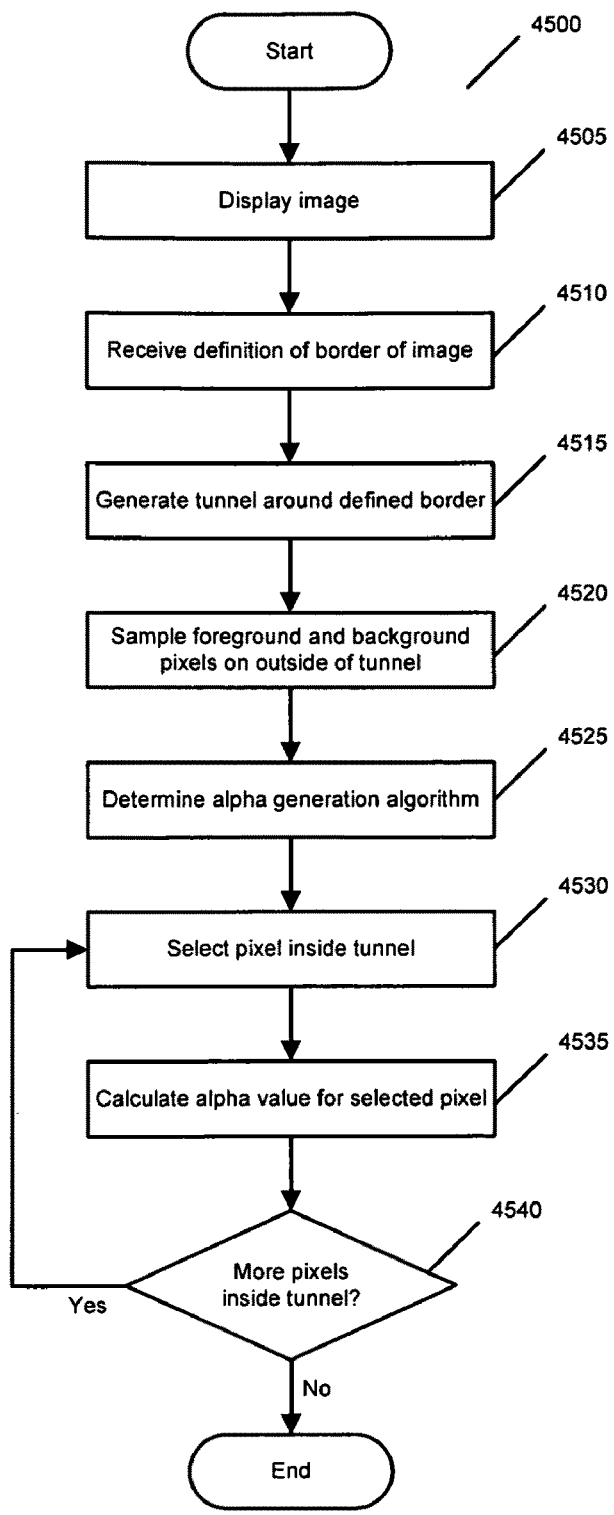
FIG. 45 illustrates a process of some embodiments for generating alpha values for pixels in an image.

FIG. 45 conceptually illustrates a process 4500 performed by some embodiments to generate alpha values for pixels in an image. The process 4500 is performed by some embodiments of process 4500 to generate a foreground to background transition for at least a section of an image. The process 4500 begins at 4505 by displaying an image. At 4510, the process receives input to define of a border for the image. In some embodiments, the border is defined in the manner described in Section IV above.

At 4515, the process 4500 generates a tunnel around the border. Some embodiments generate the tunnel in the manner described above in Section V. FIG. 46 illustrates a portion of an image 4605. FIG. 46 illustrates tunnel 4610, which divides the portion of the image into three sections: foreground 4615, background 4620, and transition section 4625. In some embodiments, the process determines which side is the background and which side is the foreground based on the direction in which a cursor is traced over the image to define the border. For example, if one imagines walking along the border as the cursor is traced over the image, some embodiments refer to the right side as the foreground and the left side as the background, or vice versa. Some embodiments allow a user to toggle this function such that the foreground and background switch sides. The toggle function can be used before or after drawing the border in some embodiments. Some embodiments enable a user to generate a foreground to background transition for one portion of an image, then generate a foreground to background transition for a second portion of the image. For example, FIG. 46 illustrates one section of a baby's head; it would be possible in some embodiments to generate a foreground to background transition within tunnel 4610, then select a new border starting where 4610 ends. In some such embodiments, the foreground and background are defined based on the definition for the previously selected border.

After generating the tunnel, the process 4500 samples (at 4520) foreground and background pixels from the outside of the tunnel. In some embodiments, sampling a pixel involves determining chromatic properties of the pixel, such as the pixel's RGB values or luminance and chrominance values. Some embodiments define a rectangle that includes the tunnel and then sample pixels within the rectangle. In other embodiments, only a narrow strip of pixels just outside the tunnel is used for sample pixels. Some embodiments provide a user interface tool that allows a user to view the regions from which pixels are sampled. This allows a user in some embodiments to manipulate the sides of the tunnel, as described above in Section V, so as to sample pixels from the correct regions.

Figure 48:
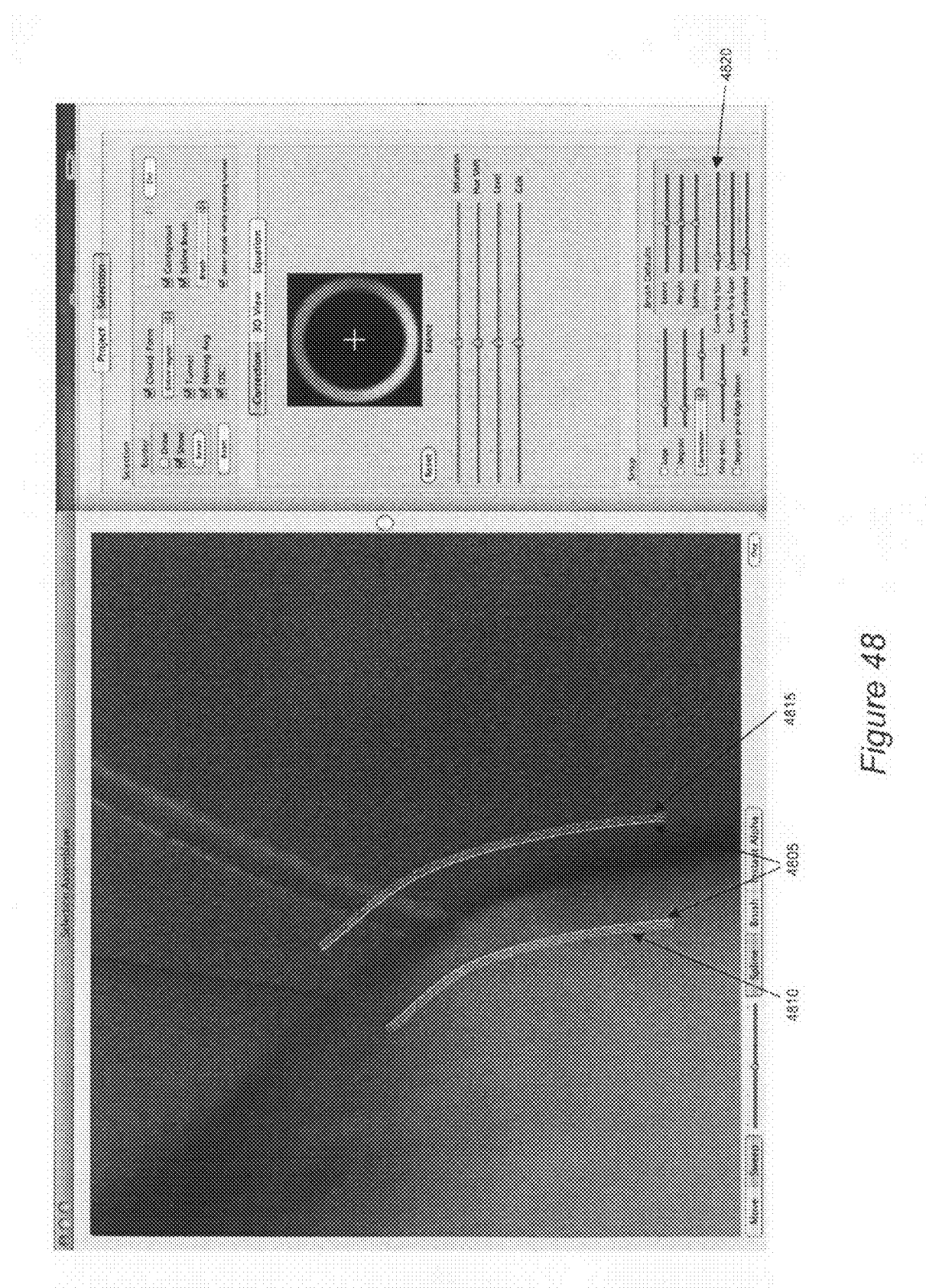
FIGS. 48 and 49 illustrate tunnels with different sample widths.
Figure 49:
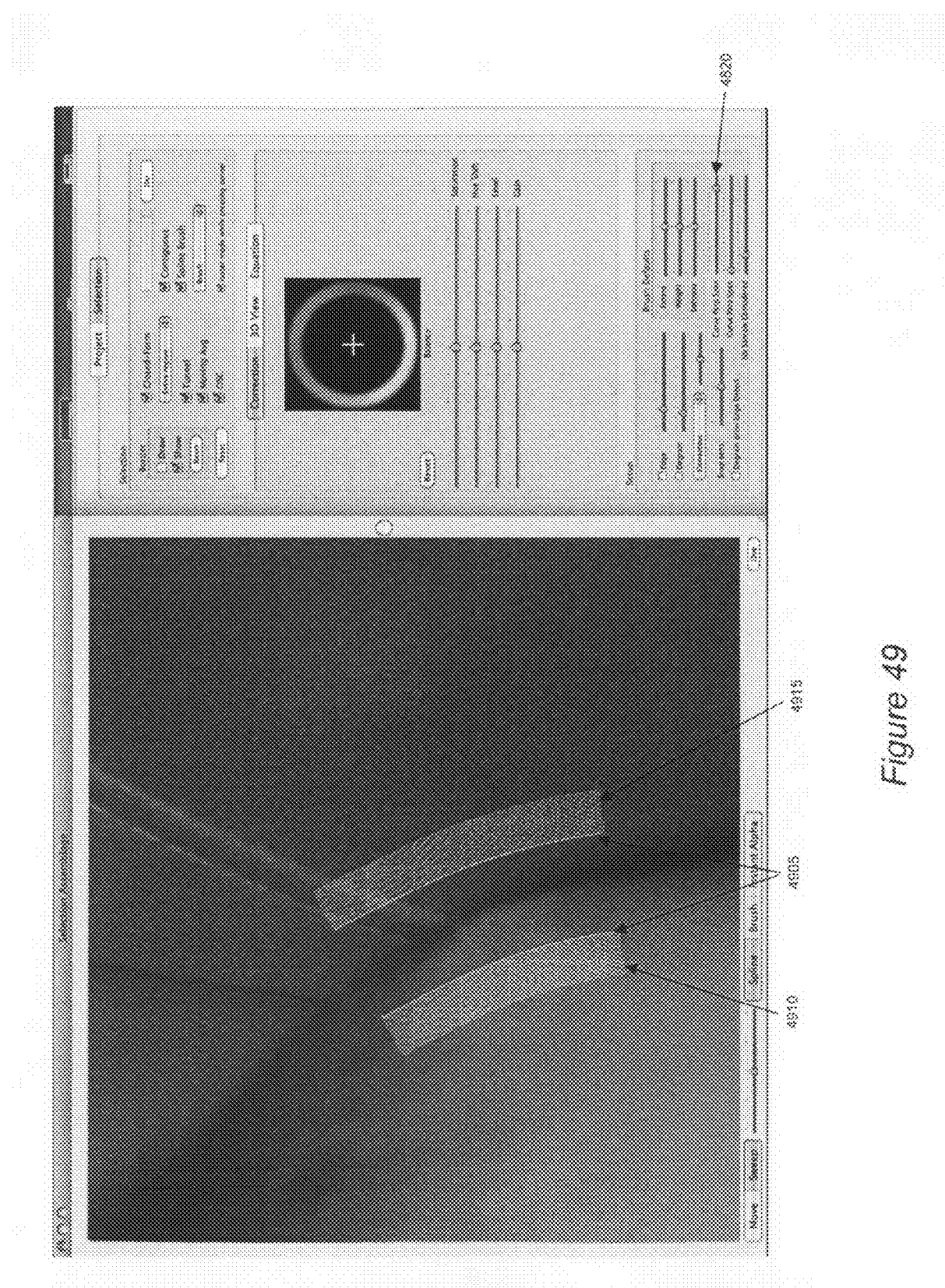

FIG. 47 illustrates tunnel 4610, foreground samples 4715, and background samples 4720. The samples 4715 and 4720 are just along the edges of the tunnel (i.e., immediately outside the tunnel). In some embodiments, the region for taking samples extends further out from the tunnel. Some embodiments provide a user interface tool that allows a user to modify the width of the sampled region (i.e., the distance the sampled region extends outward from the tunnel). FIG. 48 and 49 illustrate zoomed-in views of two tunnels (4805 and 4905, respectively) with two different sample widths. FIG. 48 illustrates foreground sample 4810 and background sample 4815 immediately exterior to the tunnel 4805. In this figure, slider 4820 is set far to the left, indicating a thin sample region. FIG. 49 illustrates foreground sample 4910 and background sample 4915 immediately exterior to the tunnel 4905. In this figure, slider 4820 is set far to the right, indicating a wide sample region. Accordingly, samples 4910 and 4915 are from a much wider region than samples 4810 and 4815. Sampling from a wider region is more computationally intensive, but can provide a greater degree of accuracy in some cases. Some embodiments do not allow a user to determine the sample width, but instead set a default width for the sample regions.

Some embodiments sample every pixel within the sampled region. Other embodiments only sample a fraction of the pixels within the region, such as every other pixel or every third pixel, for faster computation. Some embodiments also allow a user to directly modify the section of the image from which pixels are sampled (either for foreground or background, or both) without modifying the tunnel.

After sampling the pixels, the process 4500 determines (at 4525) an alpha generation algorithm to generate the foreground to background transition inside the tunnel. In some embodiments, the process always uses the same algorithm. The algorithm is a random walks algorithm in some embodiments. In other embodiments, the process selects between more than one algorithm. Some embodiments select an algorithm based on a user decision as to which algorithm to use. Some embodiments prompt the user to select an algorithm, while other embodiments rely on a predefined selection by the user. Other embodiments select algorithm based on the sampled pixels. For example, if the background is a bluescreen, an algorithm that creates a sharper foreground to background transition might be advantageously selected.

After the alpha generation algorithm is determined, the process 4500 proceeds to 4530 to start generating alpha values. At 4530, the process selects a pixel inside the tunnel. The process then calculates (at 4535) an alpha value for the selected pixel. The alpha value for the selected pixel is calculated using the alpha generation algorithm determined at 4525. The alpha value is calculated by comparing the pixel values of the samples to the pixel values of the selected pixel. As mentioned above, the pixel values of some embodiments are the chromatic properties of the pixel, such as RGB values or luminance and chrominance values. The calculated alpha value of some embodiments is a value from 0 to 1, inclusive. The alpha value gives the extent to which the pixel is part of the foreground and part of the background. In some embodiments, a value of 0 indicates the pixel is entirely in the background and a value of 1 indicates the pixel is entirely in the foreground. An alpha generation algorithm that would be used for a bluescreen background to create a sharper foreground to background transition would thus be more likely to calculate alpha values close to 0 and 1, as opposed to in the 0.25-0.75 range.

After calculating the alpha value for the selected pixel, the process 4500 determines (at 4540) whether any pixels remain inside the tunnel. If no more pixels remain, the process has finished alpha generation, and thus ends. If more pixels remain, the process returns to 4530 to select a new pixel inside the tunnel. The process continues calculating alpha values for pixels until all the pixels inside the tunnel have an alpha value. Some embodiments calculate the alpha value for each pixel based on the pixel values for the selected pixel and the sampled pixels. Other embodiments use the pixel values of the previously selected pixels and the alpha values calculated for those pixels to modify the algorithm for the calculation of alpha values for the remaining pixels.

Figure 50:
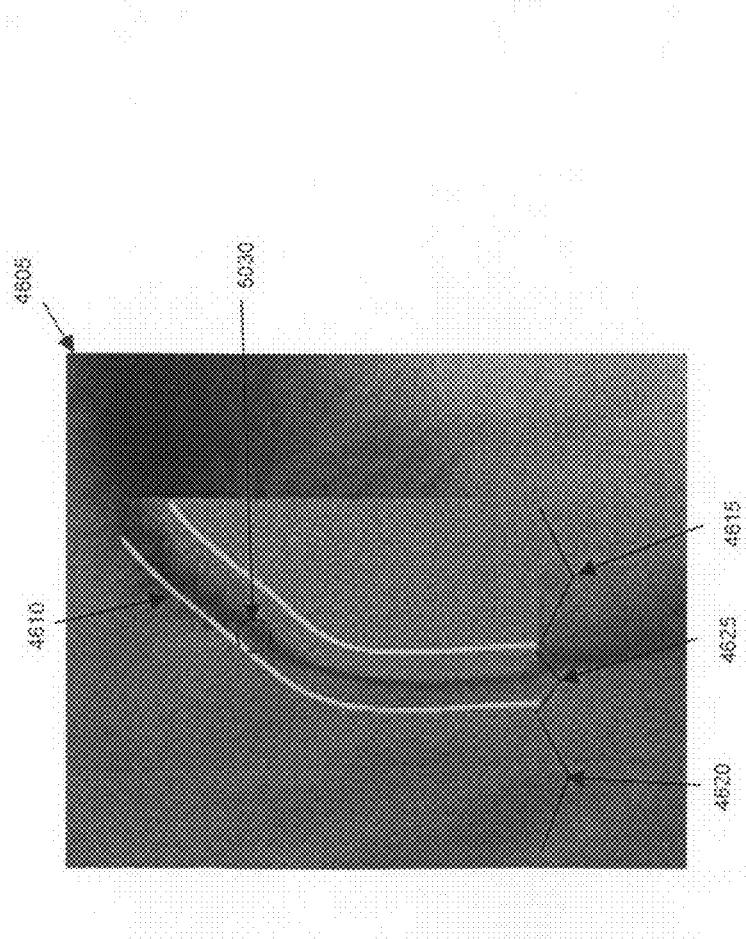
FIG. 50 illustrates calculated alpha values overlaid on the section of the image from FIG. 46.

Some embodiments of the image-editing application illustrate the calculated alpha values in at least one way. Some embodiments illustrate the calculated alpha values in multiple ways, such as red, green, blue, or gray overlays, showing only the alpha values in grayscale, or not displaying the alpha values at all. FIG. 50 illustrates calculated alpha values overlaid on the image 4605. In foreground section 4615, all pixels are colored gray as this entire section has an alpha value of 1. In background section 4620, the overlay has no change because the alpha values are all 0. The alpha values for the foreground section 4615 and background section 4620 are defined as 1 and 0, respectively, during the sampling process. In the transition section 4625, the overlay illustrates that some of the alpha values are the same as the foreground (i.e., a value of 1) and some are the same as the background (i.e., a value of 0), while some are somewhere in between 0 and 1 (e.g., the pixels in the small encircled area 5030). Some embodiments define all pixels with an initial alpha value of zero (i.e., purely background), and only those areas defined otherwise as being at least partly in the foreground are given a nonzero alpha value.

Figure 51:
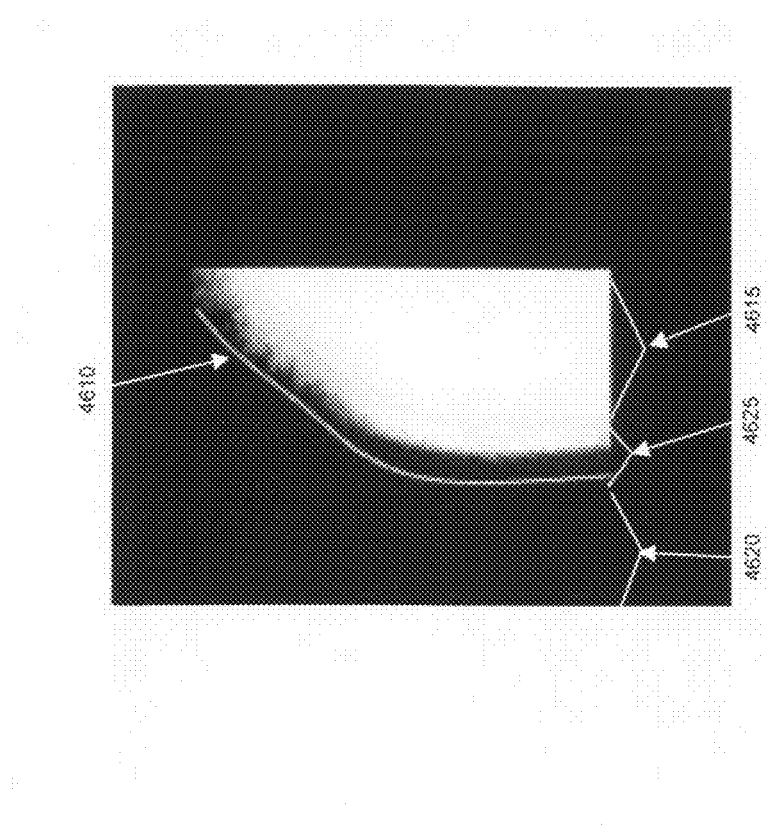
FIG. 51 illustrates the alpha values of FIG. 50.

Some embodiments of the image-editing application can also provide a view that only shows the alpha values. FIG. 51 illustrates such a view for the alpha values from FIG. 50. In FIG. 51, alpha values of 1 are shown as white and alpha values of 0 are shown as black. Areas for which an alpha values have not been calculated are designated as having an alpha value of 0, and are thus also black. The pixels within transition section 4625 have alpha values ranging from 0 to 1, and thus the section has pixels with varying shades of gray in addition to black and white. Some embodiments show alpha differently, for example with the foreground (alpha=1) black and the background (alpha=0) white.

Figure 52:
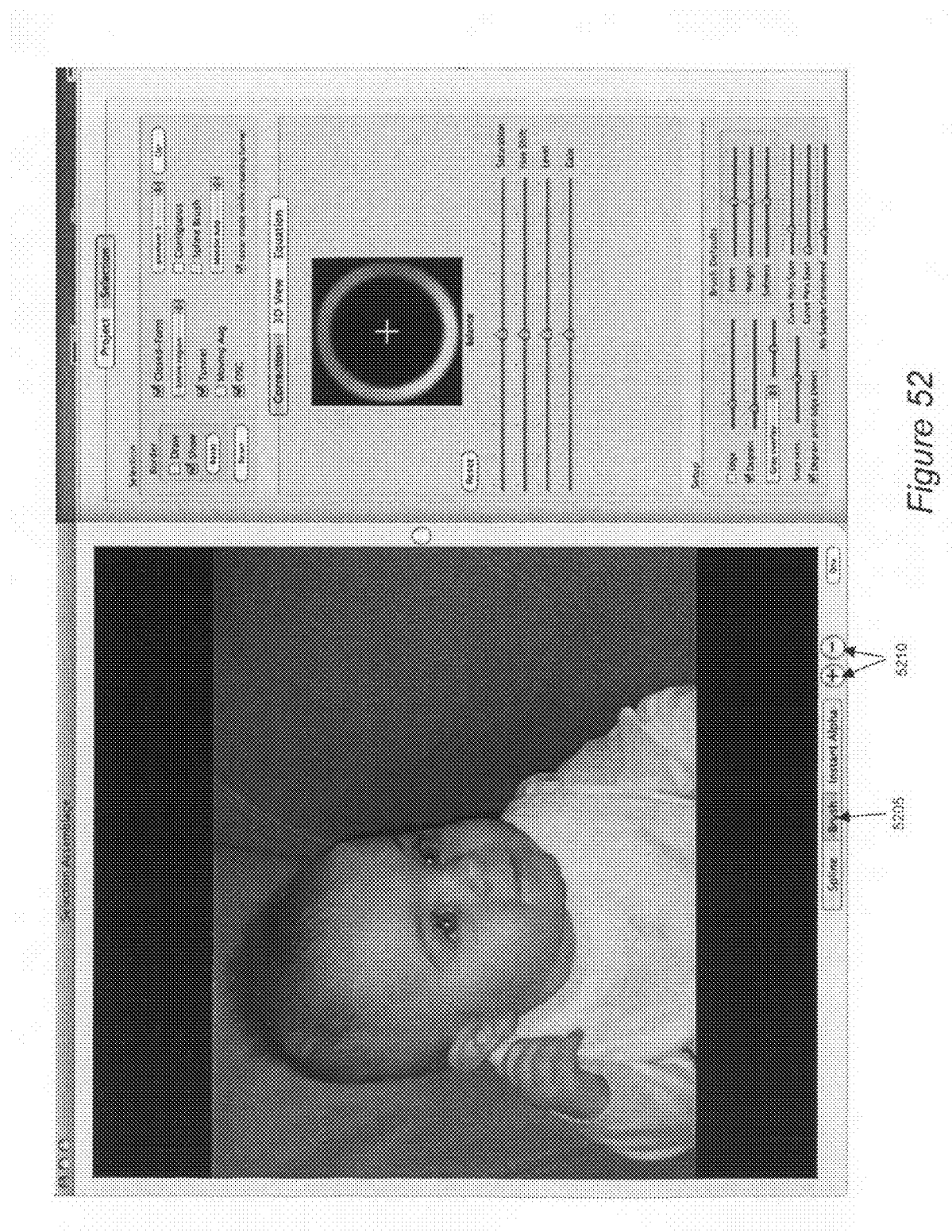
FIG. 52 illustrates an image-editing application of some embodiments with an alpha brush tool selected.

Some embodiments allow a user to define alpha values for sections of an image with an alpha brush in addition to generating alpha values with the use of tunnels. FIG. 52 illustrates the image-editing application of some embodiments with the alpha brush tool selected using button 5205. In some embodiments, selecting the alpha brush tool causes the image-editing application to provide the user interface items 5210. UI items 5210 allow a user to select whether the alpha brush will add alpha (i.e., define areas as foreground with alpha value equal to 1) or remove alpha (i.e., define areas as background with alpha value equal to 0).

Figure 53:
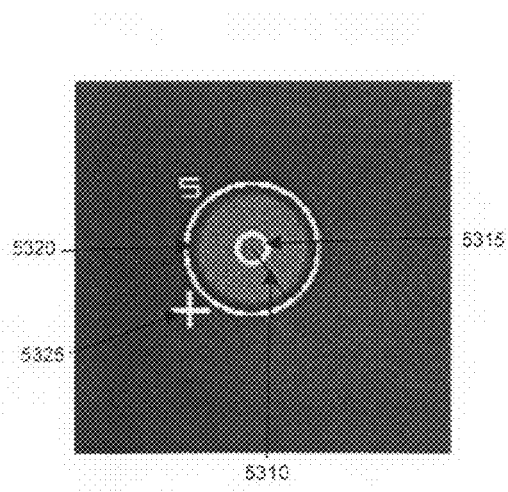
FIG. 53 illustrates a first alpha brush for adding alpha with a first radius.

In some embodiments, the alpha brush is circular, while in other embodiments the alpha brush is a different shape (e.g., a square). The alpha brush of some embodiments can have a varying size. In some embodiments, a user clicks on a point in the image to start the creation of an alpha brush, and drags outward from the point to determine the radius of the alpha brush. FIG. 53 illustrates an alpha brush 5305 with a radius 5310. Alpha brush 5305 also includes control point 5315. In some embodiments, after creating an alpha brush, a user clicks inside the control point to move the alpha brush around the image, thereby defining areas covered by the brush as either foreground or background. The alpha brush 5305 also includes the transition area 5320. The transition area of some embodiments transitions from an alpha value that is defined by most of the brush to the alpha value of zero outside the radius of the brush. In some embodiments, areas of the image that are only covered by the transition area will be defined to have an alpha between 0 and 1. FIG. 53 also illustrates indicator 5325 that indicates whether the alpha brush is being used to add or remove alpha. Indicator 5325 is a plus sign, indicating that the brush is currently being used to add alpha.

Figure 54:
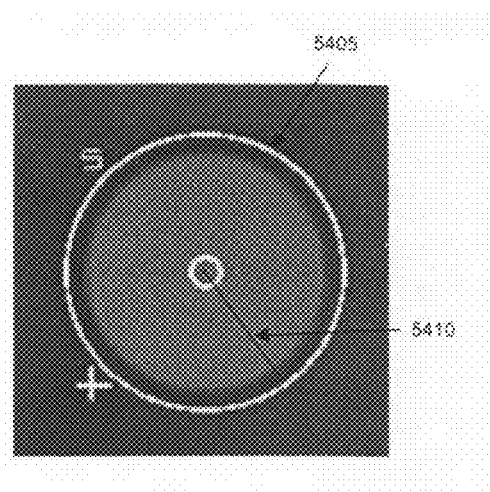
FIG. 54 illustrates a second alpha brush for adding alpha with a second radius.

FIG. 54 illustrates alpha brush 5405 with a radius 5410. Radius 5410 is larger than radius 5310. As compared to brush 5305, alpha brush 5405 is better for defining large sections of an image to have an alpha equal to 1. For example, if selecting a large foreground, 5405 is ideal for selecting the interior of the foreground more quickly, but would not be especially useful around the edges of the foreground.

Figure 55:
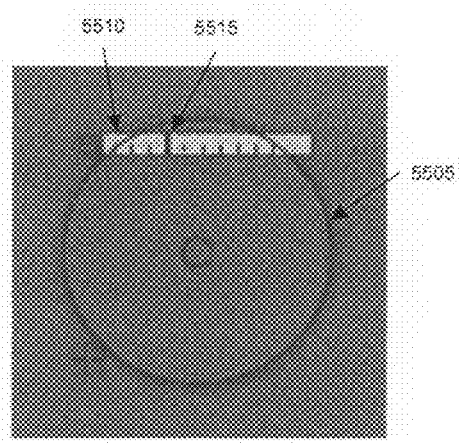
FIG. 55 illustrates a tool for modifying the softness of an alpha brush.

FIG. 55 illustrates alpha brush 5505 with pop-up slider tool 5510. In some embodiments, pop-up slider 5510 is displayed when a user clicks on the S at the upper left of the alpha brush. The pop-up slider of some embodiments adjusts the softness of the alpha brush. The softness of some embodiments defines the width of the transition area at the edge of the brush (e.g., 5320 in FIG. 53). A user can click on the large bar 5515 and drag it from side to side to increase or decrease the softness of the alpha brush.

Figure 56:
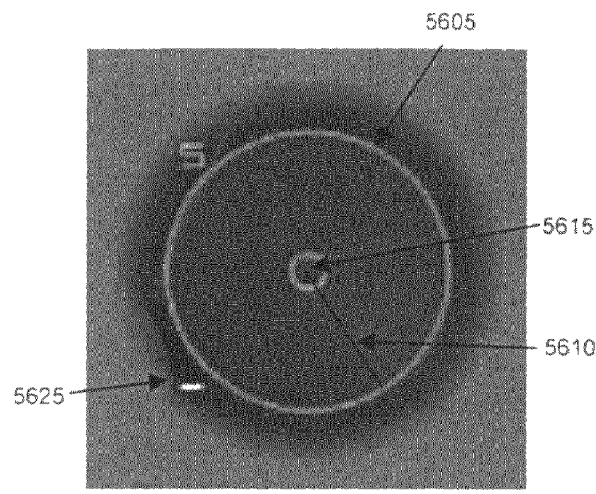
FIG. 56 illustrates an alpha brush for removing alpha.
Figure 57:
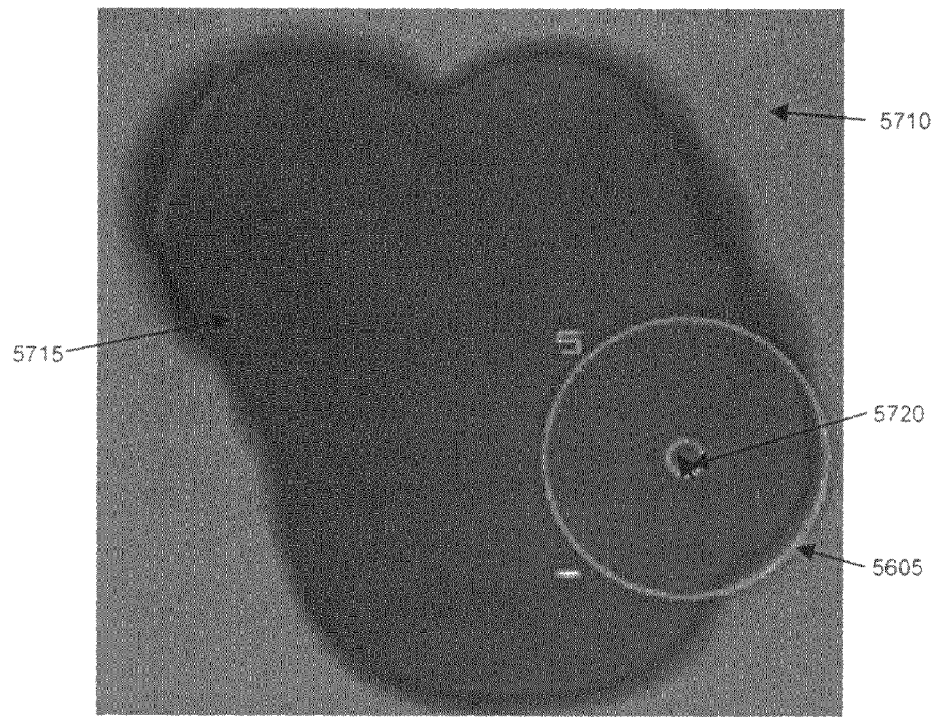
FIG. 57 illustrates the use of the alpha brush from FIG. 56.

As mentioned above, in some embodiments the alpha brush can also be used to remove alpha. FIG. 56 illustrates alpha brush 5605 having radius 5610. Alpha brush 5605 defines areas covered by the brush as having an alpha of 0 (i.e., as background). Like brushes 5305 and 5405, alpha brush 5605 includes a control point 5615 in the center for moving the brush around the image. FIG. 56 also illustrates indicator 5625, which is a minus sign in this figure to indicate that the alpha brush 5605 is for removing alpha. FIG. 57 illustrates the use of alpha brush 5605 to remove alpha. Before the use of brush 5605, the entire area of an image shown in FIG. 57 had an alpha value of 1. However, due to the use of cursor 5720 to move the brush 5605 around the image, area 5715 (the area covered by the brush 5605) has an alpha value of 0 while area 5710 remains with an alpha value of 1.

VII. Performing Color Correction on a Selection

The image-editing application of some embodiments uses the calculated alpha values to perform color correction on a selected area of an image. The selection is defined by the calculated alpha values. In some embodiments, the extent to which color correction applies to a particular pixel is defined by the alpha value for that pixel. In some embodiments, the extent to which color correction applies to a particular pixel is given by the equation:

$$\text{Result}=F*a+B*(1-a), \qquad (1)$$

where F is an image where a color correction function has been applied and B is the original image without any color correction function applied. Thus, if a pixel has an alpha value of 1, color correction will be fully applied to the pixel. If a pixel has an alpha value of 0.75, then color correction will affect the pixel only three-fourths as much as it affects a pixel with an alpha value of 1. Of course, pixels with an alpha value of 0 will not be affected at all by color correction.

Some embodiments also use the selection for cutouts. For example, a selection defined by alpha values can be pasted into a new image. The cutouts of some embodiments are defined similarly to color correction. The alpha value defines the extent to which the pixel is part of the selection that is pasted into the new image.

Figure 58:
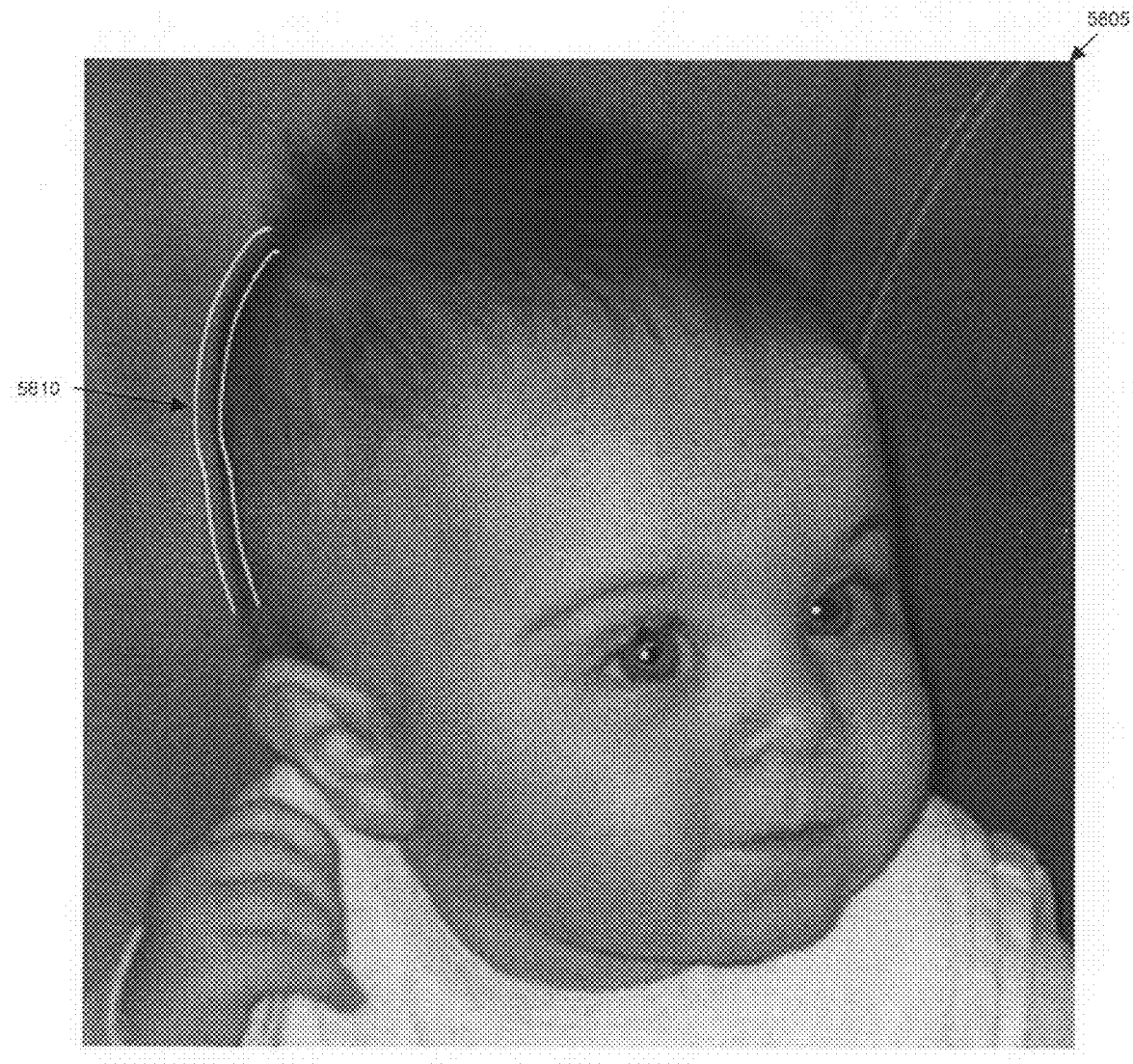
FIGS. 58-63 illustrate the selection, in multiple pieces, of a baby's head in an image.
Figure 59:
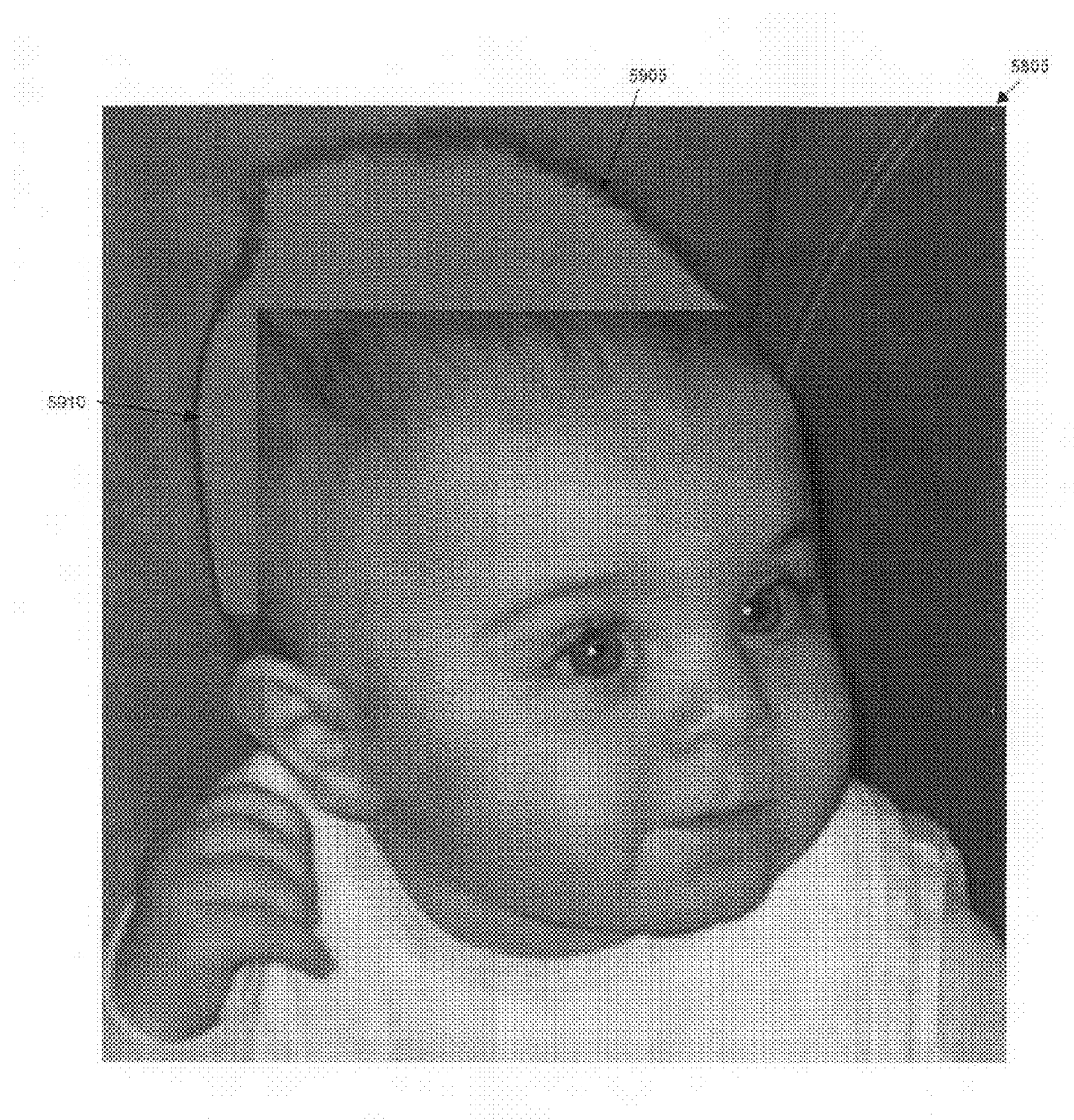
Figure 60:
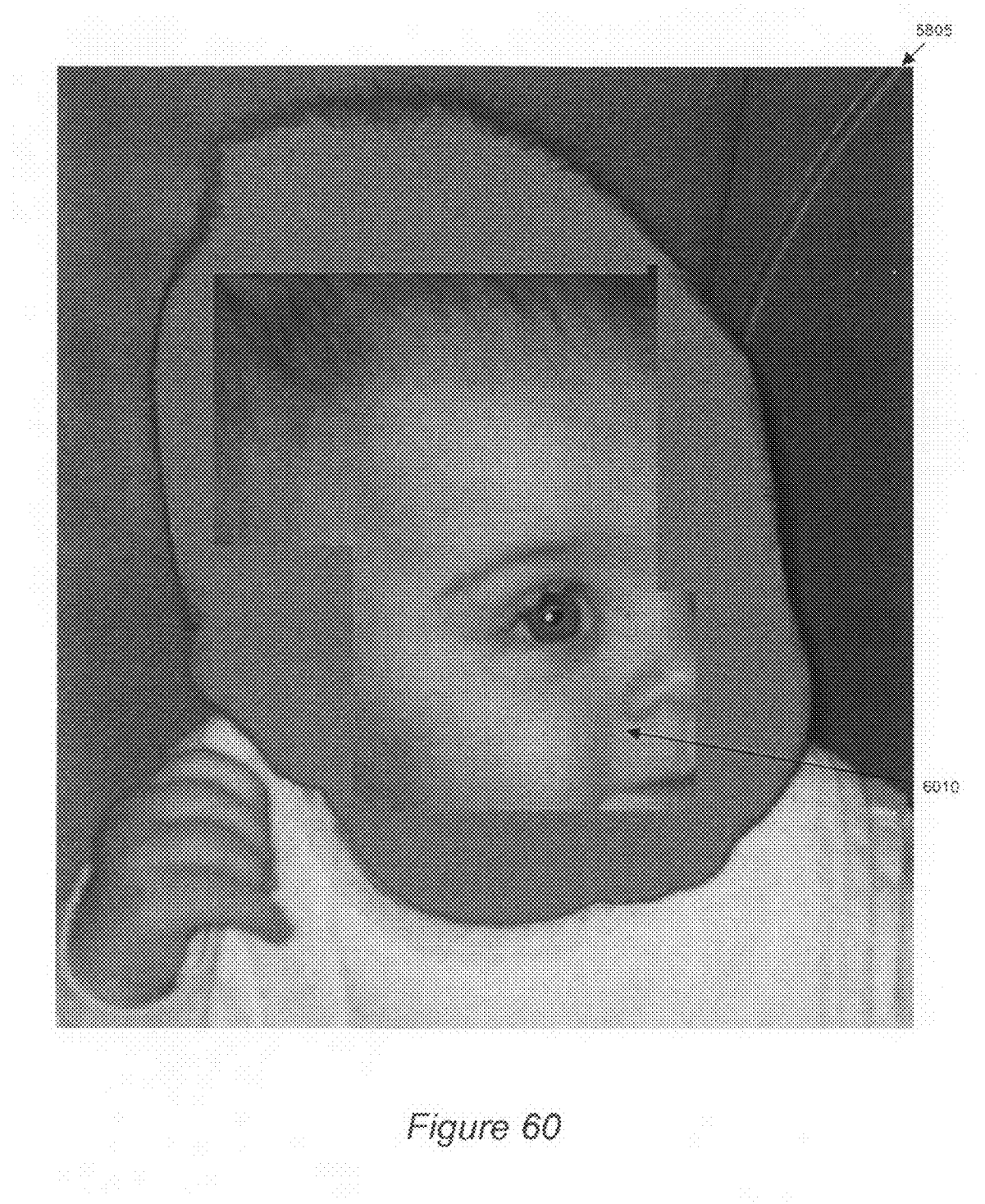
Figure 61:
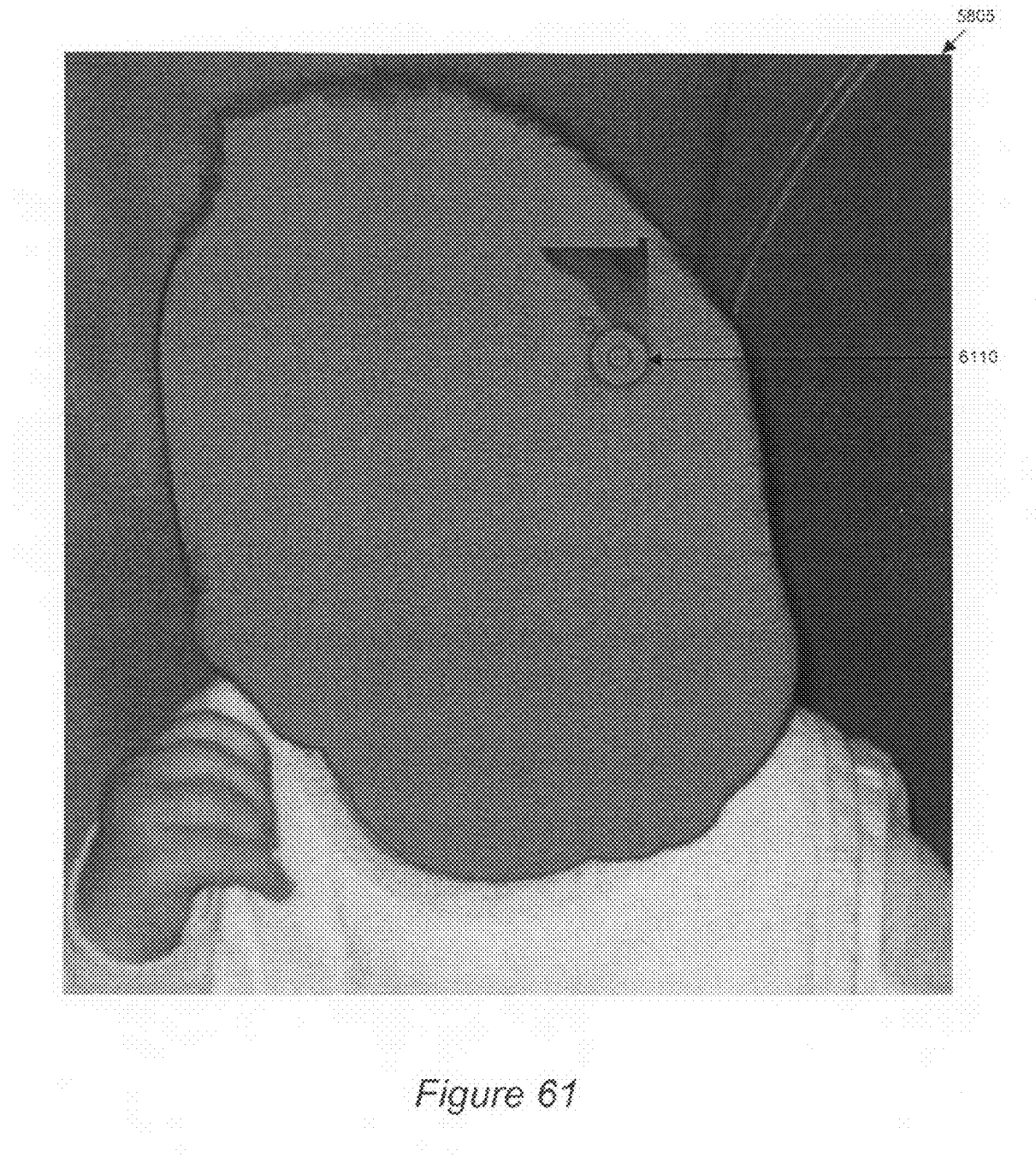
Figure 62:
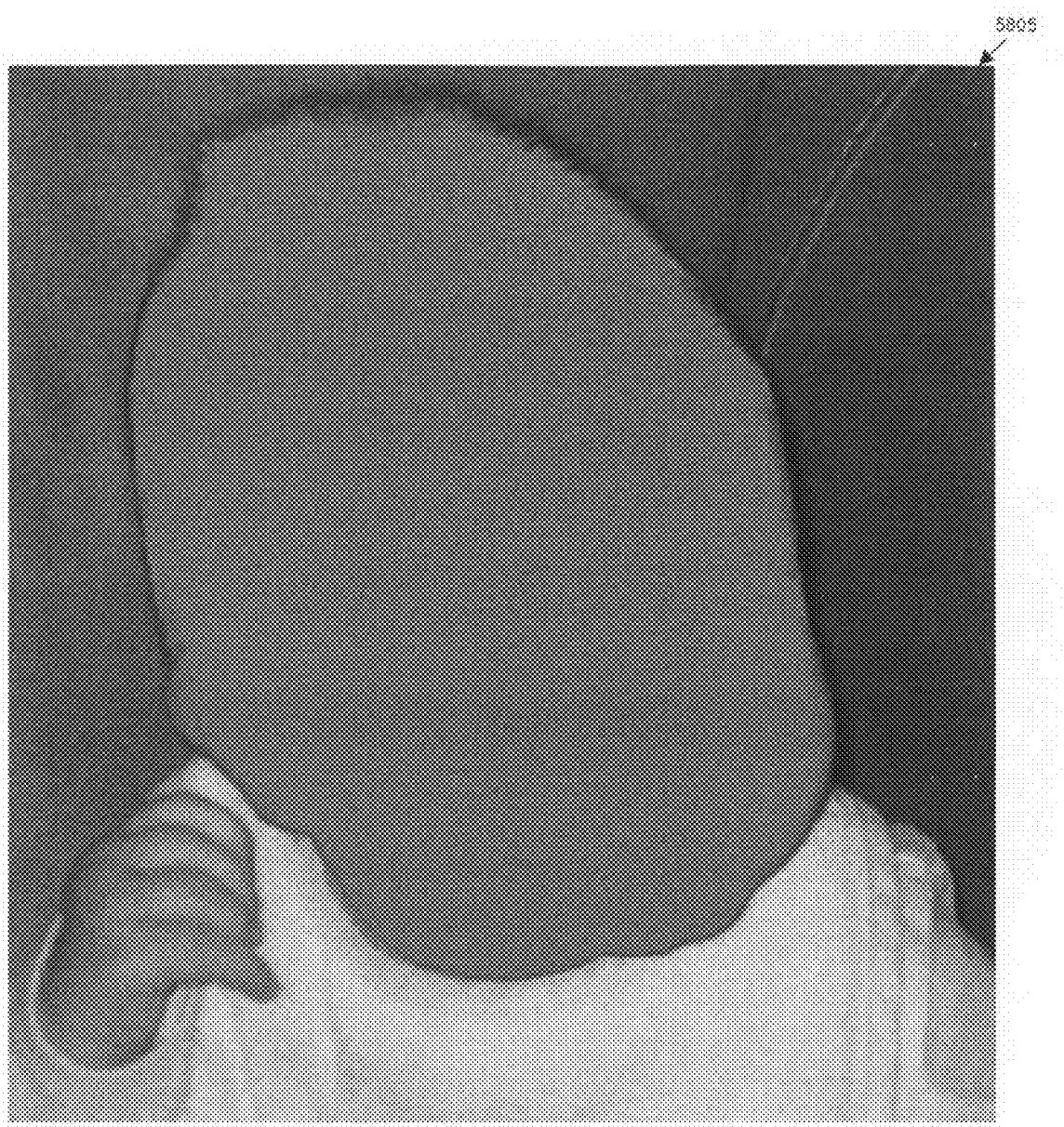
Figure 63:

As mentioned above, some embodiments allow a user to generate alpha values from multiple selected borders. This can be advantageous in that it allows a selection of an entire object in multiple pieces. FIGS. 58-62 illustrate the selection, in multiple pieces, of a baby's head in image 5805. FIG. 58 illustrates a first tunnel 5810. FIG. 59 illustrates alpha overlay 5910 generated from tunnel 5810 as well as alpha overlay 5915 generated from a second tunnel (not shown). FIG. 60 illustrates the alpha overlay after the entire border of the head has been selected, in numerous sections. As can be seen in FIG. 60, a substantial region 6010 in the middle of the head does not have an assigned alpha value (i.e., would be treated as having an alpha value of zero). In such a situation, an alpha brush may be used in some embodiments to fill in the middle section. Some embodiments use the alpha brush described above in Section VI. FIG. 61 illustrates the use of alpha brush 6110 to fill in area 6010. FIG. 62 illustrates the result of using the alpha brush with the entire head selected. FIG. 63 shows the alpha values for the head and surrounding area that were generated by use of the multiple selections and the alpha brush.

Figure 64:
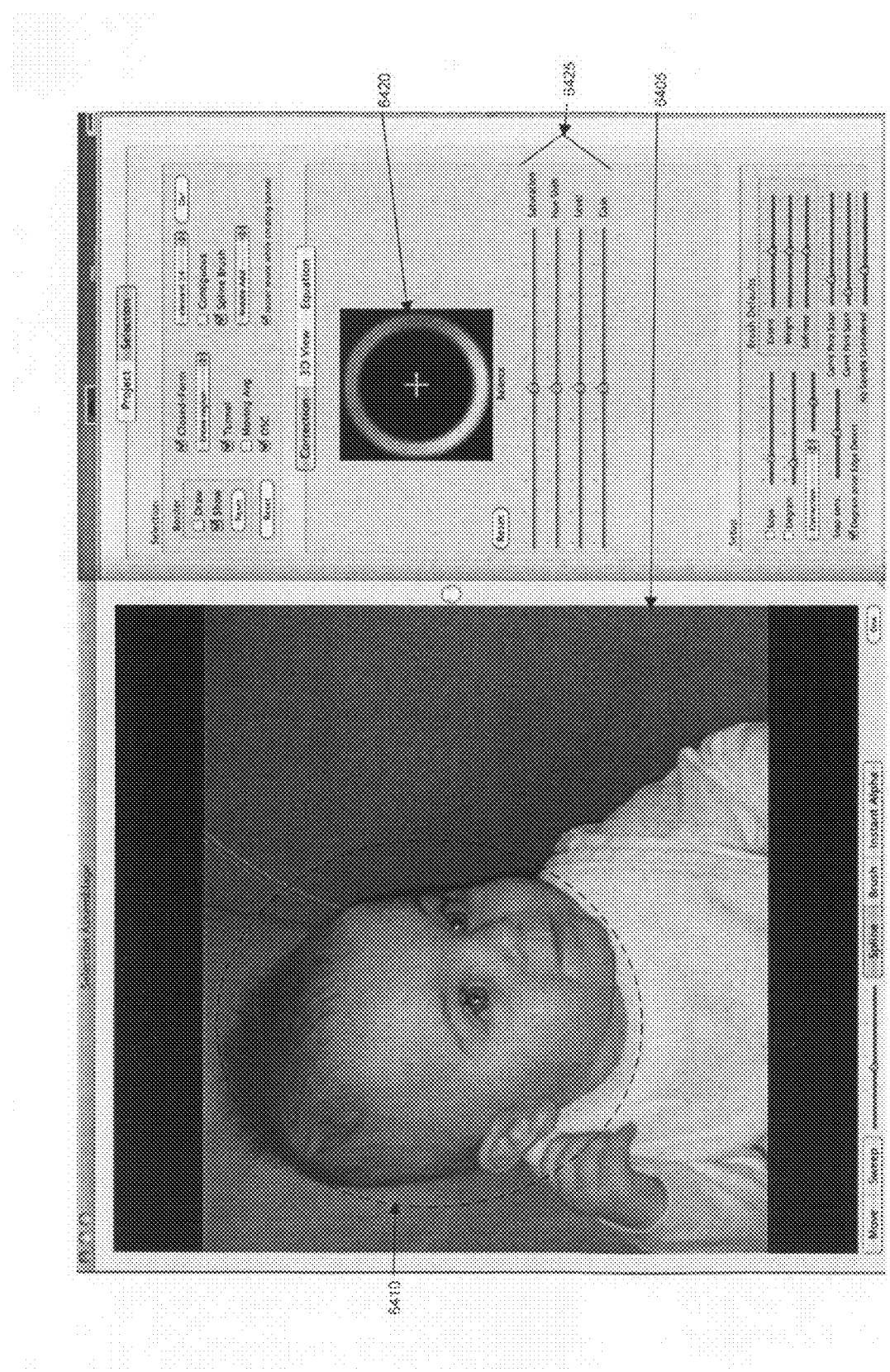
FIG. 64 illustrates an image and color correction tools.
Figure 65:
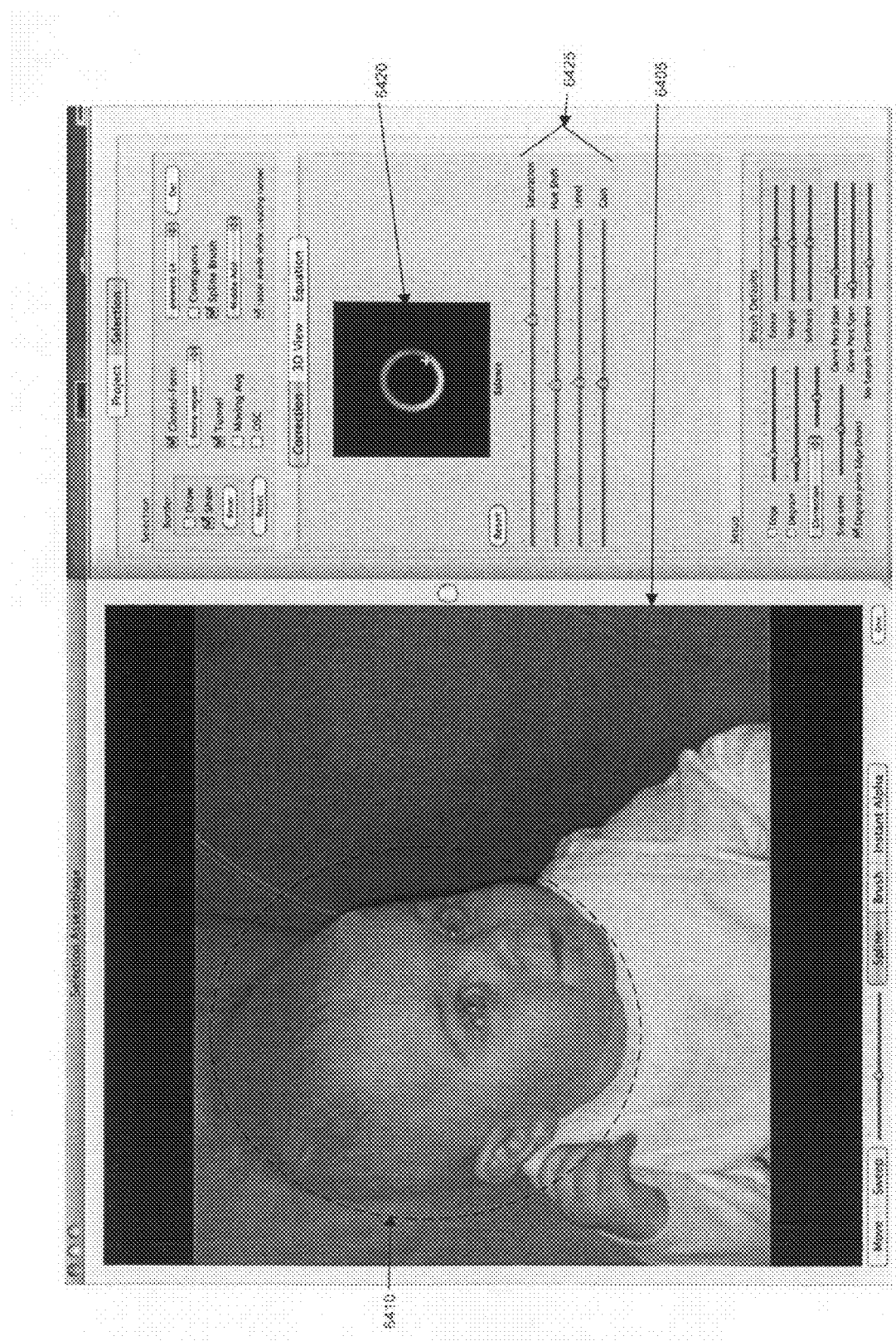
FIG. 65 illustrates the use of the color correction tools to modify the image.

Once a section of an image is entirely selected, color correction can be applied to the section if the user so desires. FIG. 64 illustrates the entirety of image 5805 including head 6410, along with color correction tools 6415. Color correction tools 6415 include color wheel 6420 and sliders 6425. The various color correction tools can be used to affect a selected portion of an image. In FIG. 64, the baby's head 6410 is selected, although the alpha overlay is not shown because the image is in color correction mode (i.e., showing only the image with any color corrections, and not any alpha values). FIG. 65 illustrates that color correction tools have been used to alter the color of the baby's head. The setting for the color wheel 6420 has been moved to the blue region, and saturation has been greatly increased using the saturation slider, one of the sliders 6420. As can be seen, the head 6410 is a different shade in FIG. 65 than in FIG. 64, due to the use of color correction tools.

VIII. Computer System and Software

Many of the above-described tools and applications are implemented as software processes that are specified as a set of instructions recorded on a machine readable medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 66:
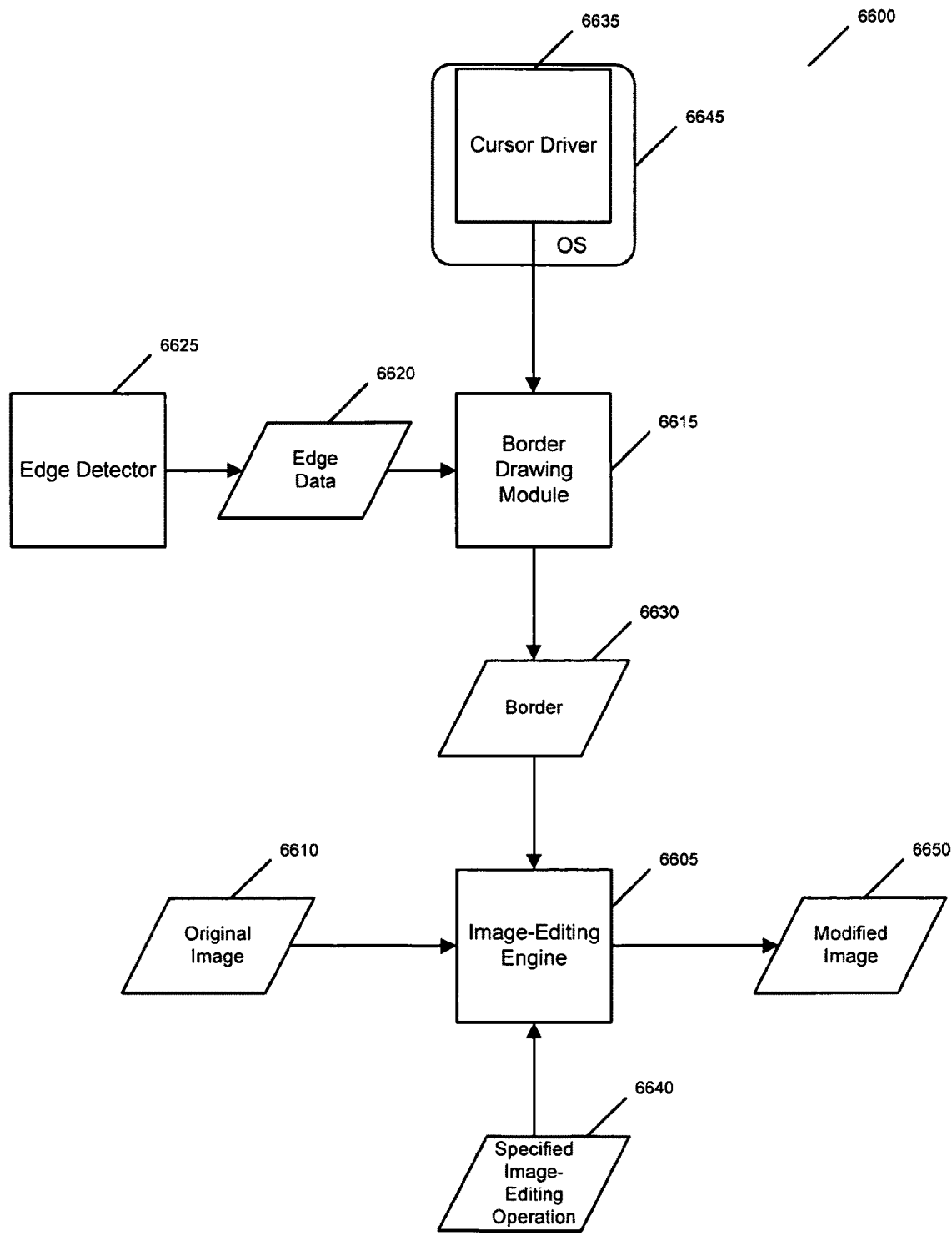
FIG. 66 conceptually illustrates the software architecture of an image-editing application of some embodiments.

FIG. 66 conceptually illustrates the software architecture 6600 of some embodiments of the invention. FIG. 66 illustrates an image-editing engine 6605, a border drawing module 6615, an edge detector 6625, and a cursor driver 6635. In some embodiments, the cursor driver 6635 is part of operating system 6645. FIG. 66 also illustrates original image data 6610, edge data 6620 border data 6630, image-editing operation data 6640, and modified image data 6650.

The edge detector 6625 uses the original image data 6610 and identifies edges in the original image to produce edge data 6620. The edge identification process is described in detail in Section III above. The edge data 6620 is passed to the border drawing module 6615, which combines the edge data 6620 with input from the cursor driver 6635 to define a border 6630. The processes performed by the border drawing module 6615 for defining the border, including the generation of varying size search windows, are described in detail in Section IV above.

The border drawing module 6615 passes the defined border 6630 to the image-editing engine, which also receives the original image 6610 and the image-editing operation data 6640 as input. The image-editing operation data is color correction operations, such as hue or saturation adjustments, in some embodiments. From the border 6630, the image-editing engine 6605 of some embodiments determines alpha values for at least a section of the image. The image-editing engine 6605 applies the image-editing operations 6640 to the original image 6610 to produce a modified image 6650. How the image-editing operations 6640 are applied is based on the border 6630 (and alpha values generated based on the border). The processes performed by the image-editing engine are described in detail above in Sections V-VII.

Figure 67:
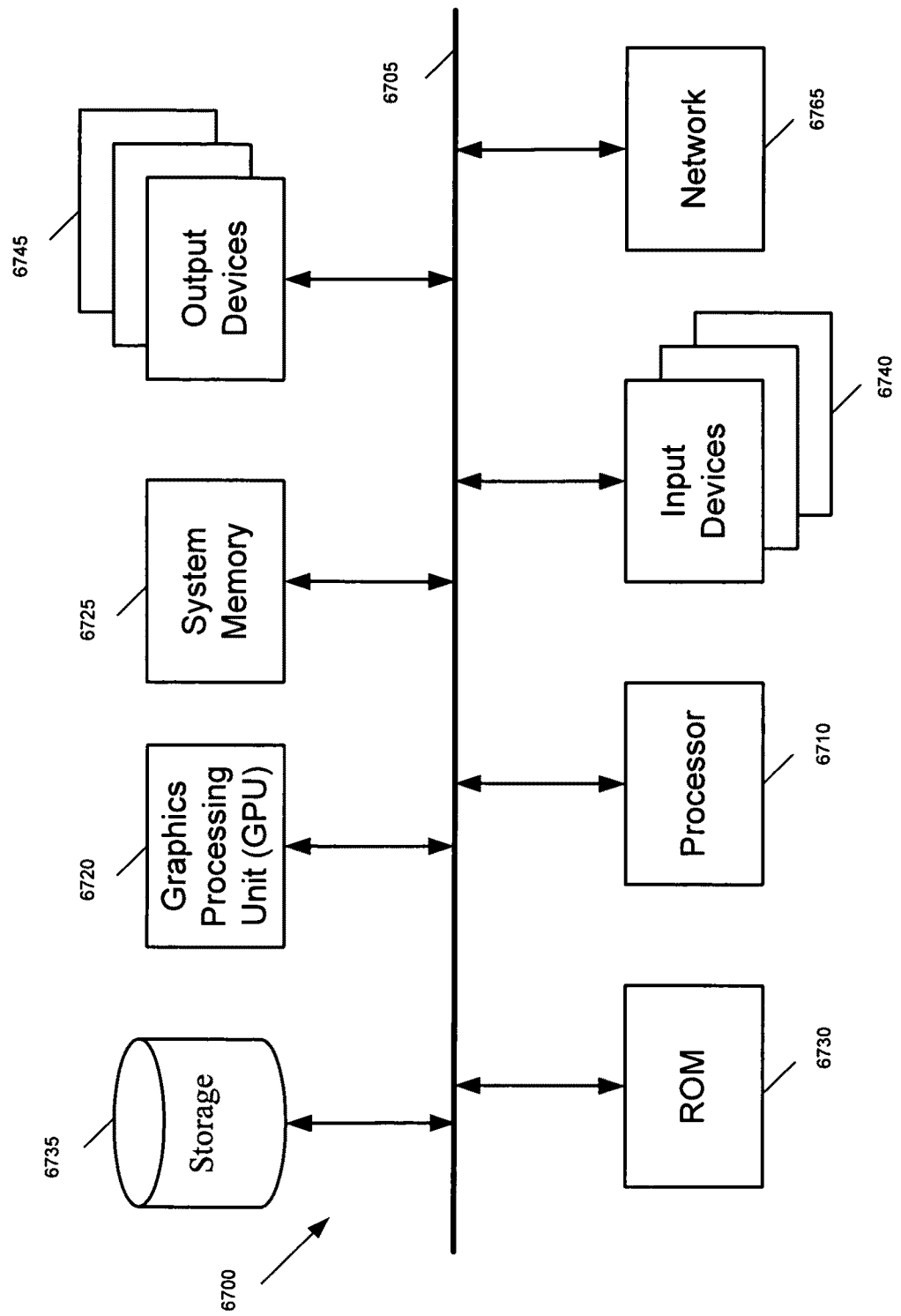
FIG. 67 conceptually illustrates a computer system with which some embodiments of the invention are implemented.

FIG. 67 conceptually illustrates a computer system with which some embodiments of the invention are implemented. Computer system 6700 includes a bus 6705, a processor 6710, a graphics processing unit (GPU) 6720, a system memory 6725, a read-only memory 6730, a permanent storage device 6735, input devices 6740, and output devices 6745.

The bus 6705 collectively represents all system, peripheral, and chipset buses that communicatively connect the numerous internal devices of the computer system 6700. For instance, the bus 6705 communicatively connects the processor 6710 with the read-only memory 6730, the GPU 6720, the system memory 6725, and the permanent storage device 6735.

From these various memory units, the processor 6710 retrieves instructions to execute and data to process in order to execute the processes of the invention. Some instructions are passed to and executed by the GPU 6720. The GPU 6720 can offload various computations or complement the image processing provided by the processor 6710. Such functionality can be provided using CoreImage's kernel shading language.

The read-only-memory (ROM) 6730 stores static data and instructions that are needed by the processor 6710 and other modules of the computer system. The permanent storage device 6735, on the other hand, is a read-and-write memory device. This device is a non-volatile memory unit that stores instructions and data even when the computer system 6700 is off. Some embodiments of the invention use a mass-storage device (such as a magnetic or optical disk and its corresponding disk drive) as the permanent storage device 6735.

Other embodiments use a removable storage device (such as a floppy disk or ZIP® disk, and its corresponding disk drive) as the permanent storage device. Like the permanent storage device 6735, the system memory 6725 is a read-and-write memory device. However, unlike storage device 6735, the system memory is a volatile read-and-write memory, such a random access memory. The system memory stores some of the instructions and data that the processor needs at runtime. In some embodiments, the invention's processes are stored in the system memory 6725, the permanent storage device 6735, and/or the read-only memory 6730.

The bus 6705 also connects to the input and output devices 6740 and 6745. The input devices enable the user to communicate information and select commands to the computer system. The input devices 6740 include alphanumeric keyboards and pointing devices. The output devices 6745 display images generated by the computer system. For instance, these devices display a graphical user interface. The output devices include printers and display devices, such as cathode ray tubes (CRT) or liquid crystal displays (LCD).

Finally, as shown in FIG. 67, bus 6705 also couples computer 6700 to a network 6765 through a network adapter (not shown). In this manner, the computer can be a part of a network of computers (such as a local area network ("LAN"), a wide area network ("WAN"), or an Intranet, or a network of networks, such as the Internet. For example, the computer 6700 may be coupled to a web server (network 6765) so that a web browser executing on the computer 6700 can interact with the web server as a user interacts with a graphical user interface that operates in the web browser.

Any or all components of computer system 6700 may be used in conjunction with the invention. For instance, in some embodiments the execution of the image-editing functions are performed by the GPU 6720 instead of the CPU 6710. However, a common limitation of the GPU 6720 is the number of instructions that the GPU 6720 is able to store and process at any given time. Therefore, some embodiments adapt the instructions for implementing the image-editing processes so that these processes fit onto the instruction buffer of the GPU 6720 for execution locally on the GPU 6720. Additionally, some GPU do not contain sufficient processing resources to execute the processes of some embodiments and therefore the processor executes the instructions. One of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, while the Apple Mac OS® environment is used to create some of these examples, a person of ordinary skill in the art would realize that the invention may be practiced in other operating environments such as Microsoft Windows®, UNIX, Linux, etc., and applications such as Adobe Photoshop®, Adobe Lightroom®, Apple iPhoto®, etc., without the use of these specific details. Also, some of the examples may be executed on a GPU or CPU of a computer system depending on the computing resources available on the computer system or alternatively on any electronic device that is able to view images. The examples have discussed application of the various image editing functions to images, but each of the above examples are extensible to apply to other forms of visual media such as video. Thus, one of ordinary skill in the art would understand that the invention is not to be limited by the foregoing illustrative details, but rather is to be defined by the appended claims.

We claim:

1. A method comprising:
   providing a display area for displaying an image that comprises a plurality of edges; and
   providing a border drawing tool that in response to movement of a location indicator across the image displays a search window about the location indicator, the search window specifying a region to search for edges in the image along which to define a border for display over the image, wherein a size of the search window varies based on a speed of the location indicator,
   wherein when the border drawing tool identifies a plurality of edges within the search window for a particular location, the tool defines the border along an edge closest to the center of the search window.

2. The method of claim 1, wherein the size of the search window is proportional to the speed of the location indicator within a range of speeds.

3. The method of claim 2, wherein the search window has a minimum size and a maximum size.

4. The method of claim 1, wherein the search window is a square box.

5. The method of claim 1, wherein the search window is a circle.

6. The method of claim 1, wherein the display area is also for displaying the defined border over the image.

7. The method of claim 1, wherein the search window is centered at the location indicator.

8. A non-transitory computer readable medium storing a computer program which when executed by at least one processing unit defines a border for an image, the computer program comprising sets of instructions for:
   receiving a movement of a location indicator over the image;
   searching for edges in the image within a region defined about the location indicator, wherein a size of the region defined about the location indicator varies based on a speed of the location indicator;
   when edges are identified within the region, defining the border along an identified edge closest to the location indicator; and
   when no edges are identified within the region, defining the border along the movement of the location indicator.

9. The non-transitory computer readable medium of claim 8, wherein the region has a property that changes based on the size of the region.

10. The non-transitory computer readable medium of claim 8, wherein the size of the region increases when the location indicator moves faster.

11. The non-transitory computer readable medium of claim 8, wherein the size of the region decreases when the location indicator slows down.

12. The non-transitory computer readable medium of claim 8, wherein the region is a square region centered about the location indicator.

13. The non-transitory computer readable medium of claim 8, wherein the computer program further comprises a set of instructions for performing an edge detection operation to identify relevant edges of the image when the image is opened by the computer program.

14. The non-transitory computer readable medium of claim 8, wherein the computer program further comprises a set of instructions for applying an image processing operation to the image to modify content of the image on one side of the defined border, wherein the image processing operation is a color correction operation that modifies pixel data of the image.

15. The method of claim 1, wherein the border is defined based on reference points defined over edges within the search window.

16. A method for defining a border for an image, the method comprising:
   receiving a movement of a location indicator over the image;
   searching for edges in the image within a region defined about the location indicator, wherein a size of the region defined about the location indicator varies based on a speed of the location indicator;
   when edges are identified within the region, defining the border along an identified edge closest to the location indicator; and
   when no edges are identified within the region, defining the border along the movement of the location indicator.

17. The method of claim 16, wherein the region has a property that changes based on the size of the region.

18. The method of claim 16, wherein the size of the region increases when the location indicator moves faster.

19. The method of claim 16, wherein the size of the region decreases when the location indicator slows down.

20. The method of claim 16, wherein the region is a square region centered about the location indicator.

21. The method of claim 16 further comprising performing an edge detection operation to identify relevant edges of the image when the image is opened.

22. The method of claim 16 further comprising applying an image processing operation to the image to modify content of the image on one side of the defined border, wherein the image processing operation is a color correction operation that modifies pixel data of the image.

* * * * *